(12) United States Patent
Laranang et al.

(10) Patent No.: US 10,636,230 B1
(45) Date of Patent: Apr. 28, 2020

(54) VEHICLE INSPECTION

(71) Applicant: Secured Mobility, LLC, Georgetown, TX (US)

(72) Inventors: Michael Laranang, Georgetown, TX (US); Brett Christian Taylor, Georgetown, TX (US); Ricardo Sevilla Lopez, Georgetown, TX (US); Emmanuel Enrique Lopez, Georgetown, TX (US)

(73) Assignee: Secured Mobility, LLC, Georgetown, TX (US)

( * ) Notice: Subject to any disclaimer, the term of this patent is extended or adjusted under 35 U.S.C. 154(b) by 107 days.

(21) Appl. No.: 14/746,451

(22) Filed: Jun. 22, 2015

Related U.S. Application Data

(60) Provisional application No. 62/015,226, filed on Jun. 20, 2014.

(51) Int. Cl.
*G07C 5/08* (2006.01)
(52) U.S. Cl.
CPC .................... *G07C 5/0866* (2013.01)
(58) Field of Classification Search
CPC ............... G07C 5/08; G07C 5/0866
USPC ....................................... 701/33.2
See application file for complete search history.

(56) References Cited

U.S. PATENT DOCUMENTS

| | | | |
|---|---|---|---|
| 6,006,159 A | 12/1999 | Schmier et al. | |
| 6,502,030 B2* | 12/2002 | Hilleary | B60R 25/33 340/992 |
| 6,631,841 B2 | 10/2003 | Roberts et al. | |
| 6,762,684 B1 | 7/2004 | Camhi | |
| 8,400,296 B2* | 3/2013 | Brinton | G07C 5/008 340/539.11 |
| 9,330,389 B2* | 5/2016 | Pitroda | G06Q 20/02 |
| 9,977,935 B1 | 5/2018 | Laranang et al. | |
| 2002/0082771 A1 | 6/2002 | Anderson | |
| 2004/0111279 A1 | 6/2004 | Schoen et al. | |

(Continued)

FOREIGN PATENT DOCUMENTS

| EP | 851377 A1 | 7/1998 |
|---|---|---|
| WO | WO2000046772 A9 | 7/2001 |

OTHER PUBLICATIONS

Schlosser, "Growing GPS, Student Tracking Capabilities Offer More Security Tools," School Bus Fleet, Apr.-May 2015, pp. 30-32.

(Continued)

*Primary Examiner* — Jacob S. Scott
*Assistant Examiner* — Michael E Butler
(74) *Attorney, Agent, or Firm* — Fish & Richardson P.C.

(57) ABSTRACT

Methods, systems, and apparatus, including computer programs encoded on computer storage media, for vehicle inspection and passenger tracking. In one aspect, a portable vehicle data input device includes an electronic display and a data processor coupled to the display and containing instructions configured to cause the device to: display information related to inspection of different portions of a vehicle, receive driver input indicating completion of vehicle inspection tasks, display information related to a plurality of passengers associated with the vehicle, receive input identifying specific passengers as the specific passengers board or exit the vehicle, and update a roster of passengers in response to receiving the input.

20 Claims, 35 Drawing Sheets

(56) References Cited

U.S. PATENT DOCUMENTS

| | | | |
|---|---|---|---|
| 2005/0040224 A1* | 2/2005 | Brinton | G08G 1/20 235/376 |
| 2006/0262190 A1* | 11/2006 | Millar | G06K 9/00577 348/148 |
| 2007/0024440 A1* | 2/2007 | Moran | G08G 1/127 340/539.13 |
| 2007/0061076 A1* | 3/2007 | Shulman | G01C 11/00 701/500 |
| 2007/0078908 A1 | 4/2007 | Rohatgi et al. | |
| 2008/0292211 A1* | 11/2008 | Frantz | G01N 21/8806 382/284 |
| 2011/0068954 A1* | 3/2011 | McQuade | G08G 1/20 340/988 |
| 2011/0098915 A1 | 4/2011 | Disatnik et al. | |
| 2013/0108155 A1* | 5/2013 | Mizutani | G06K 9/4652 382/165 |
| 2013/0190981 A1* | 7/2013 | Dolinar | B60R 11/04 701/41 |
| 2014/0125502 A1* | 5/2014 | Wittkop | G08G 1/127 340/989 |
| 2014/0149305 A1 | 5/2014 | Aziz et al. | |
| 2014/0188527 A1* | 7/2014 | Oxenham | G08B 5/221 705/5 |
| 2014/0257848 A1 | 9/2014 | Heppding | |
| 2014/0313334 A1* | 10/2014 | Slotky | H04N 5/23222 348/148 |
| 2015/0198136 A1* | 7/2015 | Martin | F02D 41/009 356/72 |
| 2015/0235094 A1* | 8/2015 | Kraeling | G06K 9/00791 348/148 |
| 2016/0350567 A1* | 12/2016 | McQuade | G08G 1/20 |
| 2016/0364699 A1* | 12/2016 | Steketee | G06Q 10/20 |
| 2017/0039782 A1 | 2/2017 | Moeller et al. | |

OTHER PUBLICATIONS

Truett, "Bus 54 . . . Where Are You? A School Bus Intelligent Information System," 1998, 11 pages.

Rossetti, "Field Testing and Evaluation of the Transit Integrated Monitoring System," Aug. 13, 1998, 25 pages.

* cited by examiner

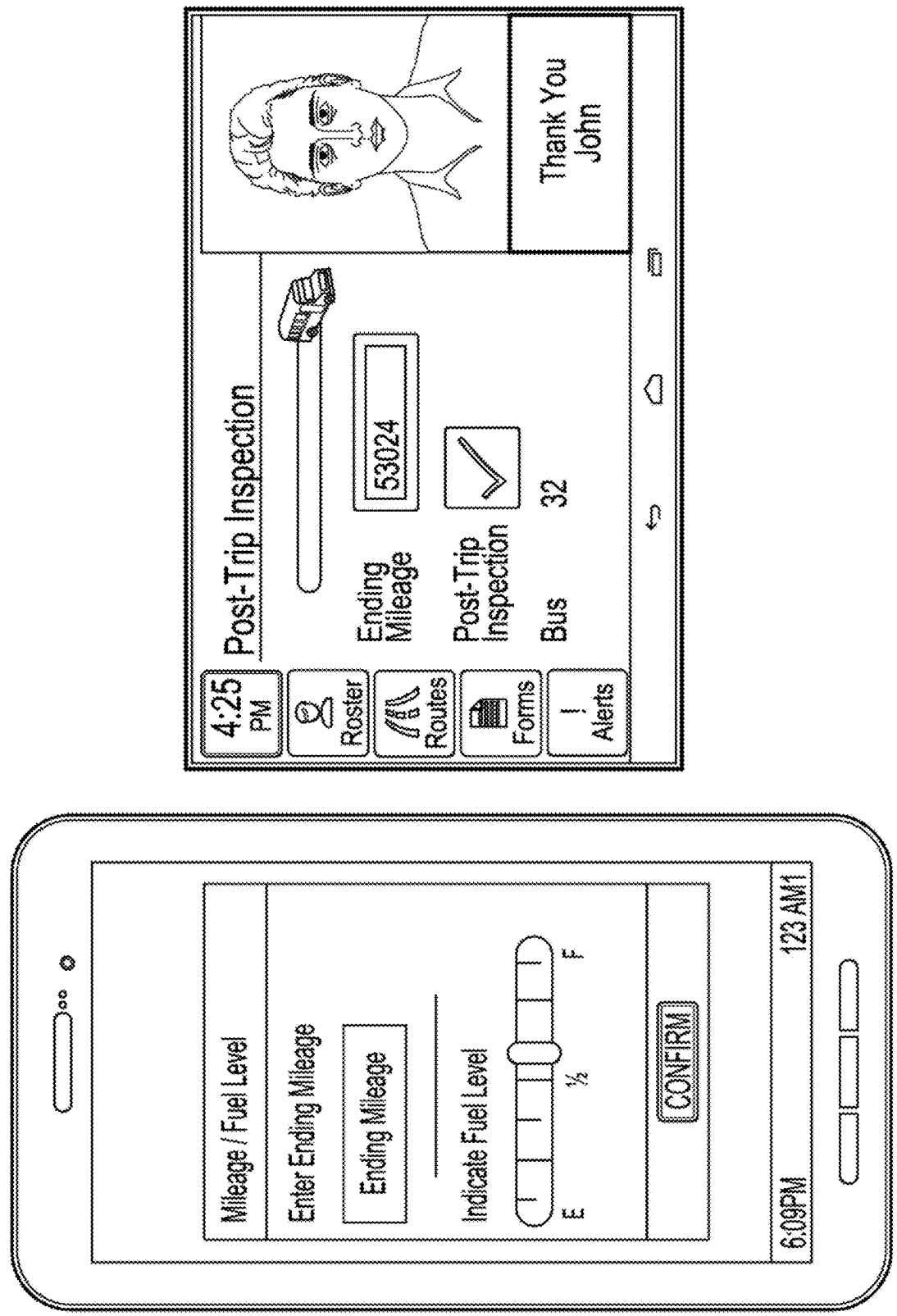

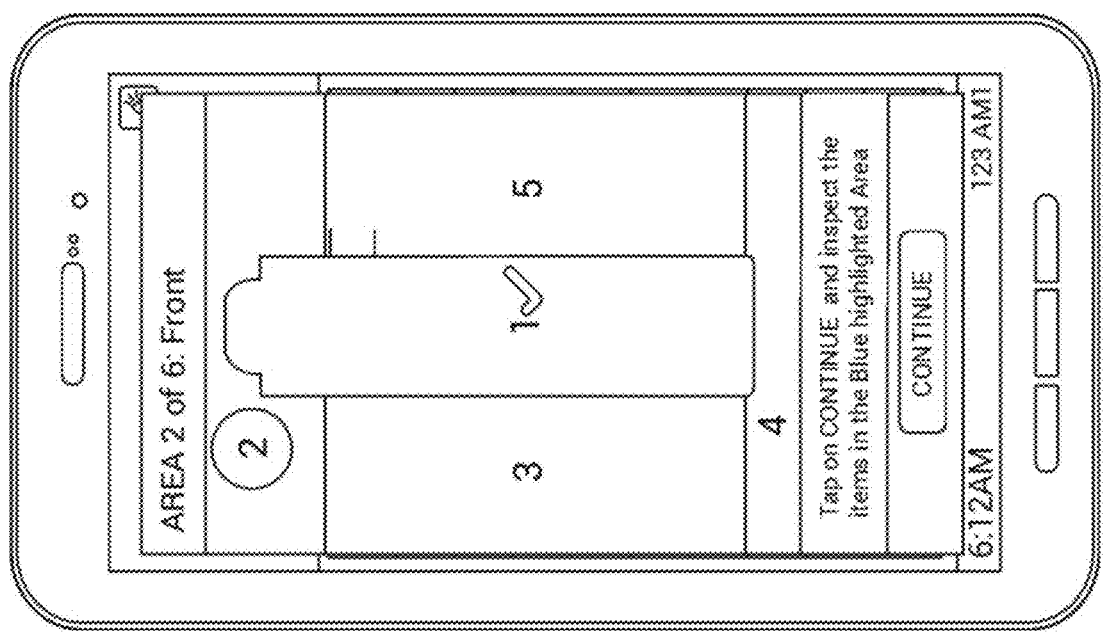

VEHICLE INSPECTION

CROSS-REFERENCE TO RELATED APPLICATIONS

This application claims priority to U.S. Provisional Application No. 62/015,226, filed on Jun. 20, 2014, the disclosure of which is expressly incorporated herein by reference in its entirety.

TECHNICAL FIELD

This invention relates to inspecting vehicles, and particularly school buses.

BACKGROUND

Various types of vehicles require frequent inspections, such as for safety. Long-haul trucks, for example, require such inspections, as do school buses. School bus drivers are required, in several school districts, to conduct inspections both before and after completing their daily routes. It is important to confirm that drivers complete their required inspections, and it is important to make completion of the inspections as convenient and easy to document as possible.

SUMMARY

This specification describes methods and systems for facilitating inspection of a vehicle, particularly a school bus, by a driver application on a portable data input device such as a tablet computer. A driver can carry the portable data input device to perform sequential inspections on a number of portions of the vehicle. The driver application can verify whether the driver has inspected a particular portion by determining whether the device has been proximate the particular portion based on global positioning data of the device, by determining whether a photograph image of the particular portion has been taken, and/or by determining whether elapsed time following presenting instructions for inspection of the particular portion has reached a predetermine time period. The driver application can generate an inspection summary report and/or a maintenance report or request based on the inspection, which can be transmitted to a remote facility or management system over a network such as a cellular network. The driver application can also allow the driver to track passenger riding status.

One aspect of the invention features a portable vehicle data input device with an electronic display (such as a display screen responsive to touch) and a data processor coupled to the display. The data processor contains instructions (such as in the form of an application or other computer program) configured to cause the device to display information related to inspection of different portions of a vehicle, receive driver input indicating completion of vehicle inspection tasks, display information related to a plurality of passengers associated with the vehicle, receive input identifying specific passengers as the specific passengers board or exit the vehicle, and update a roster of passengers in response to receiving the input.

In some cases the device is in the form of a tablet computer or smart phone running application software providing the instructions. The device can further include a case extending about the tablet computer. The instructions can be configured to cause the device to communicate passenger status and vehicle inspection information over a cellular network.

In some implementations the instructions are configured to cause the device to display identifying information about the specific passengers, in response to receiving the input identifying specific passengers as the specific passengers board or exit the vehicle. The identifying information can include photographs of the specific passengers. The instructions can be also configured to cause the device to display a seating chart of the vehicle, including information indicating passenger seating status.

In some examples, the device has an identifier sensor that is responsive to proximity of an identifier of a passenger and is configured to provide the input identifying the specific passengers to the data processor. For example, the identifier sensor may be a student identifier (ID) sensor responsive to the nearness of a student ID. In a particular example, the identifier sensor is a near field RFID sensor.

In some examples, the device includes a camera, and the data processor is configured to store image data obtained by the camera and associated with the vehicle inspection tasks.

The instructions can be configured to cause the device to generate, in response to an input from a driver, a vehicle inspection report indicating completion of the vehicle inspection tasks. The vehicle inspection report can include image data obtained by a camera of the device, and the device can further include memory storing image data of various portions of the vehicle to be inspected. The instructions can be configured to cause the device to transmit the vehicle inspection report to a remote facility over a cellular network.

In some implementations, the device includes a location system (such as a GPS receiver) for monitoring globe positioning data of the device, and the device can be configured to determine that it is near a particular portion of the vehicle to be inspected, and in response, to record global positioning data of the device and associate the recorded global positioning data with the particular portion of the vehicle. The instructions can be configured to cause the device to display information related to an item in a particular portion of the vehicle being inspected and listing one or more defects for the item, receive input from a driver selecting one of the defects, and record and associate the selected defect with the item of the particular portion of the vehicle. The instructions can be also configured to cause the device to receive an input from a driver indicating a mileage and a fuel level of the vehicle.

Another aspect of the invention features various methods of facilitating inspection of a vehicle using a hand-held data input device. The methods include displaying instructions on a screen of the device for inspecting a first portion of the vehicle, receiving a manual input on the device indicating completion of a visual inspection of the first portion of the vehicle, and then instructing the inspection of other portions of the vehicle only when a condition is established that indicates that the first portion was actually inspected. For example, then method may include confirming upon receipt of the manual input that the hand-held device was proximate the first portion of the vehicle based on global positioning data from a sensor of the device, and then recording inspection completion with respect to the first portion of the vehicle and displaying instructions on the screen for inspecting a second portion of the vehicle. In another example, the hand-held input device displays an indication requesting a photograph of the first portion of the vehicle, and then in response to obtaining a photographic image of the first portion of the vehicle from a camera of the device, displays instructions on the screen for inspecting a second portion of the vehicle. In yet another example, the hand-held input device waits a predetermined period of time after displaying the instructions on the screen before becoming responsive to input indicating completion of the visual inspection.

In some implementations, the method includes receiving input from a driver to start inspection of the first portion of the vehicle, and displaying a pop-up window including a list of security check items in the first portion of the vehicle for the driver to check before inspecting the first portion of the vehicle. The method can also include displaying a user interface element selectable by a driver to bypass inspection of the second portion of the vehicle. In response to receiving an input from the driver selecting the user interface element, the system can also record and associate the selection with the inspection.

The method can also comprises obtaining, from a camera of the device, image data of a particular item of the first portion of the vehicle; and storing and associating the obtained image data with the particular item and the first portion of the vehicle. In some examples, the method includes comparing the obtained image data of the particular item to a reference image for the particular item, and determining that a suspected defect has occurred with the particular item of the first portion of the vehicle based on a result of the comparison. In response, the hand-held device alerts the driver to the suspected defect.

The systems and methods described herein can help to verify and document proper inspection completions. Moreover, some of the systems can combine in one hand-held device the capability and function of recording and documenting inspection data as well as tracking passenger data. For school buses, such systems can be advantageously configured to communicate both inspection and rider information remotely, such as for enabling the remote monitoring of both inspections and rider status by administrators.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 6A-1 to 6R show screen shots of an example graphical user interface (GUI) for a driver application.

FIGS. 7A to 7F show screen shots of an example GUI for a paraprofessional application.

FIGS. 8A to 8G show screen shots of an example GUI for vehicle inspection using a driver application, where FIGS. 8B-1 and 8B-2 show example processes for vehicle inspection using the driver application.

Like reference symbols in the various drawings indicate like elements.

DETAILED DESCRIPTION

Figure 1:
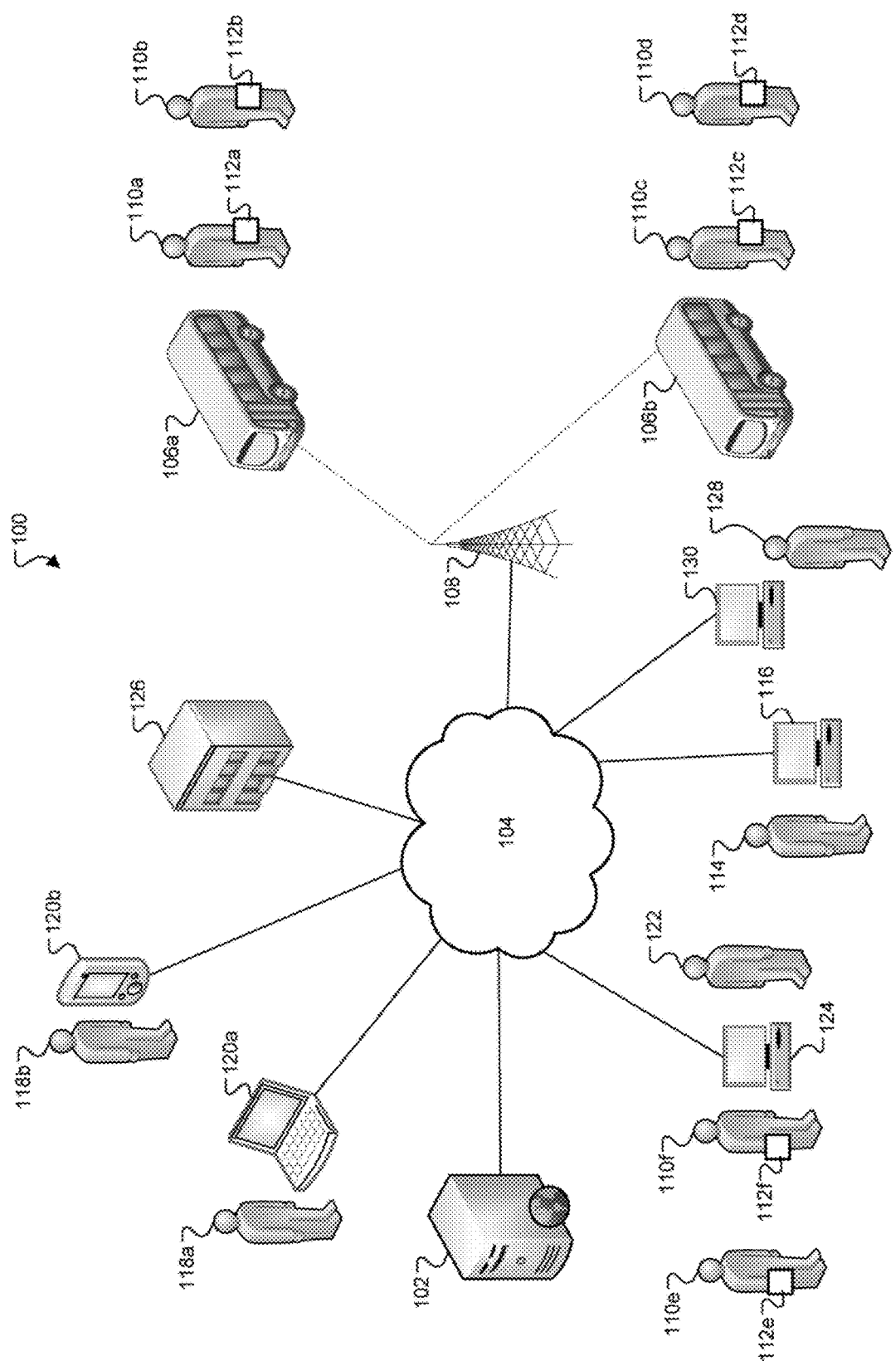
FIG. 1 is a diagram of an environment for monitoring student activities.

FIG. 1 is a diagram of an environment 100 for monitoring student activities. The environment 100 includes a student accountability system 102 which can be a server system of one or more computers configured to communicate over a data communications network 104, e.g., the Internet. FIG. 1 illustrates an overview of the environment, and other figures show components of the environment in greater detail.

The student accountability system 102 communicates over a wireless network 108, e.g., a cellular network such as 3G/4G internet connection, with bus systems 106a-b that are on school buses. Students 110a-d board the buses with student identification (ID) systems 112a-d. The bus systems 106a-b identify student IDs from the student ID systems 112a-d. The bus systems 106a-b can determine locations of the buses, e.g., using global positioning system (GPS) technology, and report location information and student status information to the student accountability system 102.

The student accountability system 102 provides an administrator portal to a school administrator 114. The school administrator 114 can access the portal with a user device 116, e.g., a personal computer, tablet, or phone. The user device 116 is connectable to the portal via the network 104 and/or the wireless network 108. Through the administrator portal, the student accountability system 102 can provide information describing where the buses are and which students are on which buses. The student accountability system 102 can also provide student riders and bus activity reports, exception reports, driver/route updates, and alerts. The school administrator 114 can manage bus routes and students associated with individual stops and send bus drivers alerts or notices that are associated with the bus drivers, the buses, the bus routes, and/or the students on their buses. For example, the school administrator 114 can add or remove individual students on a bus or determine active student riders or suspended students.

The student accountability system 102 provides a parent portal to parents/guardians 118a-b of the students. The parents/guardians 118a-b access the portal with user devices 120a-b, e.g., personal computers, tablets, or phones. Through the parent portal, the student accountability system 102 can provide information describing a particular student's location, the location of a particular bus that the student is riding, or estimated arrival time for the particular bus to a designated stop. The parents/guardians 118a-b can access up-to-date boarding activity and bus on route activity, and receive alerts (e.g., in emails or text messages) that include bus schedule changes, bad weather notifications, notification of emergencies, and/or their children boarding or missed boarding. The parents/guardians of a particular student may be restricted to access information only associated with the particular student and prohibited to access information associated with other students.

The parents/guardians can use the parent portal to manage notification settings and communicate with the school administrator 114, e.g., for updating contact information, submitting an address change, adding or removing individuals authorized to pick up their children, or temporary schedule change. In some examples, the parents/guardians can use an application executed on the user devices 120*a-b* to take photos and upload the photos the student accountability system 102. The application can be configured to guide a user to take photo properly, e.g., outlining head and shoulders. The student accountability system 102 can associate the photos of the parents/guardians with their student riders, e.g., based on the parents/guardians' accounts on the student accountability system 102. A school administrator can review the photos and approve or disapprove the photos. The photos of the parents/guardians can be provided to the bus systems 106*a-b*. As discussed in further details below, a driver of a bus can verify a person to pick up a student by using the photos of the authorized parents/guardians associated with the student that are stored in a bus system 106 of the bus.

The student accountability system 102 can also provide a paraprofessional portal to a school paraprofessional 128. The school paraprofessional 128 can access the paraprofessional portal with a paraprofessional application installed on a user device 130, e.g., a mobile computing device such as a tablet or a smart phone, or a personal computer or notebook. The user device 130 is connectable to the paraprofessional portal via the network 104 and/or the wireless network 108. Through the paraprofessional portal, the student accountability system 102 can provide information associated with the paraprofessional 128, including a list of buses and rosters for respective buses or routes. The student accountability system 102 can also provide information describing where the buses are and which students are on which buses, student riders and bus activity reports, exception reports, driver/route updates, and alerts.

As discussed in further details below, once the school paraprofessional 128 logs on the paraprofessional application and/or the student accountability system 102 on the user device 130, the paraprofessional application can present associated information the school paraprofessional 128. The associated information can be downloaded, e.g., automatically, from the student accountability system 102 via the network 104 and/or the wireless network 108. In some cases, the school paraprofessional 128 can use the user device 130 to check in and/or release students on the buses. For example, a bus arrives a transfer location such as a school. The school paraprofessional 128 can use the paraprofessional application on the user device 130 to download, e.g., from the student accountability system 102, up-to-date information about the bus and a list of students on the bus or a roster for the bus or the bus route. In some examples, the school paraprofessional 128 can also use the paraprofessional application on the user device 130 to receive the up-to-date information from an onboard computing device on the bus, e.g., through a near-field communication (NFC) or the network 104 and/or the wireless network 108.

The school paraprofessional 128 can use the paraprofessional application to check in a list of students that exit at the school using the paraprofessional application on the user device 130. The school paraprofessional 128 can also use the paraprofessional application on the user device 130 to release students to parents/guardians who pick up the students at the transfer location. In some implementations, the user device 130 includes an identifier reader, e.g., a RFID reader or a barcode reader, which can be used to detect student identifiers or identifiers for the parents/guardians.

The student accountability system 102 can also provide additional student services using another school system 124. The other school system 124 can be, e.g., a computer system in a cafeteria that students use to purchase food. Parents 118*a-b* can use the parent portal to add credits to a student's account, e.g., using a credit card or other payment system. The other school system 124 can also be, e.g., a computer system in a library that students use to check out books. The students 110*e-f* can use their student ID systems 112*e-f* to check out books and/or purchase food at the cafeteria.

The student accountability system 102 can also provide additional student services using a campus system 126. The campus system comprises one or more student ID readers positioned in or near campus areas or buildings or rooms. The student ID readers can communicate with the student accountability system 102 over the network 104, e.g., using a wireless local area network (LAN) or the cellular network 106. The student ID readers report student IDs to the student accountability system 102 as students pass by the student ID readers carrying student ID systems. Using student ID readers positioned in doorways and walkways, the student accountability system 102 can aid parents and administrators in locating students on a campus or within buildings.

The environment in FIG. 1 is described with reference to parents, students, and school administrators. The technology described in this document can also be applied in other settings. For example, the technology can be used to track passengers or cargo in other transportation environments.

Figure 2:
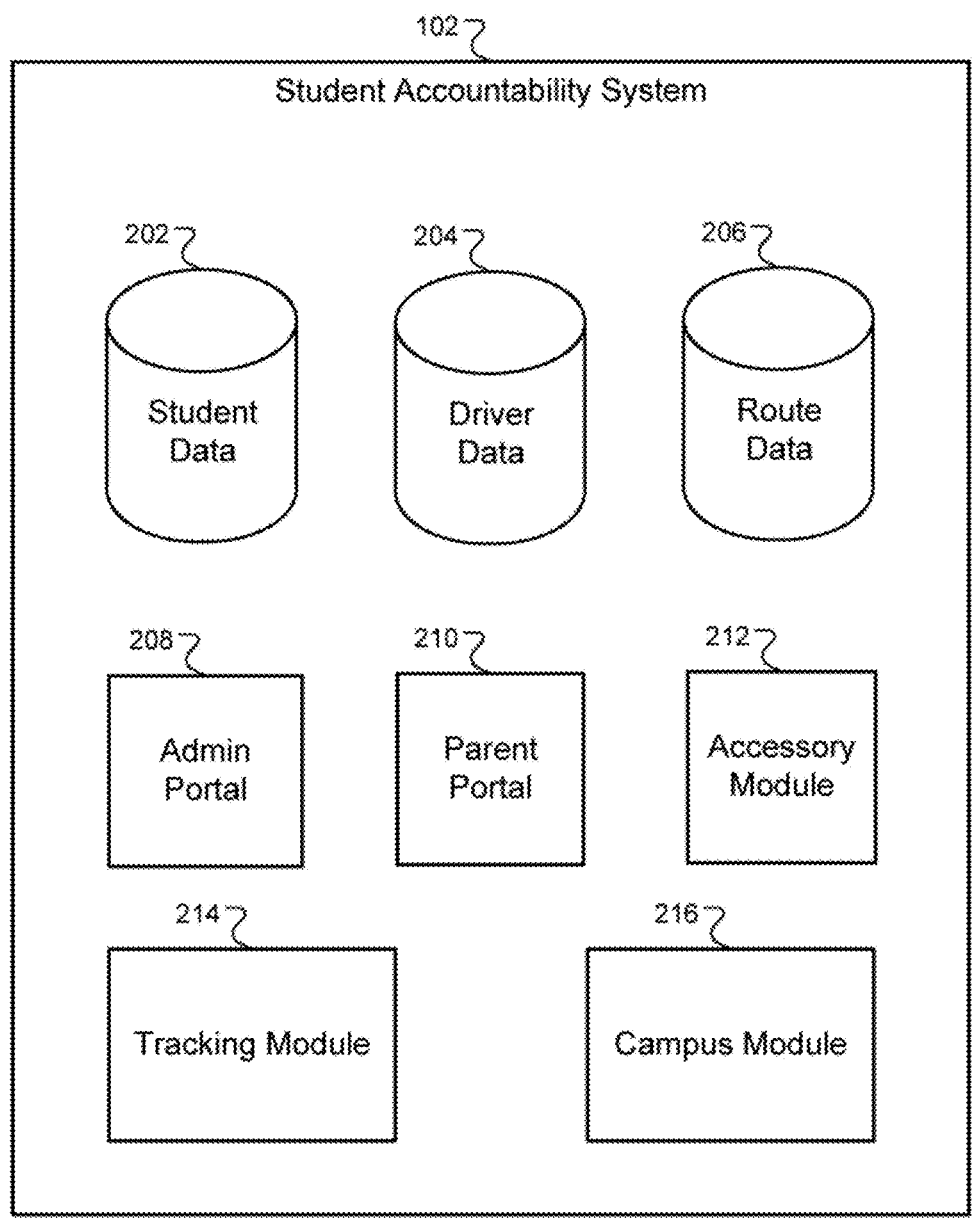
FIG. 2 is a block diagram of an example student accountability system.

FIG. 2 is a block diagram of an example student accountability system 102. The student accountability system 102 can be implemented using a server system of one or more computers which can be distributed, e.g., within a data center or across different geographic regions using a network.

The system stores student data 202, driver data 204, and route data 206. The system includes executable software modules including an administrator portal 208, a parent portal 210, and an accessory module 212. The system also includes a tracking module 214 which receives location and student status information from bus systems 106*a-b* and provides relevant information to the parent portal 210 and the administrator portal 208. The system includes a campus module 216 to interface with the campus system 126 that includes one or more student ID readers positioned in different locations on a campus, e.g., in doorways to rooms or buildings or walkways.

The student data 202 can be populated by an administrator 114, by parents/guardians 118*a-b*, or a combination of both. For example, parents/guardians 118*a-b* can be instructed to log in to the parent portal 210 to populate the student data 202 with information about their students. Administrators can populate the student data 202 with data from parents who are unable or do not wish to access the parent portal 210.

The student data 202 can include a unique student identifier (ID) for each student. The IDs can be generated by the system 102 or by an administrator 114. Each student ID can be associated in the student data 202 with a student's name and other optional information, e.g., one or more photographs of the student. Each student ID is associated with one or more bus routes stored in the route data 206. Each student ID can also be associated with one or more parent or guardian names and with contact information for parents or emergency contacts or for others.

In some implementations, as discussed in further detailed below, some student IDs are associated with a list of individuals who are authorized to receive a student who is leaving a bus. The list can be displayed to a driver using a display device of a bus system 106 so that the driver can confirm that a student is being released to an authorized individual.

The driver data 204 is typically populated by the administrator 114 and includes a unique ID for each driver who will be driving in the administrator's school system. Each driver ID is associated with one or more routes in the route data 206 that the driver will be driving on. The driver IDs can be associated with other information, e.g., a log of completed driver status checks.

The route data 206 is typically populated by the administrator 114. The route data 206 specifies a number of routes for the buses to complete to pick up and drop off students for going to and from schools. The route data can be specified using the administrator portal 208. For example, the administrator portal can present a map in a graphical user interface to the administrator 114, and the administrator 114 can then drop pins on the map to specify the route. The administrator can also assign driver IDs to the routes to specify which drivers are driving which routes.

The administrator portal 208 provides an administrator 114 with relevant information from the tracking module 114. For example, the administrator portal 208 can display the locations of multiple buses in the school system and lists of students on the buses. The parent portal 210 provides parents/guardians 118a-b with relevant information to the parents' students from the tracking module 114. For example, the parent portal 210 can provide a parent with the location of the bus that the parent's student is riding.

The accessory module 212 is configured to interface with another school computer system. For example, the accessory module 212 can communicate with a cafeteria computer system or a library computer system. A parent can log into the parent portal 210 and add cafeteria credits to a student's account and see what books the student has checked out from the library and when the books are due to be returned.

The tracking module 214 receives location information and student status information from the bus systems 106a-b. For example, the tracking module 214 can receive location coordinates from the bus systems 106a-b, lists of students that are riding the buses, and lists of students that have been dropped off at designated stops. The tracking module 214 provides relevant information to the administrator portal 208 and the parent portal 210.

The campus module 216 receives student IDs from student ID readers that are positioned around a campus or building. As students pass by the student ID readers, the student ID readers read student IDs from the students' ID systems and send the student IDs to the campus module 216. The campus module 216 stores information associating each student ID reader with a geographic location. An administrator or parent, using the admin or parent portal, can determine the location of a student by observing the last recorded location of the student's ID by the campus system.

Figure 3A:
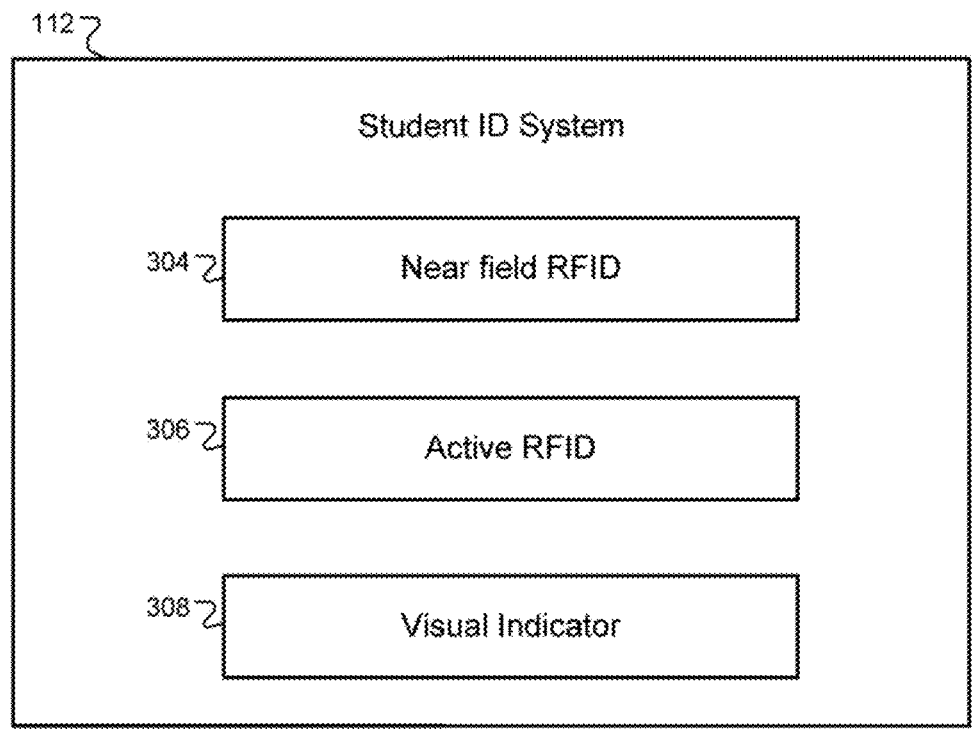
FIG. 3A is a block diagram of an example student ID system.

FIG. 3A is a block diagram of an example student ID system 112. The student ID system 112 can include one or more types of identifiers. Each of the identifiers can provide the same unique student ID for a given student. The student ID system 112 can be contained in any appropriate container, e.g., a card that a student can keep in a pocket, a card attached to a lanyard that goes around the neck, or in a wristband module.

In some examples, the student ID system 112 includes a near-field RFID module 304. The near-field RFID module is energized by an RFID interrogator when the student ID system is presented to the RFID interrogator. In some examples, the student ID system includes an active RFID module 306, which includes a power source and is capable of transmitting the unique student ID without being energized by an interrogator. The student ID system 112 includes a visual indicator 308 of the unique student ID. The visual indicator 308 can be a bar code or a quick response (QR) code or even printed characters that express the unique student ID.

In some implementations, the student ID system 112 contains no student information but a digital code. When the student ID system 112 is presented to a RFID reader in the bus system 106, the RFID reader can identify the digital code and the bus system 106 can pull up the student information associated with the digital code that is stored in the bus system 106, e.g., an onboard tablet computer.

The student can use the active RFID module 306 when boarding a bus, e.g., so that students do not have to individually swipe their IDs as the board. In that example, the bus system 106 can poll the students' ID systems after all the students have boarded to improve boarding time. Alternatively, students can use the near-field RFID module 304 while boarding the bus, e.g., so that the driver can individually confirm every student as the students board.

Additionally or alternatively, students can use the active RFID module with the campus system 126. For example, the campus system can include RFID interrogators within a number of classrooms, and an administrator can get the student IDs of the students in a given classroom by polling the student ID systems of the students in the classroom.

Figure 3B:
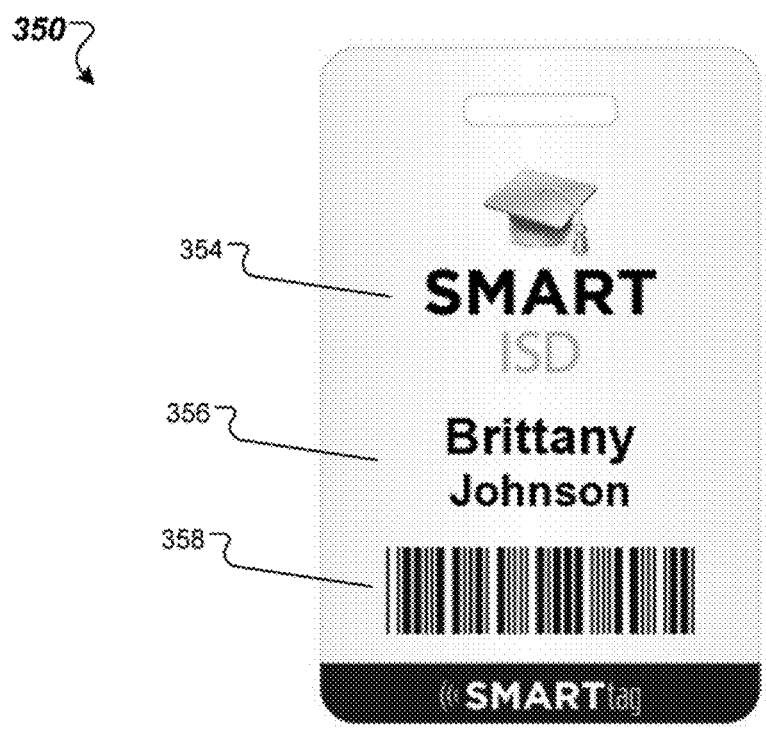
FIG. 3B shows a screen shot of an example student ID system.

FIG. 3B shows an example student ID system 350 of a student. The student ID system 350 can be the student ID system 112 of FIGS. 1 and 3A. The student ID system 350 includes a school district 354 that the student is in, a name of the student 356, and a visual indicator 358 (e.g., the visual indicator 308 of FIG. 3A). For illustration, the visual indicator 358 is a bar code. The student ID system 350 can also include a near-field RFID module (e.g., the RFID module 304 of FIG. 3A) or an active RFID module (e.g., the RFID module 306 of FIG. 3A) embedded in the student ID system 350.

Figure 4:
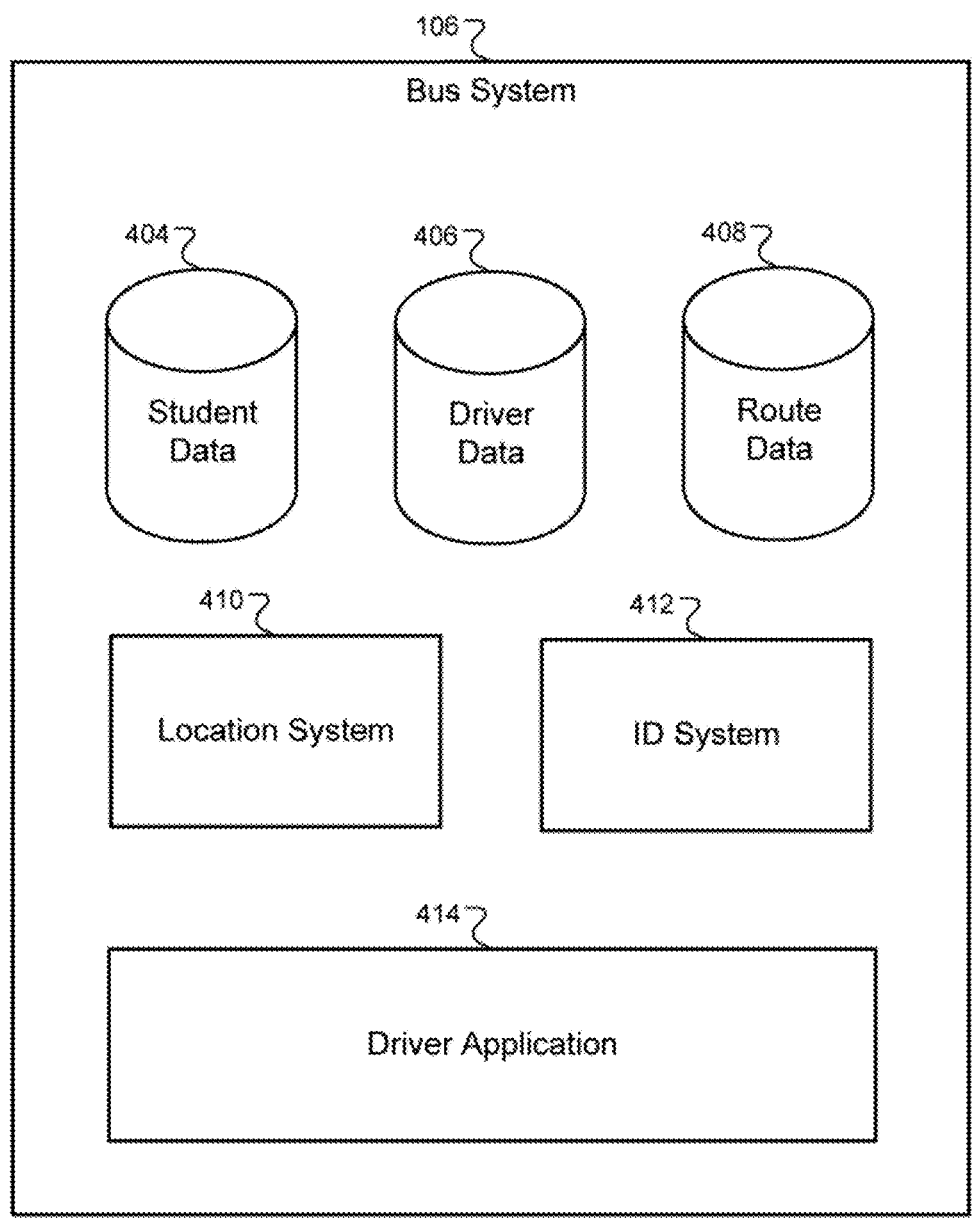
FIG. 4 is a block diagram of an example bus system.

FIG. 4 is a block diagram of an example bus system 106. The bus system 106 can be any appropriate computer system, e.g., a laptop or a personal computer or a smart phone or a tablet computer. For purposes of illustration, the bus system 106 will be described as being a tablet computer having a touch screen display.

The bus system 106 can be attached to the bus or carried by the bus driver. In some implementations, the bus system 106 is mounted at the front of the bus, between the driver and the bus door. A tablet cradle and mounting bracket system can be secured to the bus, and the bus system can be mounted or removed by sliding or pushing the bus system into the tablet cradle device. Students can present a student ID system 112 to the bus system while entering or exiting the bus. The driver can see the display and reach the display to perform any needed functions, e.g., manually loading or unloading a student, and the driver can remove the bus system 106 if needed, e.g., to perform a vehicle inspection before starting a route and/or after completing a route.

The bus system 106 stores student data 404, driver data 406, and route data 408. In some implementations, the bus system 106 only stores the student, driver, and route needed for a particular route or number of routes to be completed on a given day. The bus system 106 can download the needed information from the student accountability system 102, e.g., over the cellular network 108, when a driver logs into the bus system 106. The bus system 106 can also update information, e.g., real-time location or student loading or unloading events, to the student accountability system 102.

The bus system 106 includes a location system 410 and an ID system 412. The location system 410 is configured to determine a location of the bus system, e.g., using GPS or by any other appropriate locating technology. The ID system 412 is configured to receive student IDs from the student ID systems 112*a-d* and can also be used to identify drivers who carry driver ID systems. The ID system 412 can be also configured to identify identifiers of parents/guardians who are authorized to pick up their students. In some implementations, the ID system 412 includes an RFID interrogator, a bar code reader, or a near field communication (NFC) reader.

The bus system 106 includes a driver application 414. The driver application 414 is configured for rapid boarding of students and accurate reporting. For example, when a student boards or disembarks a bus, the student can present the student ID system 112, e.g., a student ID card, to the ID system 412. The ID system 412 can identify the student ID and provide the identified student ID to the driver application 414. The driver application 414 can log the boarding event, e.g., recording timestamp, location and student information, and verify whether or not the student is authorized to board or whether or not the student is getting off at a correct stop.

The driver application 414 provides manually loading and/or unloading functionalities to a driver, so that the driver can use the driver application 414 to manually load or unload a student rider, e.g., an anonymous student or an eligible student that forgets to bring his/her student ID system 112. The driver application 414 can provide flexible functions to the driver. For example, the driver application 414 can provide a "one click" manually loading or unloading feature to the driver. The driver can simply click a student name to complete the manually loading or unloading process. The driver application 414 can also add an "undo" button for the driver to cancel previous actions such as manually loading or unloading.

The driver application 414 can send information to the student accountability system 102, which can in turn send out alerts. For example, the student accountability system 102 can send out an alert to everyone on a list associated with a student ID when the student's bus is a certain amount of time from arriving as the student's designated stop.

As discussed in further details below, the driver application 414 can perform automatic route transitioning. For example, suppose that a bus covers two routes in a morning, one to an elementary school and one to a middle school. After all of the students have been dropped off at the elementary school, the bus driver starts driving the route for the middle school students. The driver application 414, using the location module, can determine that the bus has started the later route and automatically load route data for the later route.

The driver application 414 can also be used in a route learning mode. The routes stored in the route data can be created by a school administrator dropping pins onto a map displayed by a mapping application, and in some cases, the stop locations will not be correct. In the route learning mode, a driver can drive to all of the stops on the route, push a button when the bus is located at a stop, and have the driver application 414 record a precise location of the bus at the stop. The route data in the student accountability system can then be updated with the recorded locations.

The driver application 414 can allow a driver to perform a pre-trip inspection and/or a post-trip inspection, as discussed in further details in FIGS. 8A-8G and FIGS. 9A and 9B. In some implementations, the driver application 414 can validate whether or not a pre or post trip inspection has been completed by the driver. The driver application 414 uses location information and time stamp information to validate the inspection. For example, the driver application 414 can generate a flag or a report for an administrator if the location module indicates that the bus system stayed in the same location while the driver enters information as part of the inspection. In some examples, fixed Areas are designated around the bus. As the driver performs the inspection, the driver selects a user interface element displayed by the driver application, and the driver application checks whether the location module indicates that the driver is in the correct Area for that stage of the inspection.

Figures 2, 6A:
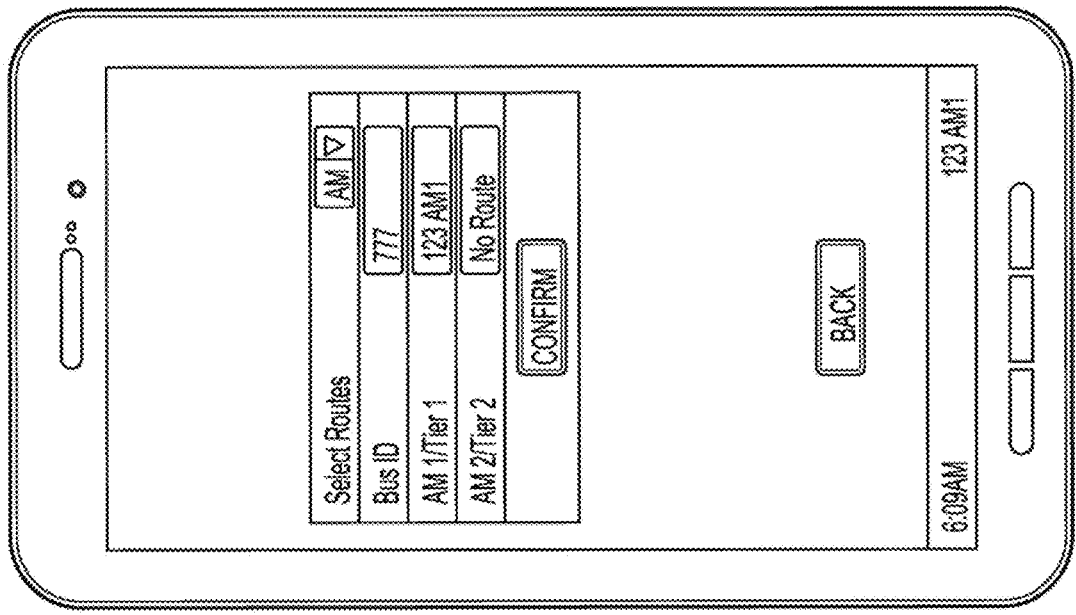
Figures 1, 6A:
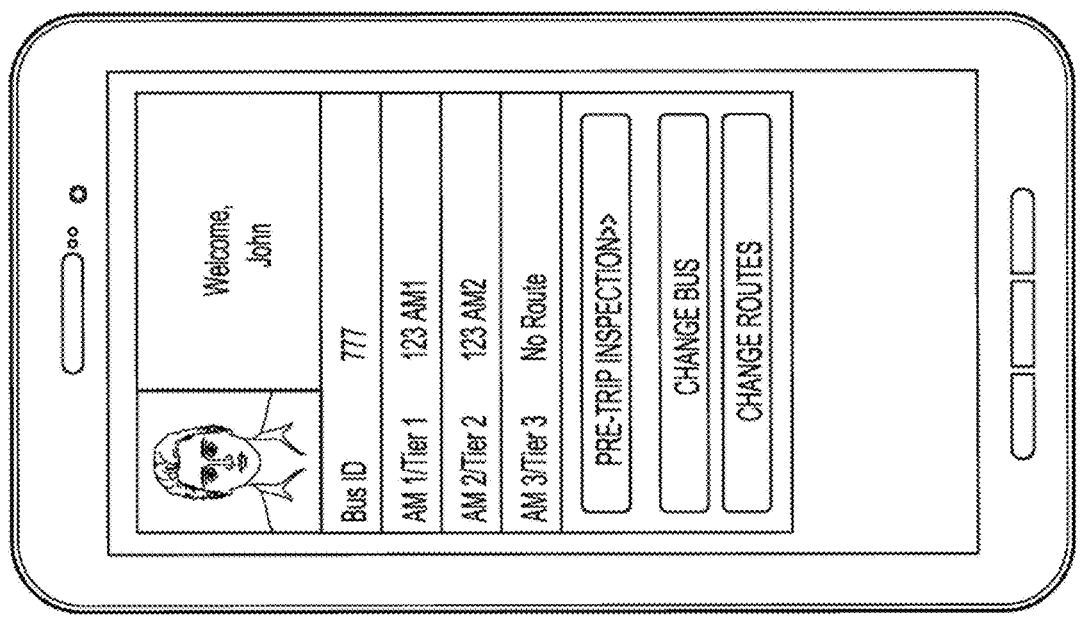

The driver application 414 is configured to present a graphical user interface (GUI) to a driver, e.g., on a display of an onboard computing device. The GUI can be presented in vertical view or horizontal view. As discussed in further details below, FIGS. 6A-6O show screen shots of an example GUI for the driver application and illustrate example functions that can be performed by the driver application 414.

In some implementations, the bus system 106 includes a recording system such as a video recorder, an audio recorder and/or a camera. The driver application 414 can receive a driver input or determine a trigger event to activate the recording system to record events such as emergency events or student discipline events. In some implementations, the recording system is enabled to record whenever active. The recording system can be activated in response to trigger events such as student load activity, profanity detected, or keyword threatening. The trigger events can also set markers in recording stream. In some implementations, secondary recording system such as microphones or cameras or video recorders can be positioned around the bus and wired or wirelessly coupled to the bus system 106 for audio and/or video recording. The driver application 414 can process the recorded audio or video files, e.g., by compressing the files or retrieving useful video/audio clips. The bus system 106 can then transmit the processed files to the student accountability system 102.

The driver application 414 can have different operating modes for different drivers. The operating modes can include a normal mode, e.g., for a primary driver such as an experienced driver that has become familiar with the driver application 414, and a training mode, e.g., for a substitute driver such as a new driver to use the driver application 414. In the normal mode, the driver application 414 provides flexibility for a driver to automatically or manually perform actions. In the training mode, the driver application 414 prohibits some functions, e.g., the "one click" manually loading/unloading feature or alerts for unauthorized loading or unloading. The driver application 414 can also allow a primary driver to customize settings in the normal mode and prohibit a substitute driver to make customized settings in the training mode.

The driver application 414 on a bus can determine whether a driver logging in the driver application 414 is a primary driver for the bus or a substitute driver for the bus, e.g., based on the driver's identifier. If the driver application 414 determines the driver is a primary driver for the bus, the driver application 414 operates in the normal mode. If the driver application 414 determines the driver is a substitute driver for the bus, the driver application 414 operates in the training mode.

FIGS. 5A-5D show example processes that can be executed in accordance with implementations of the present disclosure. Each of the processes can be implemented by a bus system such as an onboard computing device in a bus. For example, each process can be implemented by the bus system 106 shown in FIGS. 1 and 4, e.g., by the driver application 414 of the bus system 106. The example processes can be implemented using additional, fewer, or different operations, which can be performed in the order shown or in a different order. In some implementations, one or more of the operations can be repeated or iterated, for example, until a terminating condition is reached.

Figure 5A:
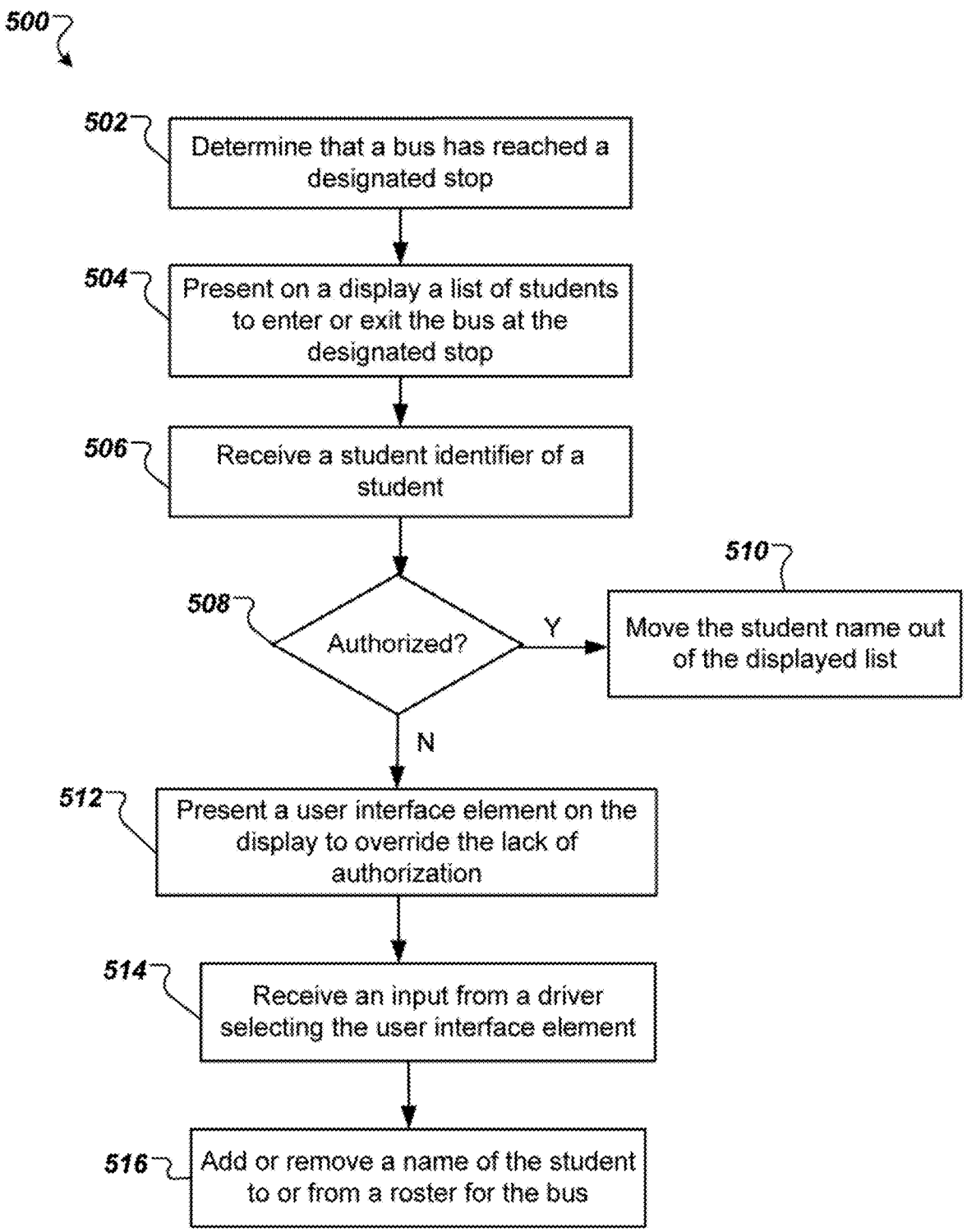
FIG. 5A is a flow diagram of an example process for tracking students at bus stops.

Referring to FIG. 5A, an example process 500 for tracking students at bus stops is shown. The bus system determines that the bus has reached a designated stop (502). A driver may drive the bus on a predetermined bus route that includes a number of sequential designated stops. Each designated stop is associated with a physical address. The bus system can use a locating system, e.g., the locating system 410 of FIG. 4, to monitor a current location of the bus. When a distance between the current location and the physical address of the designated stop is within a predetermined range, e.g., a 50-meter radius, the bus system can determine that the bus has reached the designated stop.

The bus system presents on a display a list of students to enter or exit the bus at the designated stop (504). The display can be a touch screen display of the bus system or an external monitor coupled to the bus system. Each of the list of students is associated with the designated stop. Information on the list of students can be pre-stored in the bus system, e.g., by downloading from a student accountability system, e.g., the student accountability system 102 of FIG. 1. The pre-stored information can include a student profile such as name, address, a photo, associated school/campus, grade, stop, and/or seat number/assignment in the bus, a medical profile, and/or assistance information. The information on the list of students can be provided by a school administrator, e.g., the school administrator 114 of FIG. 1. For example, the school administrator can schedule or determine which bus, which bus route, which stop, and/or which seat a student is associated with.

In some examples, the displayed list of students includes a list of students to enter the bus at the designated stop, e.g., when the bus picks up students to school in the morning. In some examples, the displayed list of students includes a list of students to exit the bus at the designated stop, e.g., when the bus drops off students back to home in the afternoon. In some examples, the displayed list of students includes a first list of students to exit the bus at the designated stop and a second list of students to enter the bus at the designated stop, e.g., when the first list of students gets back from morning classes and the second list of students goes to afternoon classes. The first list of students to exit the bus can be presented on top of the second list of students to enter the bus. Within the first or second list of students, names of the students can be in alphabetic order.

As discussed in further details below, the bus system can provide manually loading and/or unloading functionalities for the driver. For each student to exit the bus at the designated stop, the bus system can present a user interface element that the driver can select to manually exit the student. For each student to enter the bus at the designated stop, the bus system can present a user interface element that the driver can select to manually load the student.

As each student enters or exits the bus, the bus system receives a student identifier from a student identifier system of the student (506). The student identifier (ID) system can be the student ID system 112 of FIGS. 1 and 3. The student ID system can include a RFID module, e.g., the near field RFID module 304 or the active RFID 306 module of FIG. 3A. When a student enters or exits the bus, the student can present the student ID system to the bus system, and the bus system receives the student identifier from the student ID system, e.g., by using a RFID reader in the bus system or externally coupled to the bus system.

The bus system determines whether or not the student is authorized to enter or exit the bus at the designated stop (508). The bus system can pre-store information about the list of students. The pre-stored information can include respective student identifiers for the list of students. The bus system can determine whether or not a student is authorized to enter or exit the bus at the designated stop by determining whether the received student identifier associated with the student is in the pre-stored list of students.

If the bus system determines that the student is authorized to enter or exit the bus at the designated stop, the bus system can move a name of the student associated with the student identifier out of the list of students presented on the display (510). In such a way, the driver of the bus can focus on the other students that haven't entered or exited the bus. The bus system can also move the name of the student to a lower position in the list of students presented on the display. In some implementations, the bus system presents a visual indication or emits an audible indication to show that the student is authorized to enter or exit the bus at the designated stop.

In some implementations, the bus system presents a count on the display for indicating a total number of a list of students on the bus. When the bus system determines that the authorized student has entered or exited the bus at the designated stop, the bus system can add or remove the authorized student to the list of students on the bus. The presented count can dynamically increase or decrease correspondingly. In some implementations, the bus system presents another count on the display for a total number of students to enter or exit the bus at the designated stop. When a list of students that have entered or exited the bus is identical to the pre-stored list of students to enter or exit the bus at the designated stop, the presented list of students to enter or exit the bus at the designated stop can become zero. The bus system can also give a visual indication or an audible indication to the driver that loading or unloading students at the designated stop has successfully completed.

If the bus system determines that the student associated with the received student identifier is not authorized to enter or exit the bus at the designated stop, the bus system presents a user interface element on the display to override the lack of authorization (512). For a student to enter the bus, the bus system can present a user interface element, e.g., "load," for manually loading the student, and a user interface element, e.g., "do not load," for not manually loading the student. For a student to exit the bus, the bus system can present a user interface element, e.g., "unload," for manually unloading the student, and a user interface element, e.g., "keep on the bus," for manually keeping the student on the bus.

In some cases, the bus system determines that the student is not authorized by determining that a school associated with the received student identifier is different from a school associated with the bus. In some cases, the bus system determines that the student is not authorized by determining that a bus stop associated with the received student identifier is different from the designated stop. In some cases, the bus system determines that the student is not authorized by determining that the student associated with the received student identifier is suspended, e.g., during a time period.

In some implementations, the bus system presents a text label on the display to indicate a reason of the lack of authorization for the student, together with information of the student including a photo of the student, a name, and/or associated school or stop. The text label can be "wrong school," "wrong stop," or "suspended" with the suspended time period. The bus system can also alert the driver, e.g., by a visual indication, an audible indication, or emitting a flashing light.

The bus system receives an input from a driver selecting the user interface element (514). In some examples, the driver selects the user interface element by pressing the user interface element on the display. In some examples, the driver selects the user interface element by speaking to the bus system. The bus system can analyze what the driver speaks, e.g., by speech-to-text analysis, and determine that the driver selects the user interface element based on the analysis. The driver can select the user interface element to override the lack of authorization to allow the student to enter or exit the bus.

In response to determining that the bus system receives the input from the driver selecting the user interface element, the bus system adds or removes a name of the student associated with the received student identifier to or from a roster for the bus (516). The roster maintains a list of students associated with the bus, e.g., all the students who enter or exit the bus on a bus route. The driver can review the roster on the display. When an unauthorized student is allowed to ride the bus by the driver overriding the unauthorization, the bus system adds the unauthorized student into the roster. When an unauthorized student exits the bus, the bus system removes the unauthorized student from the roster. In such a way, the bus system keeps an up-to-date roster for the bus.

As noted above, the bus system presents a count on the display for a total number of a list of students on the bus. When the bus system determines that the unauthorized student has entered or exited the bus at the designated stop, the bus system can add or remove the unauthorized student to a list of students on the bus. The presented count can be correspondingly and dynamically increased or decreased.

As a student enters or exits the bus, the bus system may not receive a student identifier from a student identifier system of the student. For example, the student may forget to bring his/her student ID card or does not have a student ID card. The student can tell the driver his/her name. In some cases, the driver can view the displayed list of students to enter or exit at the designated stop and identify whether or not the student name is in the displayed list. The driver can also tap a button to view a list of eligible riders or a roster for the bus route to identify the student.

In some examples, the driver can type or speak the student name into the bus system. The bus system can search the student name in the list of students to enter or exit the bus at the designated stop. If the bus system finds the student name in the list of students, the bus system can present the student name to the driver. The bus system can receive an input from the driver selecting the student and present a photo of the selected student and/or other information associated with the student and a user interface element for manually loading or exiting the student. The driver can compare the student to the presented photo and determine whether or not to override the lack of authorization. If the bus system receives an input from the driver selecting the user interface element to manually load or exit the student, the bus system adds or removes a student identifier associated with the selected student from a roster for the bus without receiving the student identifier from a student ID system of the selected student.

In some cases, if the bus system cannot find the student name in the list of students, the bus system can search the student name in a roster for the bus that is stored in the bus system. If the bus system also cannot find the student name in the roster, the bus system can search the student name in a student accountability system via network connection.

In some cases, if the bus system cannot find the student name in the list of students associated with the designated stop, the roster for the bus, and the student accountability system, e.g., when the student is an anonymous rider, the bus system can store the student name and transmit the student name to the student accountability system for a school administrator or a transportation department staff to deal with. The school administrator or the transportation department staff can add a student profile for the student and assign the activity to the student at a later time. The driver can also get the student name and report it to the transportation department staff or the school administrator after the bus route is completed.

The bus system can present a user interface element, e.g., "anonymous load," for manually boarding the student. The bus system can receive an input from the driver selecting the user interface element and add the student name in the roster for the bus. Correspondingly, the bus system can update on the display a count indicating a total number of students including the student on the bus.

Besides the student name or instead of the student name, the bus system can take a photo of the student, e.g., by a camera in the bus system or an external camera, and use the photo to identify the student, e.g., by face recognition. The bus system can also take a thumbnail image of the student and use the thumbnail image to identify the student.

Figure 5B:
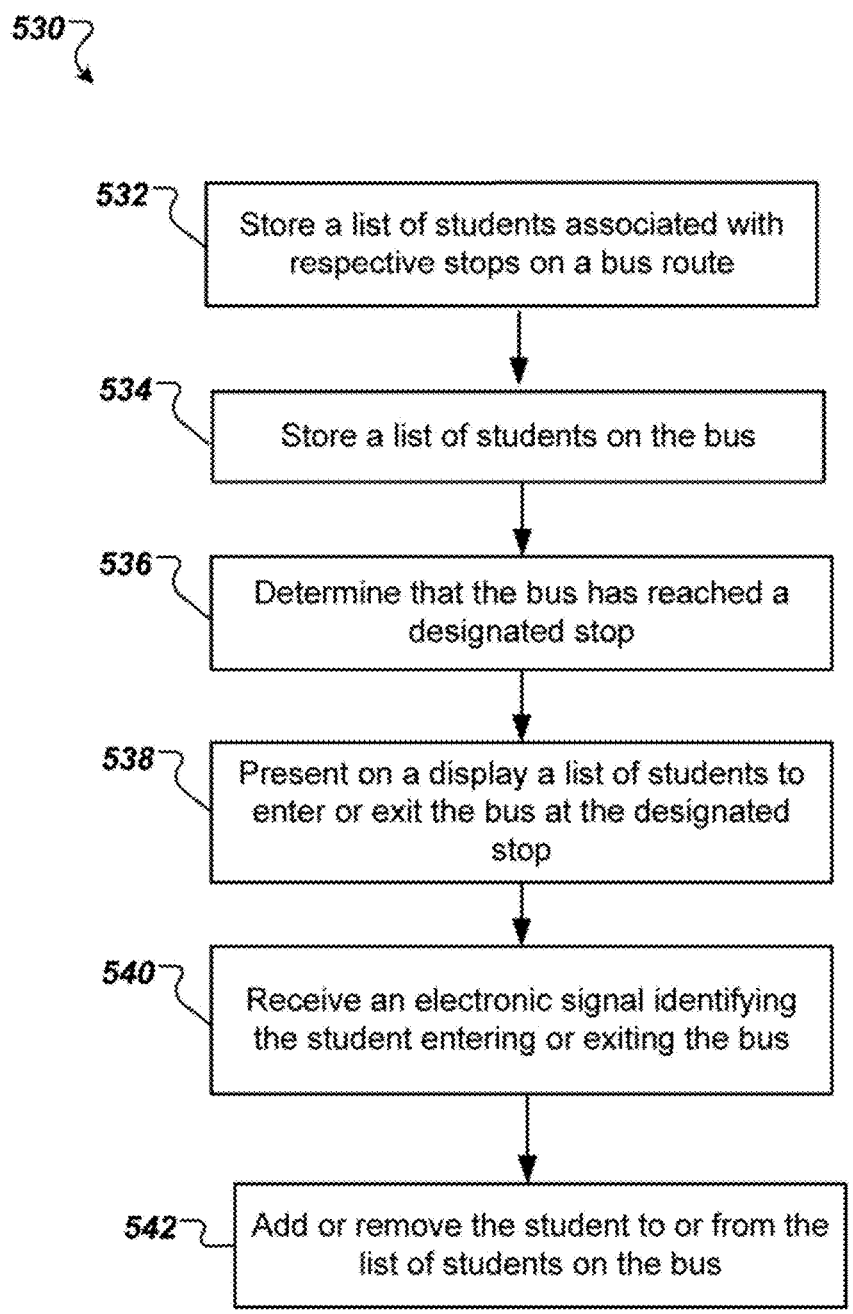
FIG. 5B is a flow diagram of an example process for tracking students on a bus.

FIG. 5B is a flow diagram of an example process 530 for tracking students on a bus. The bus system stores a list of students associated with respective stops on a bus route (532). The bus route can include a number of sequential designated stops. For each designated stop, there may be a list of students that is authorized or eligible to enter or exit the bus. The bus system can store the list of authorized or eligible students associated with the respective stops, e.g., in a repository of the bus system. The bus system can receive and/or update the list of students from a student accountability system, e.g., the student accountability system 102 of FIG. 1.

The bus system stores a list of students on the bus (534). The list of students can enter (or board) the bus at school or at previous designated stops of the bus route. The list of students can include authorized (or eligible) students associated with the bus route or with previous designated stops. The list of students can also include unauthorized students and/or anonymous students that are manually loaded by a driver of the bus. The unauthorized students and/or anonymous students can be temporarily assigned to the last designated stop on the bus route. The bus system can present a count on a display indicating the total number of the list of students on the bus.

The bus system determines that the bus has reached a designated stop (536). As noted above, the bus system can use a locating system, e.g., the locating system 410 of FIG. 4, to monitor a current location of the bus and determine whether a distance between the current location of the bus and the designated stop decreases to within a predetermined range. If the bus system determines that the distance is within a predetermined range, the bus system then determines that the bus has reached the designated stop.

The bus system presents on the display a list of students to enter or exit the bus at the designated stop (538). As discussed above, the bus system can present on the display a list of students associated with the designated stop, including a list of inbound students to enter the bus and/or a list of outbound students to exit the bus. For each of the list of inbound students, the bus system presents a name of the student and/or a photo of the student. The bus system can also present a user interface element, e.g., "LOAD," next to the student name, for manually loading the student. For each of the list of outbound students, the bus system presents a name of the student and/or a photo of the student. The bus system can also present a user interface element, e.g., "UNLOAD," next to the student name, for manually unloading the student. The "UNLOAD" user interface element may be distinguished from the "LOAD" user interface element, e.g., by using different colors.

The list of outbound students to exit the bus at the designated stop can be presented on top of the list of the inbound students to enter the bus at the designated stop. In such a way, student loading/unloading efficiency can be improved. Within the list of outbound students and/or inbound students, the students can be sorted in alphabetic order of their respective names.

In some implementations, the bus system automatically presents the list of students associated with the designated stops on the display, e.g., when the bus system determines that the bus is approaching the designated stop by a locating system such as GPS. Other designated stops can remain collapsed without displaying respective students. In some implementations, the bus system presents a list of sequential stops that remain collapsed on the display, e.g., when the bus system cannot receive a location from the locating system. The bus system can present, for each stop, a user interface element, e.g., "+" or "−", for expanding a list of students or collapsing a list of students associated with the stop. The bus system can receive an input from the driver selecting a particular stop, e.g., by clicking the "+" user interface element for the particular stop, and present a list of students associated with the particular stop on the display.

As each student enters or exits the bus, the bus system receives an electronic signal identifying the student entering or exiting the bus (540). As noted above, the student can present a student identifier system, e.g., the student ID system 112 of FIG. 3A, to an identifier reader that is included in the bus system or externally coupled to the bus system. The student identified system can include a RFID identifier and the identifier reader can include a RFID reader. The bus system can receive the RFID identifier from the identifier reader and identify whether the student is in the list of students associated with the designated stop.

In response to determining that the student is in the list of students, the bus system adds or removes the student to or from the list of students on the bus (542). If the bus system identifies a student exiting the bus at the designated stop, the bus system removes the student from the list of students on the bus. Correspondingly, the bus system decreases the count for the number of students on the bus on the display by one. If the bus system identifies a student entering the bus at the designated stop, the bus system adds the student into the list of students on the bus. Correspondingly, the bus system increases the count for the number of students on the bus on the display by one. In some implementations, the bus system moves a feature associated with the identified student, e.g., a name of the student, to a different position on the display, e.g., a lowered position, or out of the list of students presented on the display.

In some cases, the bus system receives an input from a driver selecting a student. For example, the student forgets to bring his/her student ID system. The driver can find the student in the displayed list of students or in a roster for the bus or in a student accountability system, e.g., by a student name or a photo or a thumbnail image of the student. In response to receiving the input from the driver selecting the student, the bus system can display a student profile of the student, including a photo of the selected student, and a user interface element for manually loading (or boarding) or unloading (or exiting) the student. In response to receiving an input from the driver selecting the user interface element, the bus system can add or remove the student to or from the list of students on the bus.

In some cases, as a student enters the bus, the bus system receives a signal identifying that the student is not associated with the list of students to enter the bus at the designated stop, e.g., the student is associated with a different stop, a different school, or in a suspended state. The bus system can present a manual load user interface element on the display. The driver can then decide whether or not to manually load the student.

In some cases, as an anonymous student enters the bus, the bus system cannot identify the anonymous student in a roster for the bus and/or a student database. The bus system can present an anonymous load feature on the display for the driver to manually load the anonymous student. In response to determining that the driver selects manually loading the anonymous student, the bus system adds the student into the list of students on the bus. Correspondingly, the bus system increases the count for the number of students on the bus on the display by one. The anonymous student can be associated with the designated stop or associated with the last stop on the bus route. When the anonymous student exits the bus, the bus system can present an anonymous unloading user interface element on the display. In response to determining that the driver selects manually unloading the anonymous student, the bus system removes the student from the list of students on the bus. Correspondingly, the bus system decreases the count for the number of students on the bus on the display by one.

In some implementations, the bus system monitors boardings of identified students at each designated stop on the bus route over a predetermined number of route completions. Based on the predetermined number of route completions, e.g., within 30 days or any number of days as determined by a school district, the bus system can automatically determine which students are active riders and which students are inactive riders and alter the list of students associated with the designated stops. When the bus system determines that the bus has reached a designated stop, the bus system can display only a list of active riders associated with the designated stop.

In some implementations, a student accountability system determines a list of active riders and inactive riders. For example, at the beginning of a school year, all eligible riders are considered as active riders. After a period of time, e.g., 30 days or any number of days as determined by a school district, the ridership history is analyzed. Students who have not ridden will no longer be considered as active riders. The student accountability system can update the list of active riders to the bus system. The bus system can still keep a complete list of eligible students including both the active riders and the inactive riders. In some cases, when an inactive rider is boarding the bus at the designated stop at a later time, the bus system may determine that the rider is not in the list of active riders presented on the display but is authorized to board the bus at the designated stop, e.g., in the complete list of eligible students. In response, the bus system can add the rider into the list of active riders.

When a student exits the bus, the bus system can receive an electronic signal from a student ID system associated with the student and determine that the student is authorized to be picked up by one or more release authorization restrictions, e.g., parents and/or guardians. The bus system can display names of the release authorization restrictions and an indication of the release authorization restrictions relationship to the student, e.g., "Mother", "Father", or "Uncle." The bus system can also present a release input user interface element for releasing the student and/or another user interface element for keeping the student on the bus. In some examples, the bus system presents a release input user interface element for each of the release authorization restrictions. In response to determining that the driver selects one of the release authorization restrictions, the bus system can record that the selected release authorization restriction picks up the student with a timestamp.

In some cases, the bus system pre-stores information for the release authorization restrictions including names, photos, and other identifiers. The driver can check the photo to a person that requests to pick up the student and determine whether the person is one of the release authorization restrictions. In some cases, the driver can request the person to present his/her identifier, e.g., a driver license. The driver can determine the person is one of the release authorization restrictions and manually release the student to the person. In some cases, the bus system receives an electronic signal from an identifier system of the person, e.g., a RFID identifier, and determines an identifier of the person from the electronic signal. The bus system can determine that the identifier of the person is associated with one of the release authorization restrictions, and in response, present an authorization indication on the display to indicate that the person is authorized to pick up the student.

The bus system can use a locating system to keep monitoring a current location of the bus. When the bus system determines that the distance between the current location and the designated stop is increasing, the bus system determines that the bus is leaving or pulling away from the designated stop. In some implementations, the bus system determines that the bus is leaving the designated stop by receiving an input from an accelerometer or a door sensor indicating the door is closed. The onboard computing device can include the accelerometer to monitor a door open/closed event. The door sensor, e.g., a door open/close sensor mounted on the door, can be connected to the onboard computing device, e.g., through a wired connection or a short-range wireless connection.

In response to determining that the bus is leaving the designated stop, the bus system can automatically change to a driving mode. The bus system can update on the display a count indicating a total number of the list of students on the bus, e.g., a "on bus" number. The bus system can also automatically determine a next stop subsequent or sequential to the designated stop on the bus route and present a count indicating a total number of a list of students to enter or exit, e.g., a "drop off" (or "unloading") number and/or a "pick up" (or "loading") number. The bus system can also automatically and dynamically present a scheduled or estimated arrival time to the next stop, together with an address of the next stop.

In some cases, if a designated stop is skipped by the driver, e.g., on purpose or by accident, the bus system can automatically skip the designated stop and present information on the next designated stop. The bus system can also provide a user interface element on the display for the driver to skip a designated stop on the bus route.

The bus system can track students in a bus transfer. For example, if an original bus or a driver is unable to complete a route during an emergency event such as breakdown, accident, or illness. The bus system on the bus can execute a bus transfer process. The bus system can maintain a list of identified students on the bus when arriving at a bus transfer location. The bus system can transfer the list of identified students on the bus to a second bus system, e.g., a mobile computing device, on a second bus at the bus transfer location, e.g., via network connection or near-field communication. The second bus system can present on a display the list of identified students.

As each student enters the second bus, the second bus system can receive an electronic signal identifying the student entering the second bus. The second bus system determines whether the identified student is in the list of identified students transferred from the bus system to the second bus system. In response to determining that the identified student is in the list of identified students, the second bus system can present on the display a visual indication or emit an audial indication to indicate that the identified student has successfully entered the second bus. In some implementations, the second bus system compares a list of identified students that have entered the second bus to the transferred list of the identified students. If the second bus system determines that the list of identified students that have entered the second bus is identical to the transferred list of the identified students, the second bus system determines that the bus transfer is completed. If the second bus system determines that the list of identified students that have entered the second bus is not identical to the transferred list of the identified students, the second bus system determines that the bus transfer is not completed and determine which students still have not entered the second bus.

The bus system can also track students in a transfer to a school paraprofessional as discussed above and below. The bus system can transfer a list of identified students to a mobile computing device of the school paraprofessional assigned to the bus. The school paraprofessional can use a paraprofessional application on the mobile computing device to check in the transferred students and/or to release the students to authorized parents/guardians.

Figure 5C:
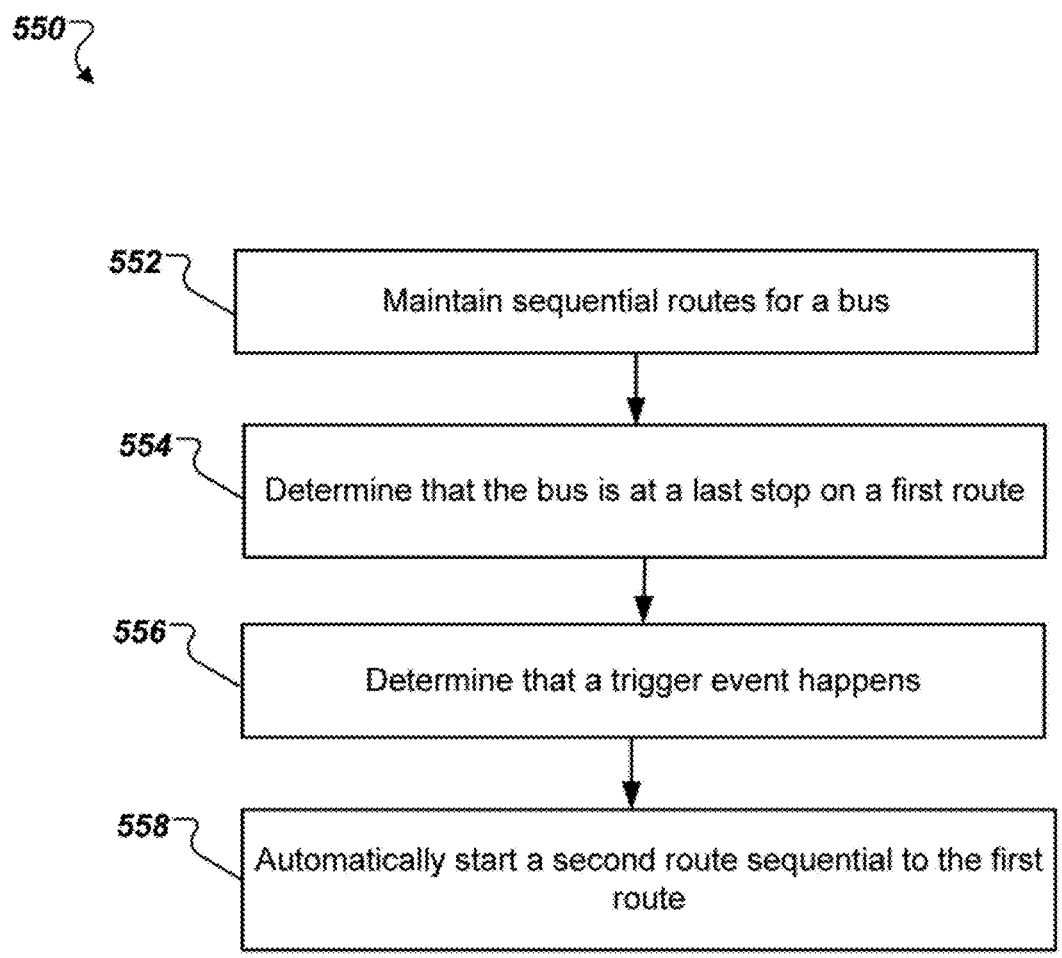
FIG. 5C is a flow diagram of an example process for automatic route transitioning.

FIG. 5C is a flow diagram of an example process 550 for automatic route transitioning. The bus system maintains sequential routes for a bus (552). Each route can include a list of sequential designated stops. The bus system can also store a list of students assigned to each designated stop, e.g., to enter or exit at the designated stop. For example, suppose that the bus covers two routes in a morning, one to an elementary school and one to a middle school. After all of the students have been dropped off at the elementary school, the bus driver starts driving the route for the middle school students.

The bus system determines that the bus is at a last stop on a first route (554). For example, the bus system can use a locating system, e.g., the locating system 410 of FIG. 4, to determine that a current location is at the last stop on the first route. The bus system determines that a trigger event for route transitioning happens (556), and in response to determining that the trigger event happens, the bus system automatically starts a second route sequential to the first route for the bus (558). The bus system can load route data for the second route, including a list of sequential stops and a list of students associated with each of the list of sequential stops. The bus system can present a notification on a display to indicate that the first route is completed and the second route is started.

In some examples, the bus system determines that the bus is pulling away from the last stop, e.g., by using the locating system or by using an accelerometer or a door sensor, which can trigger the route transition to the second route. In some examples, the bus system determines that a number of a list of students on the bus at the last stop is zero. That is, all the students associated with the first route get off the bus. The bus system can then start the second route.

In some examples, the bus system determines that the number of the list of students on the bus at the last stop is larger than zero, e.g., there are still one or more students on the bus. The bus system can perform an alert action to alert the driver that there are still one or more students on the bus. The driver needs to decide whether each of the students on the bus is associated with the first route or with the second route. The bus system can present on the display a list of students on the bus and present, for each of the list of students, a user interface element for manually exiting the student and/or another user interface element for keeping the student on the bus. For example, if the student is associated with the last stop on the first route, the driver can select the user interface element to manually exit the student. If the student is associated with a particular stop on the second route, the driver can select the user interface element to keep the student on the bus. After the driver performs an action for each of the one or more students on the bus, the bus system can prompt a window to a driver. The window includes a user interface element for approving a route transition. In response to receiving an input from the driver selecting the user interface element, the bus system can automatically start the second route.

In some examples, if a student is boarding the bus at the last stop, the bus system receives a student identifier from a student ID system associated with the student and determines that the student is associated with the second route. If the bus system also determines that the student boards the bus at a time within a predetermined time period (e.g., 5 minutes) before a start time of the second route, the bus system can be triggered to automatically start the second route. In some examples, the bus system can also be triggered to automatically start the second route simply by determining that a start time of the second route approaches.

Figure 5D:
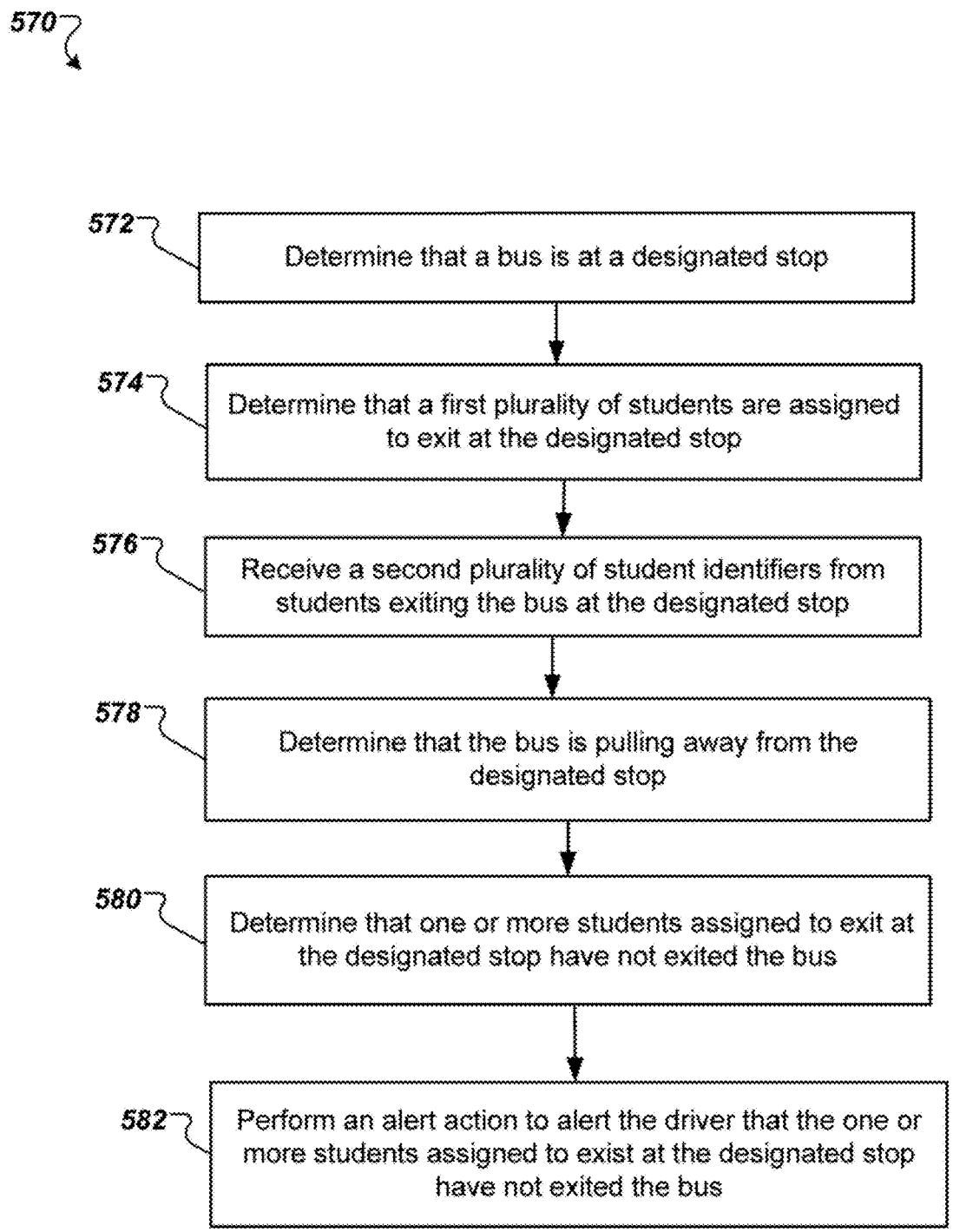
FIG. 5D is a flow diagram of an example process for alerting bus drivers.

FIG. 5D is a flow diagram of an example process 570 for alerting bus drivers. The bus system determines that a bus is at a designated stop (572). The bus system can use a locating system, e.g., the locating system 410 of FIG. 4, to monitor the current location of the bus. The bus system can also use an accelerometer or a door sensor to determine a door open event to determine that the bus is at the designated stop. The bus system determines that a first plurality of students are assigned to exit at the designated stop (574). When each student exits the bus, the bus system receives a student identifier associated with the bus. The bus system receives a second plurality of student identifiers from the students exiting the bus at the designated stop (576).

The bus system determines that the bus is pulling away from the designated stop (578). As noted above, the bus system can determine that the bus is pulling away or leaving the designated stop, e.g., by the locating system and/or by the accelerometer or the door sensor. The bus system determines whether one or more students assigned to exit the designated stop have not exited the bus (580). For example, the bus system can compare the second plurality of students that have exited the bus to the first plurality of students that are assigned to the designated stop. If the second plurality of students are less than the first plurality of students, the bus system can determine that there are one or more students that haven't exited the bus. In some examples, the bus system calculates a difference between the number of the first plurality of students and the number of the second plurality of students and dynamically presents the different on a display.

The bus system performs an alert action to alert the driver that the one or more students assigned to exit at the designated stop have not exited the bus (582). The alert action can include presenting a visual indication on the display, playing an audible indication, emitting a flash light, or activating an alarm system. The bus system can perform one or more alert actions simultaneously to alert the driver.

In some implementations, to prevent students getting left behind on the bus, a barcode or a sticker, e.g., a NFC sticker, is applied at the back of an interior of the bus. Prior to logging off the bus system, the bus system can require the driver to take the bus system to the back of the bus to tag the sticker or scan the barcode. The bus system can then record the event and upload to a student accountability system. In some cases, the driver can use the bus system to record a video during walking to back and front to check seats and floor, ensuring no student left on the bus. The bus system can optionally process the recorded video and upload the recorded or processed video to the student accountability system.

FIGS. 6A-1 to 6R show screen shots of an example GUI for a driver application and illustrate example functions that can be performed by the driver application. The driver application can be the driver application 414 of the bus system 106 of FIGS. 1 and 4.

FIG. 6A-1 is a view of the driver application GUI that can be displayed after a driver logs into the bus system. The driver can log in, e.g., by presenting an RFID driver ID to the ID system 412 of the bus system 106. The GUI displays a picture of the driver, an identifier for the bus and a number of routes that the bus system automatically loads for the driver based on the driver's ID. The bus system can load the routes from the student accountability system. The GUI can also display a button that takes the driver to a pre-trip inspection screen, e.g., that the driver uses while performing an inspection of the bus prior to driving a route. The GUI can also display a button that takes the driver to change bus and/or a button that takes the driver to change routes.

Figures 3, 6A:
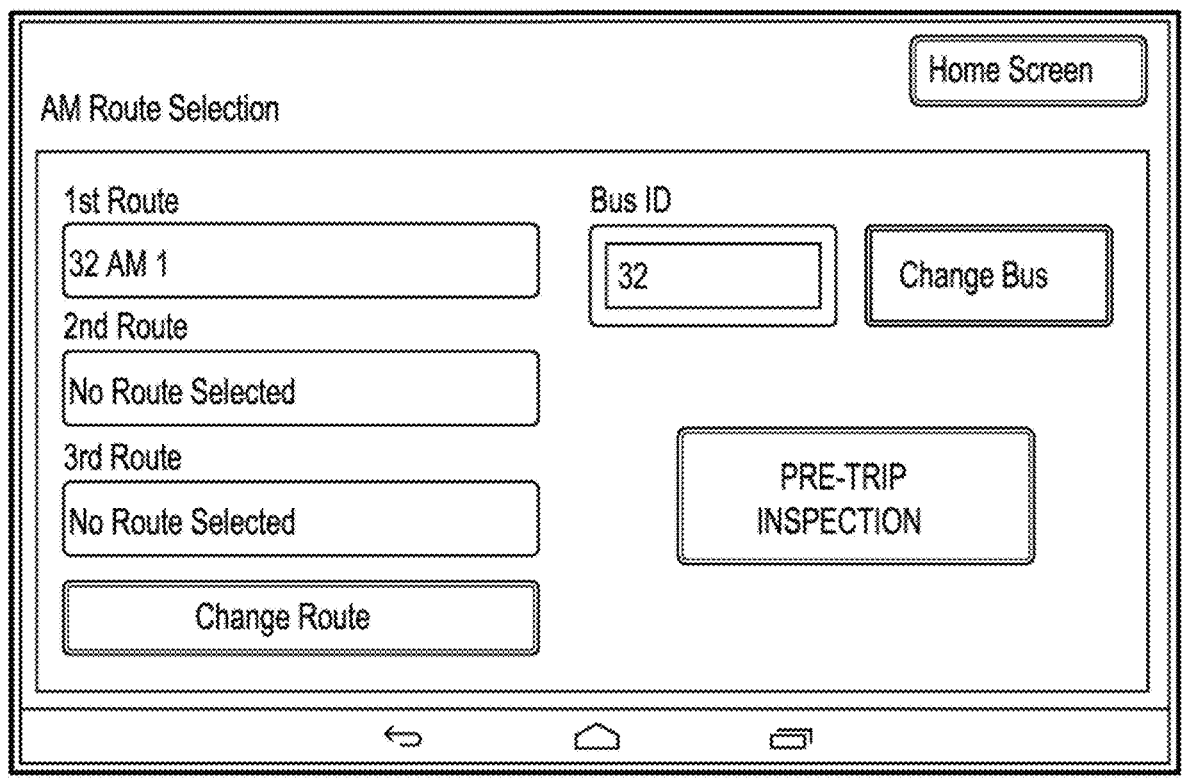

FIG. 6A-2 is a view displayed when the driver selects to change routes. The GUI provides a menu for the driver to select "AM" for routes in the morning and "PM" for routes in the afternoon. The GUI also allows the driver to manually input "BUS ID", a first route, and a second route sequential to the first route. FIG. 6A-3 is a view displayed when a primary driver logs into the bus system, showing his or her usual bus and route information, which can be automatically downloaded, e.g., from a student accountability system.

Figure 6B:
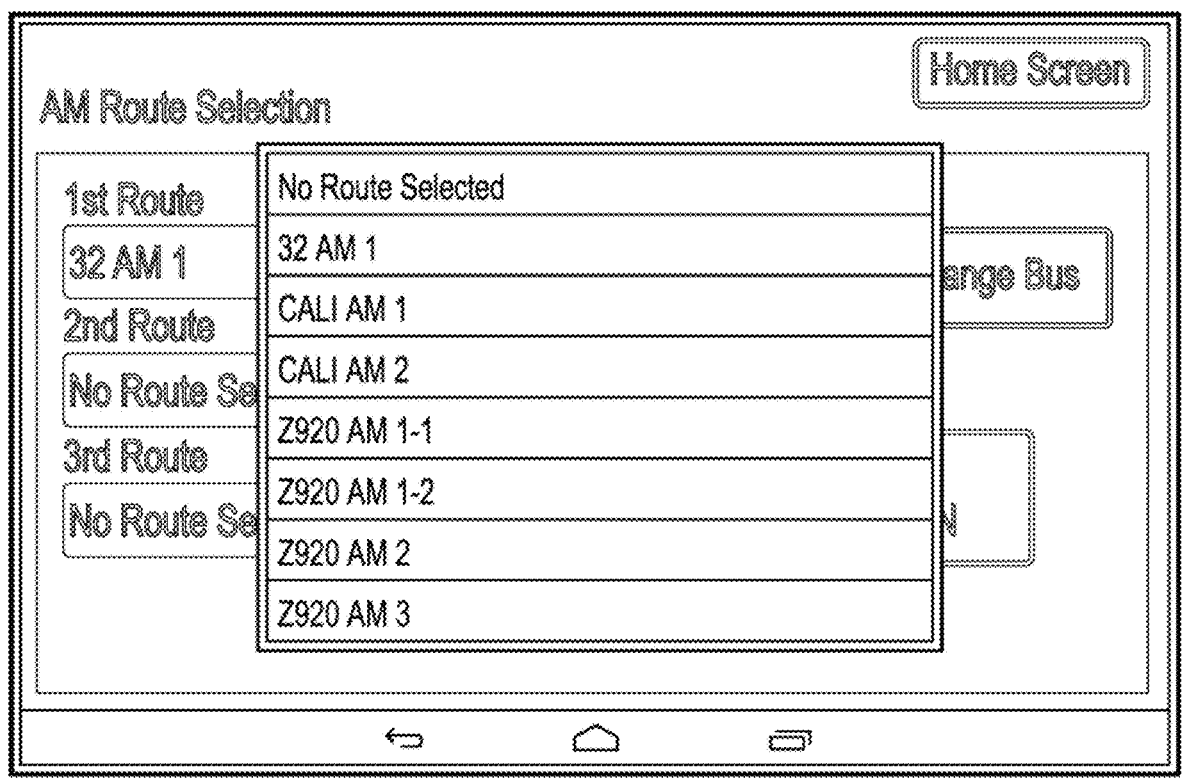

FIG. 6B is a view displayed when a substitute driver logs on to the bus system. Upon recognizing that the driver is a substitute driver, the driver application displays that no route is selected. The substitute driver can select a button to activate a pop-up window that displays a list of routes to choose from.

Figure 6C:
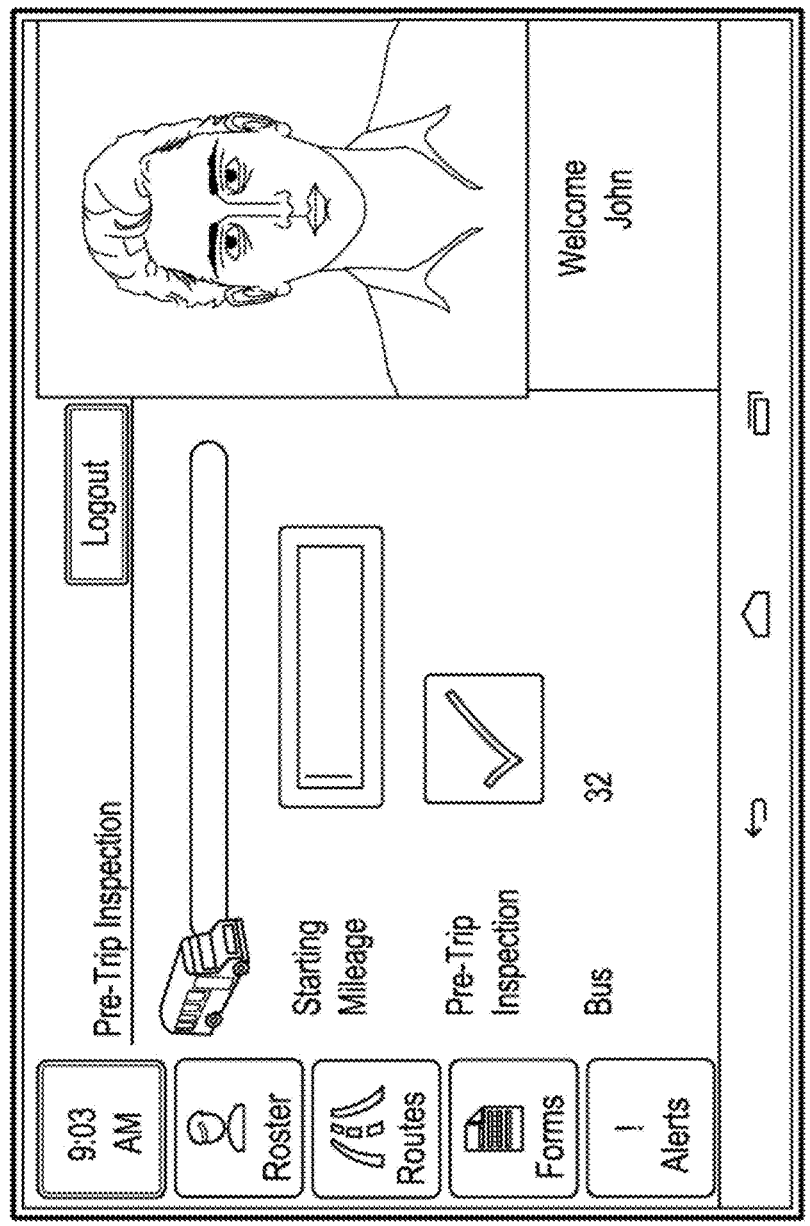

FIG. 6C is a view displayed when a driver selects the pre-trip inspection button of FIG. 6A-1 or FIG. 6A-3. The driver can perform the pre-trip inspection following procedures described in FIGS. 8A-8G and FIGS. 9A and 9B. The driver application can prompt the driver to enter certain information, e.g., the starting mileage of the bus and a starting fuel level of the bus. The driver can record or mark conditions of a number of components of the bus during the pre-trip inspection. A maintenance report or request can be automatically generated based on the recorded conditions.

Figures 2, 6D:
Figures 1, 6D:
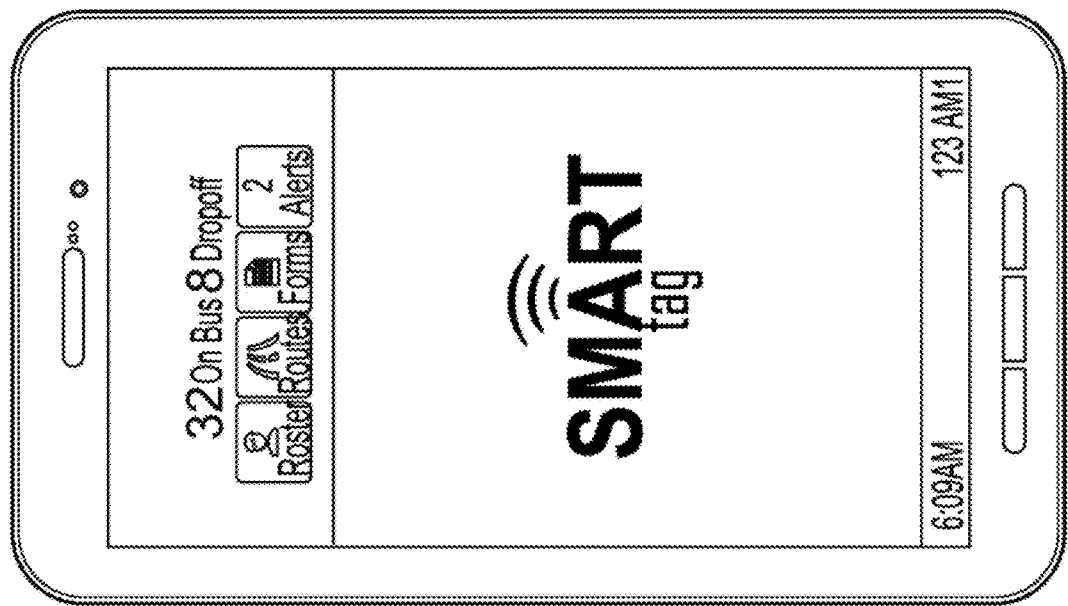

FIG. 6D-1 is a view of a home screen for the driver application. The home screen has a navigation bar with various buttons. The screen can also display the current time, which is useful to ensure that drivers are running on the correct time to improve fleet wide efficiency. Another button can display roster information; pressing the roster button enables a driver to view the student roster in different views. The navigation bar can also include buttons to access route data, forms, and alerts that have been sent to the bus system from the student accountability system.

FIG. 6D-2 is another view of a home screen for the driver application. The home screen shows a current bus route, e.g., at the bottom right of the home screen. The home screen also shows a count for a total number of a list of students on the bus and a count for a total number of a list of students to drop off (or exit) at a next stop. In some examples, the home screen can also show a count for a total number of students to enter the bus at the next stop.

Figures 1, 6E:
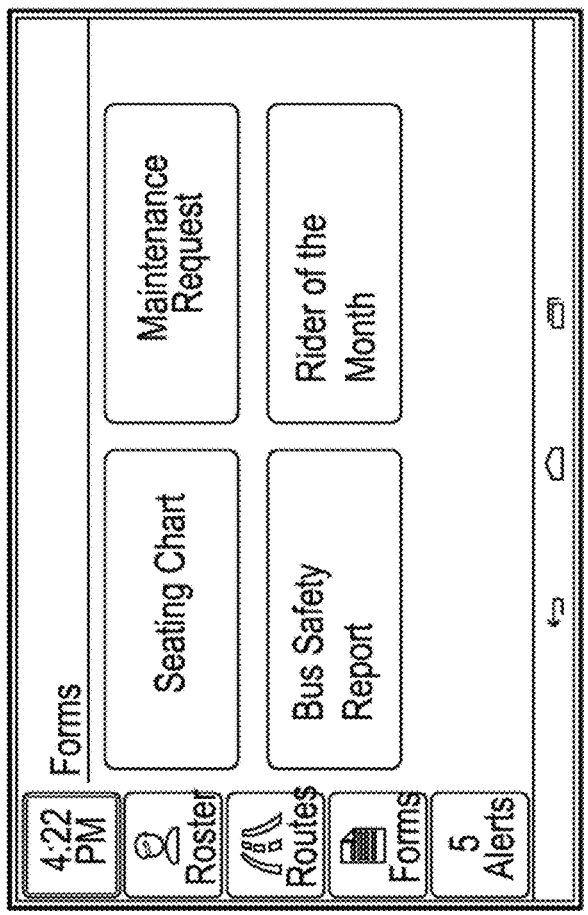
Figures 2, 6E:
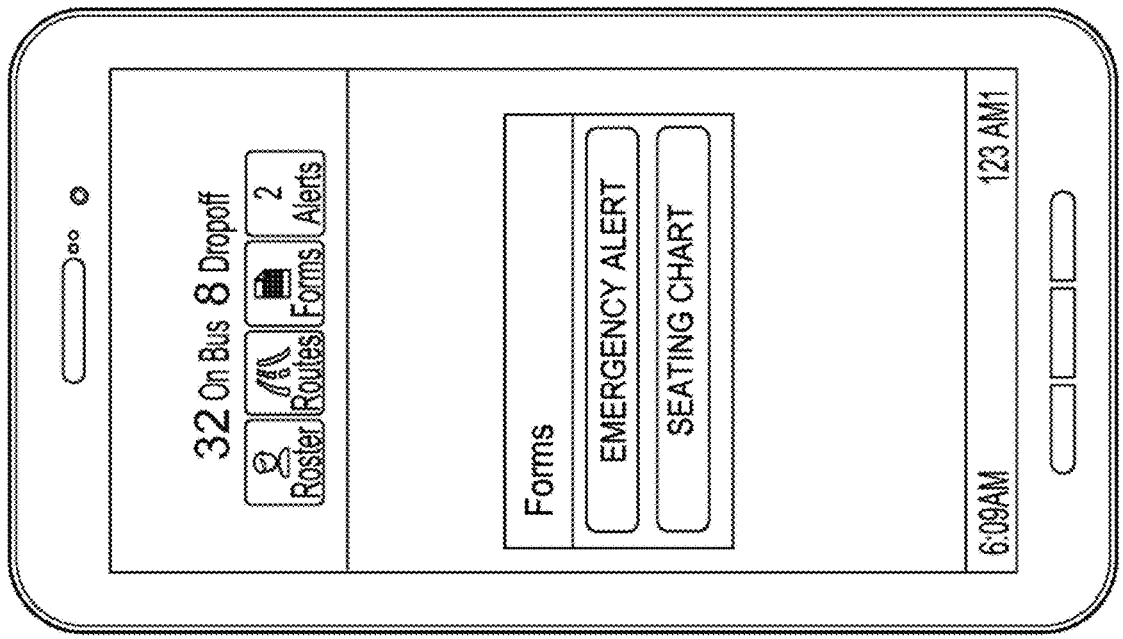

FIG. 6E-1 is a view of the display initiated when the driver selects the "forms" button from the navigation bar. A school system can populate the available forms with customized forms for the school system. For example, the driver can fill out bus safety reports and/or student discipline reports, generate or send maintenance request, review or customize a seating chart, or select a rider of the month for particular commendation.

FIG. 6E-2 is an alternate form display, with a button to allow the driver to review an emergency alert, e.g., from the school system or a transportation system, and/or submit an emergency alert, e.g., to the school system or a police department, such as in the event of vehicle damage, road construction, accidents, or bad weather conditions.

Figures 2, 6F:
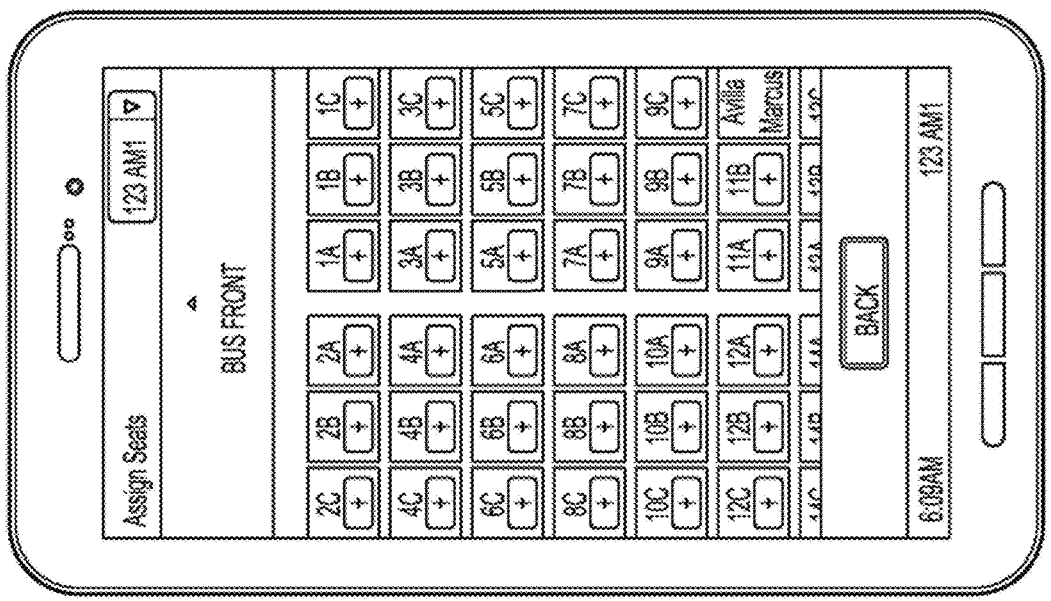
Figures 1, 6F:
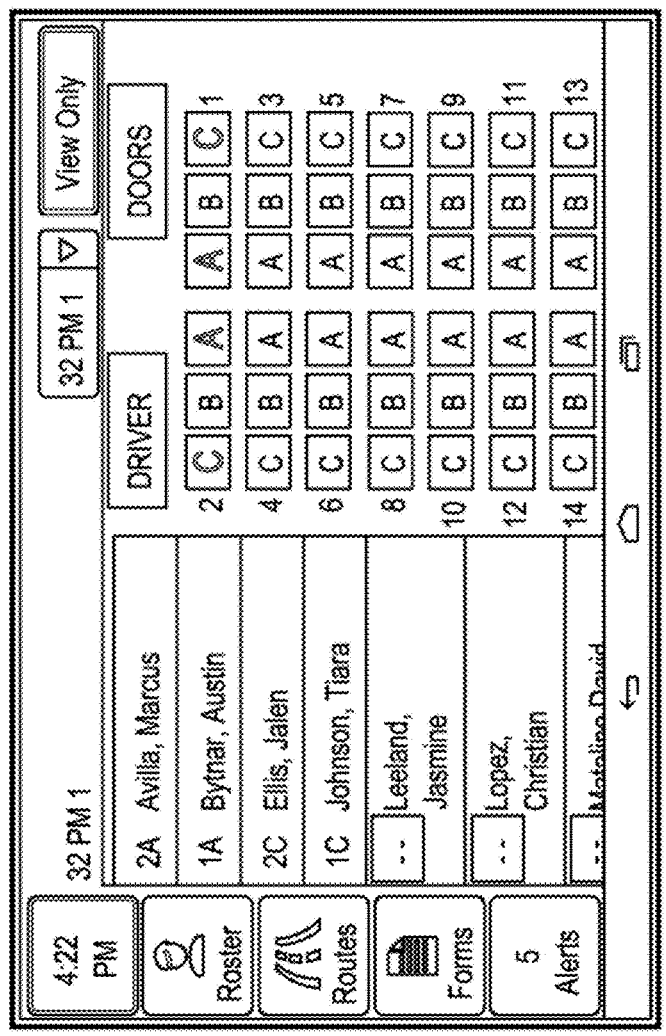

FIG. 6F-1 is a view displayed when the driver selects the "seating chart" button in the displayed "forms," showing a customizable seating chart for a current selected route. The GUI can also present a different seating chart for a different route that the driver selects in the GUI. A default seating chart can be automatically provided by the student accountability system. The driver can assign seats by dragging and dropping names from a list or tapping on a plus sign at each seat to open a window of the student roster and tap on the chosen student to assign the student to a particular seat on the bus. The driver application can then send an updated seating chart to the student accountability system. FIG. 6F-2 is an alternate view displayed when the driver selects the "seating chart" button in the displayed "forms".

Figures 2, 6G:
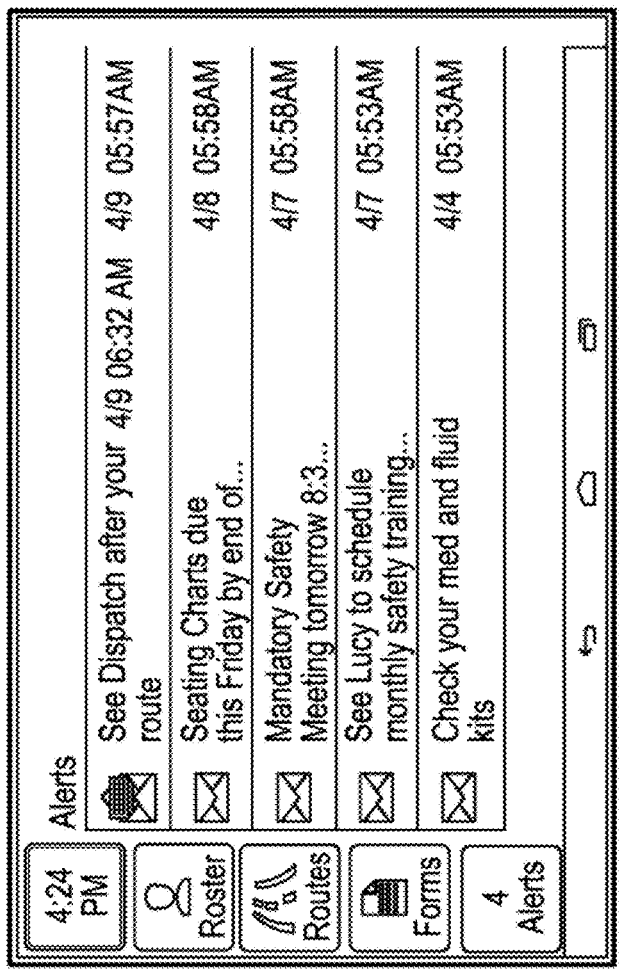
Figures 1, 6G:
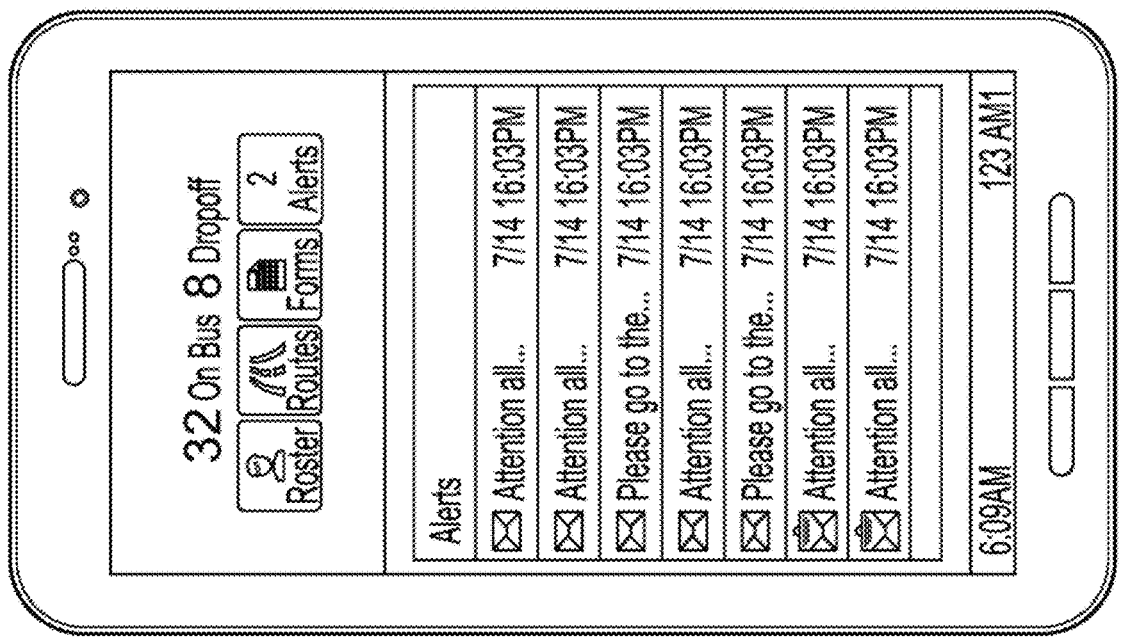

FIG. 6G-1 is a view displayed when the driver selects the "alerts" button from the navigation bar. The student accountability system can send the alerts to the bus system. The alerts can be displayed in a list of messages with indicators showing whether each of the messages have been read. For example, an unread message shows red, while a read message turns into gray. When the driver selects one of the messages from the list, the message is displayed. FIG. 6G-2 is an alternate view displayed when the driver selects the "alerts" button from the navigation bar.

The alerts can include different categories of messages. In some examples, the alerts include messages targeted to a specific driver. In some examples, the alerts include messages targeted to whomever is driving a route or associated with the route (e.g., a school administrator). In some examples, the alerts include messages targeted to whomever is transporting or has relevant cause to see messages related to a student (e.g., a school administrator). The alerts can be configured to be presented to minimize driver confusion and maximize user-friendliness factor, e.g., by sorting and prioritizing and/or visual differentiation through color and/or symbol.

FIG. 6H-1 is a view displayed when the driver selects the "routes" button from the navigation bar. The view displays a list of stops for a current route. The driver application can use a location system, e.g., the location system 410 of FIG. 4, to determine the location of the bus and highlight a current stop on the list corresponding to the bus's location. At a glance, drivers can know what the next stop is and what time they should be there. The GUI can also include a "map" button that presents the list of stops on a map when clicked. FIG. 6H-2 is an alternate view displayed when the driver selects the "routes" button from the navigation bar. A driver can select a particular route to present a list of stops for the selected route in the GUI.

Figures 1, 6I:
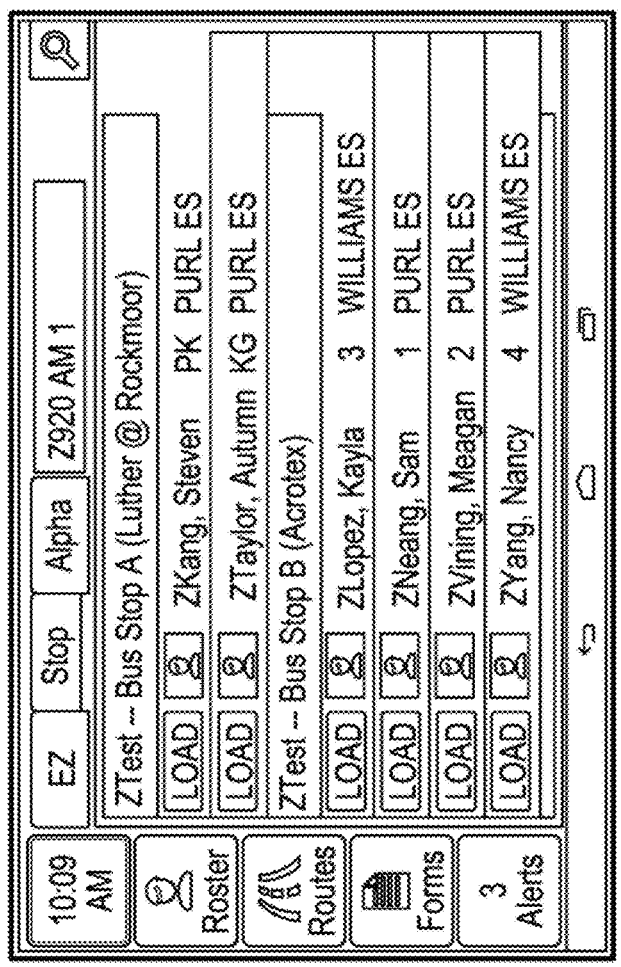
Figures 2, 6I:
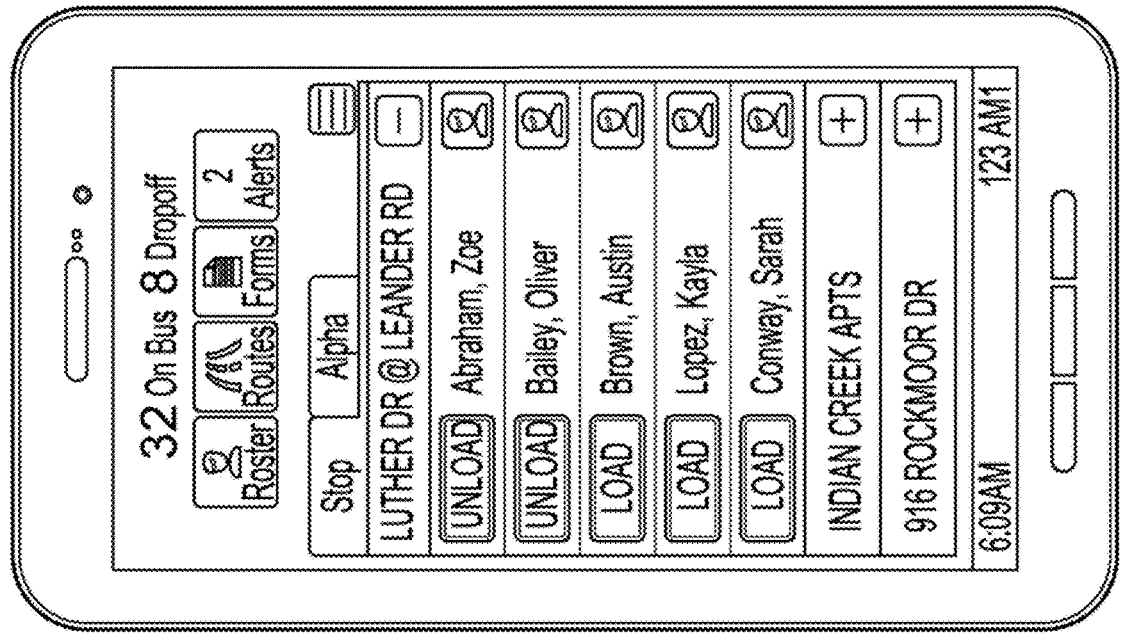

FIG. 6I-1 is a view displayed while students are boarding. From the view, the driver can select one of different types of views. In an "EZ" view, the driver sees a complete list of actual students riding the bus. From an "Alpha" view, the driver sees a complete list of eligible riders in alphabetic order. In some cases, the complete list includes both active riders and inactive riders. In some cases, the complete list can be changed to include ineligible riders such as anonymous riders. The driver can add the ineligible riders by manually loading. From a "Stop" view, which can be a default view, the driver sees a list of riders grouped by their designated stop. The current stop is presented on top of the other stops sequential to the current stop in the bus route. A "load" button can be presented for each of the students to enter the bus and the driver can manually load the student by clicking the "load" button. The GUI also provides a search box for the driver to search a student name or a bus stop.

FIG. 6I-2 is another view displayed when the bus is approaching or has reached a designated stop. The GUI can automatically present or expand a list of students to enter or exit the bus at the designated stop. The GUI presents a count indicating a total number of students to exit the bus at the designated stop, e.g., the number of "drop off" in the GUI. The GUI also presents a count indicating a total number of students on the bus, e.g., the number of "on bus" in the GUI. The total number of students on the bus can dynamically change while students enter or exit the bus. For each of the list of students presented on the GUI, the driver application can present an icon next to the name of the student. The driver can click the icon to view a profile of the student. The icon can be a photo of the student for the driver to identify the student when the student enters or exits the bus.

For each of the students to enter or board the bus, the GUI can present a "load" button for the driver to manually loading the student. For each of the students to exit the bus, the GUI can presents an "unload" button for the driver to manually unload the student. In some implementations, the list of students to board the bus are presented on top of the list of students to exit the bus. In some implementations, the list of students to exit the bus are presented on top of the list of students to board the bus. Within the list of students to board or exit the bus, the names of the students can be sorted in alphabetic order. The GUI also presents a list of sequential stops in collapsed view. The driver can click "+" button besides a particular stop to expand the list of students associated with the particular stop, or click "−" button to collapse the list of students associated with the particular stop.

As noted above, a list of students associated with a designated stop can be provided by the student accountability system. The list of students can include only active riders within a predetermined period of time. The driver application can keep monitoring boardings of identified students at the designated stop over a predetermined number of route completions and then automatically alter the list of students as a function of the monitored boardings following the predetermined number of route completions. In some examples, when a student boards at the designated stop, the driver application can determine that the student is an eligible rider or authorized to board the bus at the designated stop but that the student is not in the altered list of students. The driver application can then add the student to the altered list of students and/or submit the altered list to the student accountability system. In some examples, the student accountability system analyzes the boardings of the identified students and determines which students are active riders and/or which students are inactive riders and alter the list of students associated with the designated stop.

Figures 2, 6J:
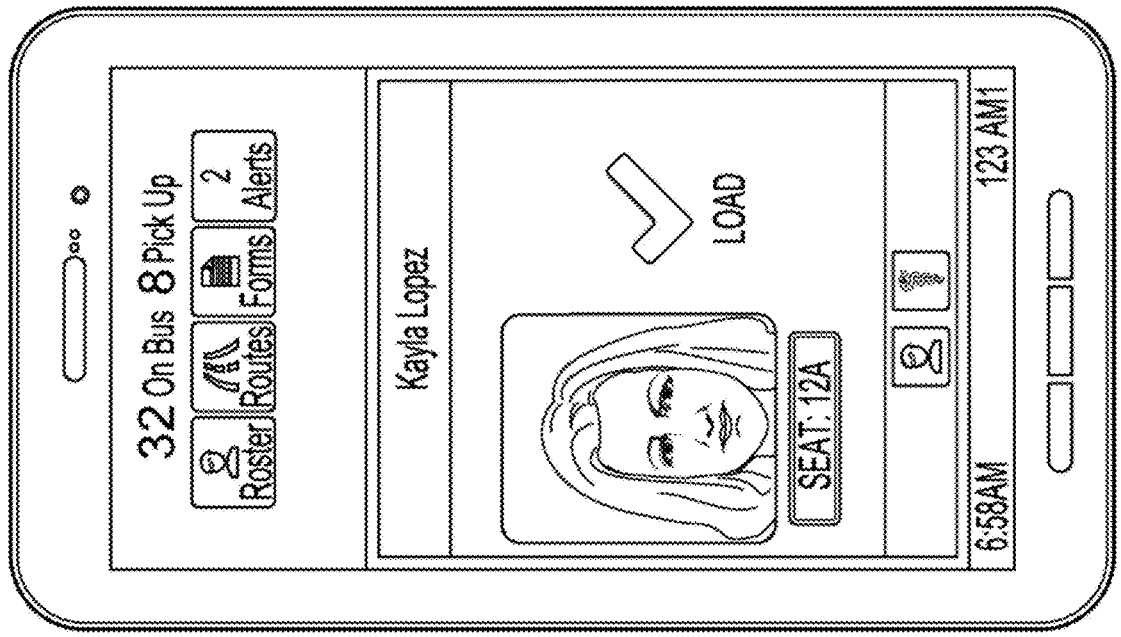
Figures 1, 6J:
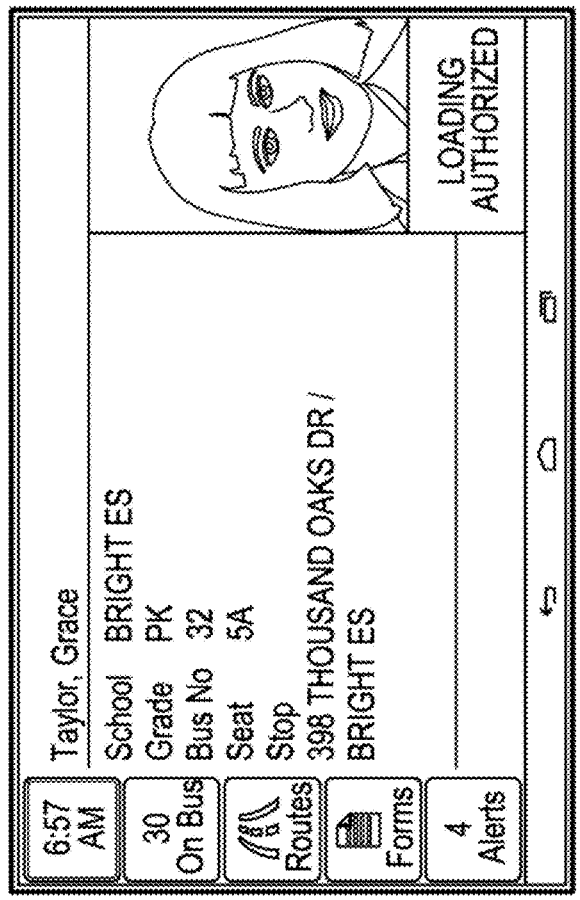

FIG. 6J-1 is a view displayed while students are boarding the bus. As a student presents a student ID system to the bus system, the bus system determines the student's ID and then checks that the student is authorized to ride the current route. The driver application can present visual indication, e.g., a text label "LOADING AUTHORIZED," to indicate that the student is authorized to ride. The driver application can also present the student's name, picture, seat assignment, assigned stop address, and other optional information. Presenting the student's name and picture can help the driver learn the students' names, which can be useful in preventing bad behavior on the bus. Presenting the student's assigned stop address can also help the driver verify that the student is picked up at the right address. The driver application can also present a count of the number of students on the bus that increases as students board the bus, or decreases as students exit the bus.

FIG. 6J-2 is another view of the driver application GUI that can aid drivers in making sure that a student is successfully boarding the bus at the correct stops. The view can show a photo of the student and a seat assignment for the student. The view also shows the number of students on the bus and the number of students to be picked up at the current stop.

Figures 1, 6L:
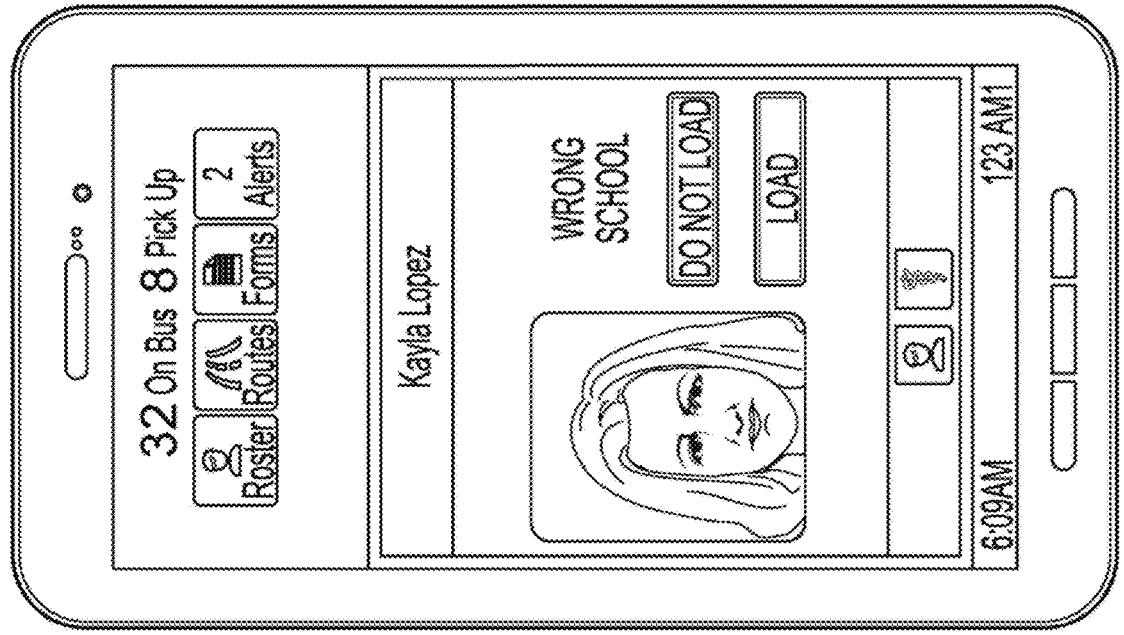
Figure 6K:
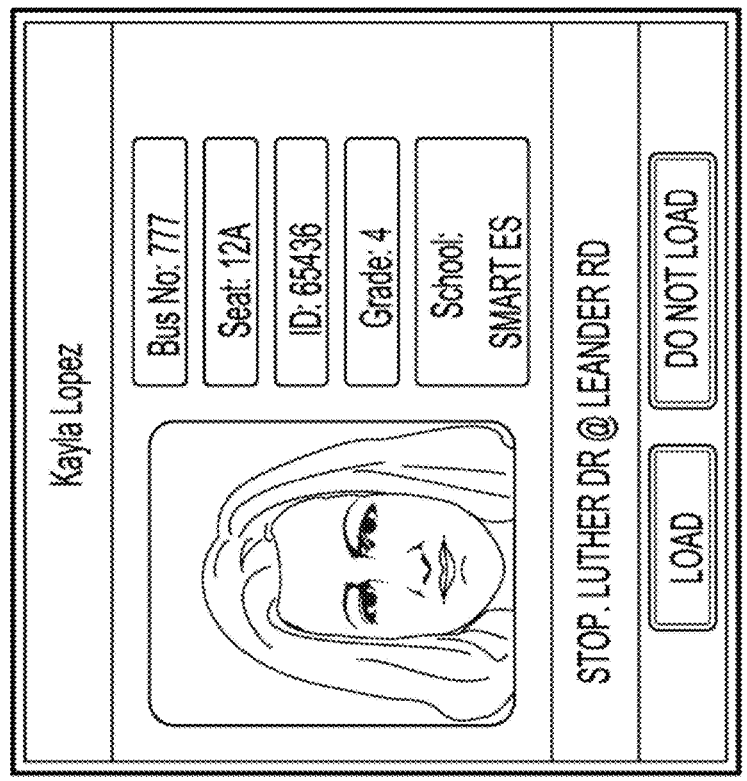
Figures 3, 6L:
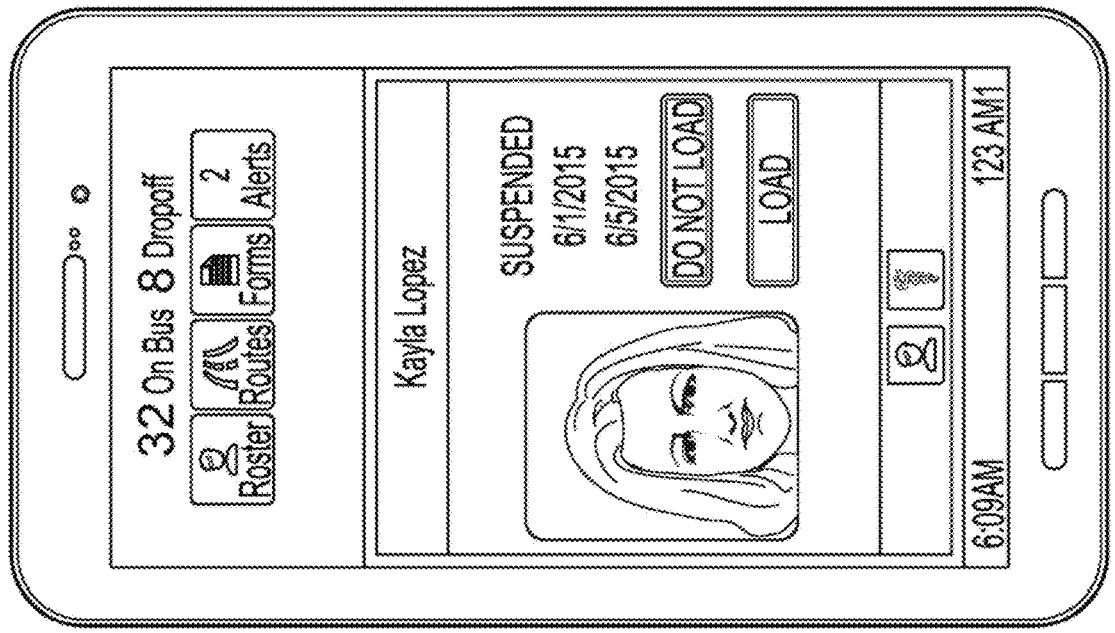
Figures 2, 6L:
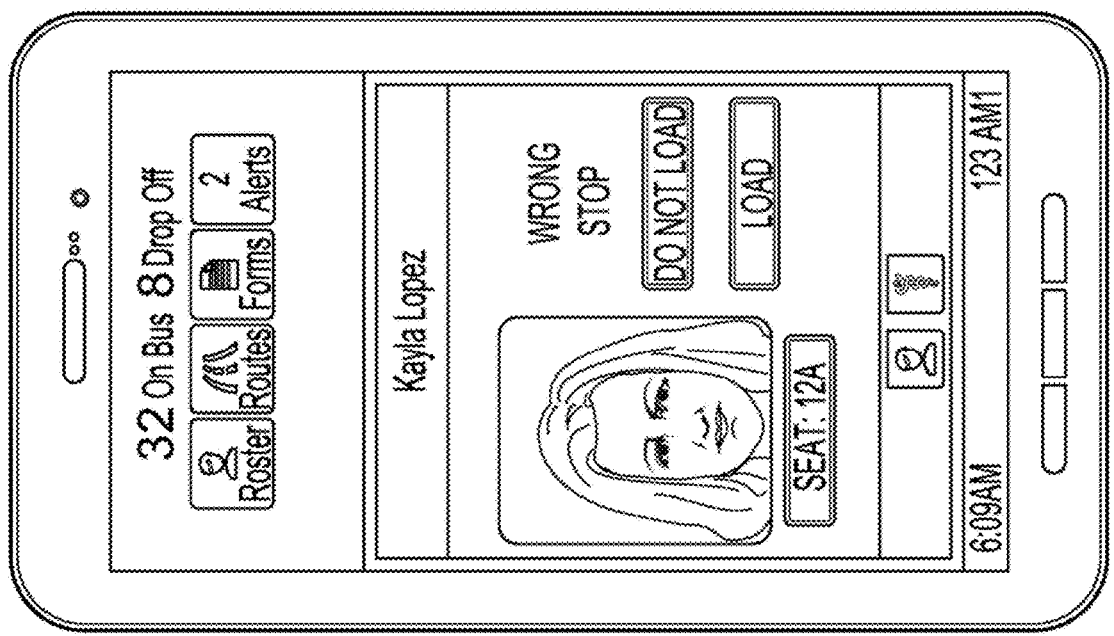
Figures 4, 6L:
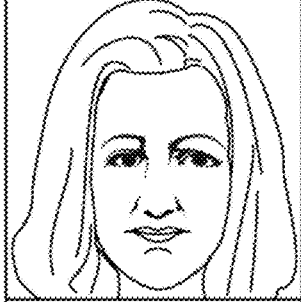

FIG. 6K is a view displayed when the driver application receives an input selecting one of a list of students presented on the display. For example, when a student is boarding the bus without a student ID system, the driver can check whether the student's name is in the list of students to enter the bus at the current stop. The driver can click the student's name to view the student's profile including the student's photo. The view also presents a "LOAD" button and a "DO NOT LOAD" button. The driver can choose whether to manually load the student or not load the student at the current stop. If the driver cannot find the student's name in the list of students presented on the display, the driver can select the "roster" button to see whether the student's name is in the list of eligible students for the route.

FIG. 6L1 to 6L3 are views displayed when an unauthorized student boards the bus. When an unauthorized student boards, the bus system can perform one or more alert actions, including playing an alarm sound and displaying a visual indicator on the screen to show that the student is unauthorized, e.g., presenting a box under the student's photograph that turns red using a red background for the unauthorized student. The view can also present a text label showing a reason for the lack of authorization, e.g., "wrong school," "wrong stop," or "Suspended" with a suspended time period. The driver application can present buttons "LOAD" and "DO NOT LOAD" to allow the driver to manually load the unauthorized student or not load the unauthorized student. When the driver selects the "LOAD" button, the student is added to the roster so that the driver application can account for the student when the students are exiting the bus. FIG. 6L-4 is an alternate view display when an unauthorized student boards the bus. The driver application presents buttons to allow the driver to cancel the boarding, e.g., if the student does not board, or to override the objection and allow the student to board. When the driver selects the override button, the student is added to the roster.

Figure 6M:
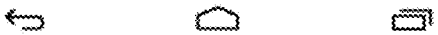

FIG. 6M is a view displayed when the driver selects a student to be manually loaded. The driver application displays the students photograph and a confirmation that the student is authorized. The driver can then confirm that the student should be manually loaded.

Figures 1, 6N:
Figures 2, 6N:
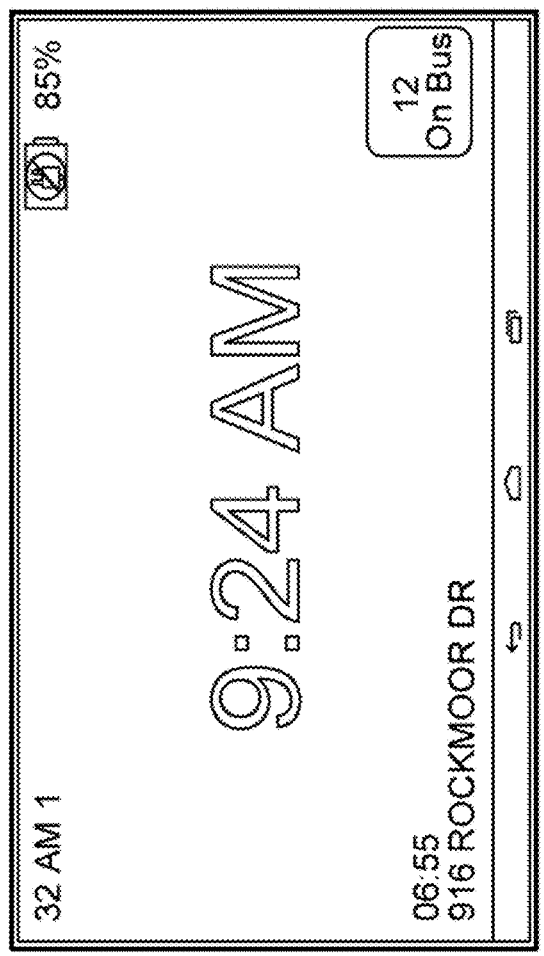

FIG. 6N-1 is a view displayed while the driver is driving the bus. As noted above, the driver application can determine that the bus is pulling away from a designated stop and towards a next designated stop and automatically present information of the next stop such as an address and a scheduled or estimated arrival time. The view also shows a current bus route, a current time, a count for a total number of students on the bus, and a count for a total number of students to be picked up or dropped off at the next stop. Keeping the drive mode view uncluttered can prevent the driver application from distracting the driver. FIG. 6N-2 is another alternate view displayed while the driver is driving the bus. In this "drive mode," the driver application can also display the route and battery life.

FIG. 6O-1 is a view displayed when a student is exiting the bus and the student is required to be released to a parent or guardian. When such a student presents a student ID system to the bus system, the driver application presents a list of authorized parents or guardians and optionally can also play an audio prompt to help draw the driver's attention. The driver can select one of the authorized persons from the list to release, cancel the unloading to keep the student on bus, or release the student without a guardian. The driver application records which parent or guardian picks up the student and record the event to report to the student accountability system. FIG. 6O-2 is an alternate view displayed when a student is exiting the bus and the student is required to be released to a parent or guardian.

Figures 1, 2, 6P:
Figures 6H-1, 6H-2:
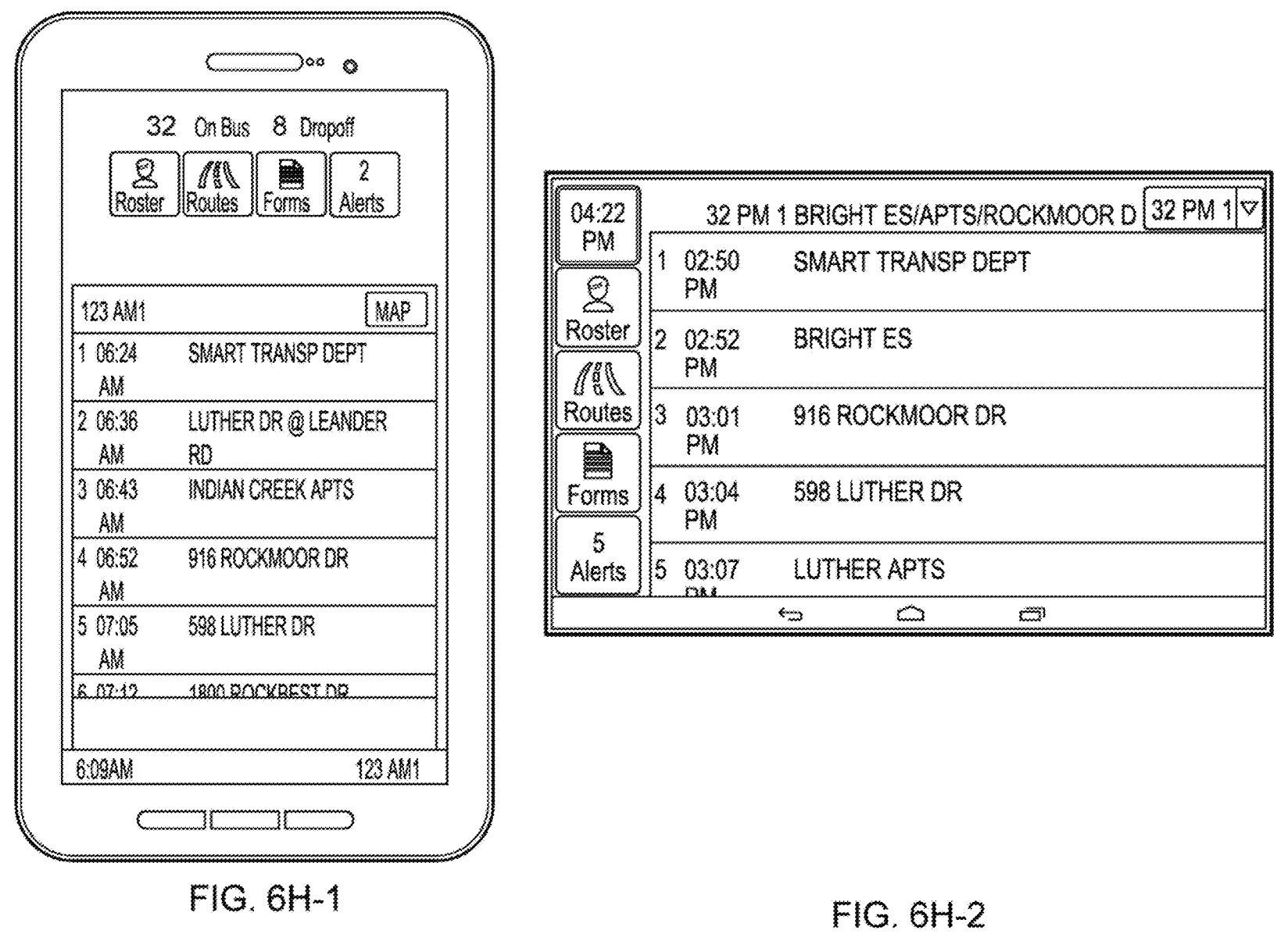
Figures 6O-1, 6O-2:
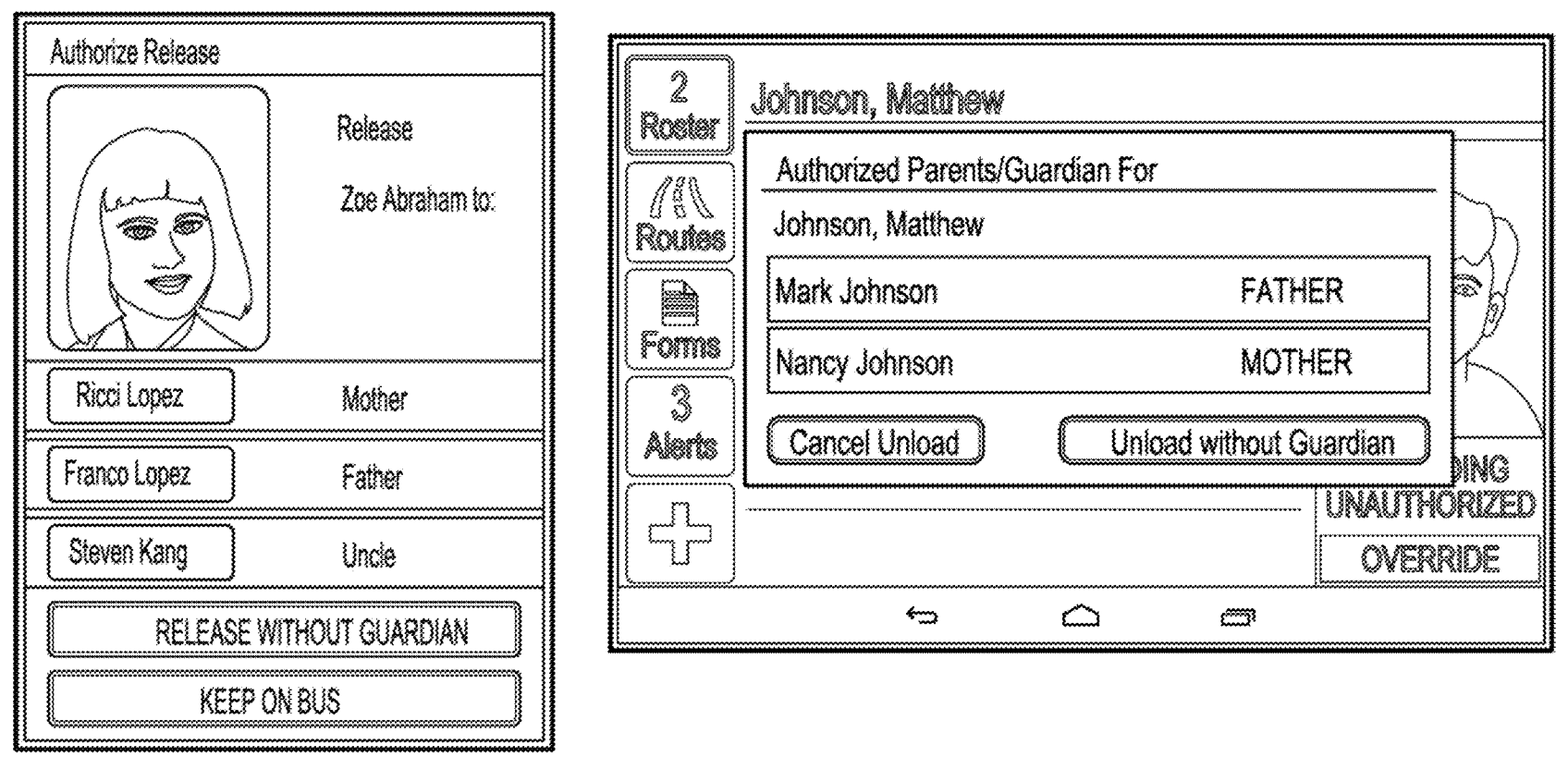

FIG. 6P-1 is a view displayed when an unauthorized student is exiting the bus at the current stop. The driver application informs drivers when students attempt to get off at a stop that is not their designated stop. This can be useful, e.g., when a younger elementary student mistakenly tries to get off at the wrong stop. The driver application can present buttons for the driver to keep the student on bus or manually unload the student at the current stop.

FIG. 6P-2 is an alternate view displayed when an unauthorized student is exiting the bus at the current stop. For example, the unauthorized student can be associated with another route and not assigned seat at the current route. The driver application can present buttons for the driver to cancel the unloading to keep the student on bus or to override the objection and allow the student to unload at the current stop. When the driver selects the override button, the student is removed from the roster so that the driver application can update the number of students on the bus.

FIG. 6Q is a view displayed when the driver application determines that the driver finishes one or more bus routes in a session. The driver application can prompt the driver to enter certain information, e.g., the ending mileage of the bus, and indicate the driver the fuel level.

FIG. 6R is a view displayed when a driver selects the post-trip inspection button or when the driver application prompts the driver to perform the post-trip inspection. When the post-trip inspection is performed, the driver application can verify the completion. The post-trip inspection can be performed similarly to the pre-trip inspection as discussed above and below.

FIGS. 7A to 7F show screen shots of an example GUI for a paraprofessional application and illustrate example functions that can be performed by the paraprofessional application. The paraprofessional application can be executed on a computing device, e.g., the user device 130 of FIG. 1, by a school paraprofessional, e.g., the school paraprofessional 128 of FIG. 1. Preferably, the paraprofessional application is resident and running on a mobile computing device such as a tablet computer or smartphone that the paraprofessional carries with him or her. For example, the paraprofessional can be assigned to meet busses of students at a bus transfer facility, and be responsible for assuming temporary physical custody of the students and ensuring that they are safely transferred from one bus to another. In such assignments the paraprofessional application can communicate with the driver application upon bus arrival, either directly through local wireless communication or through a remote server, to transfer an onboard rider roster.

Figures 7A, 7B:
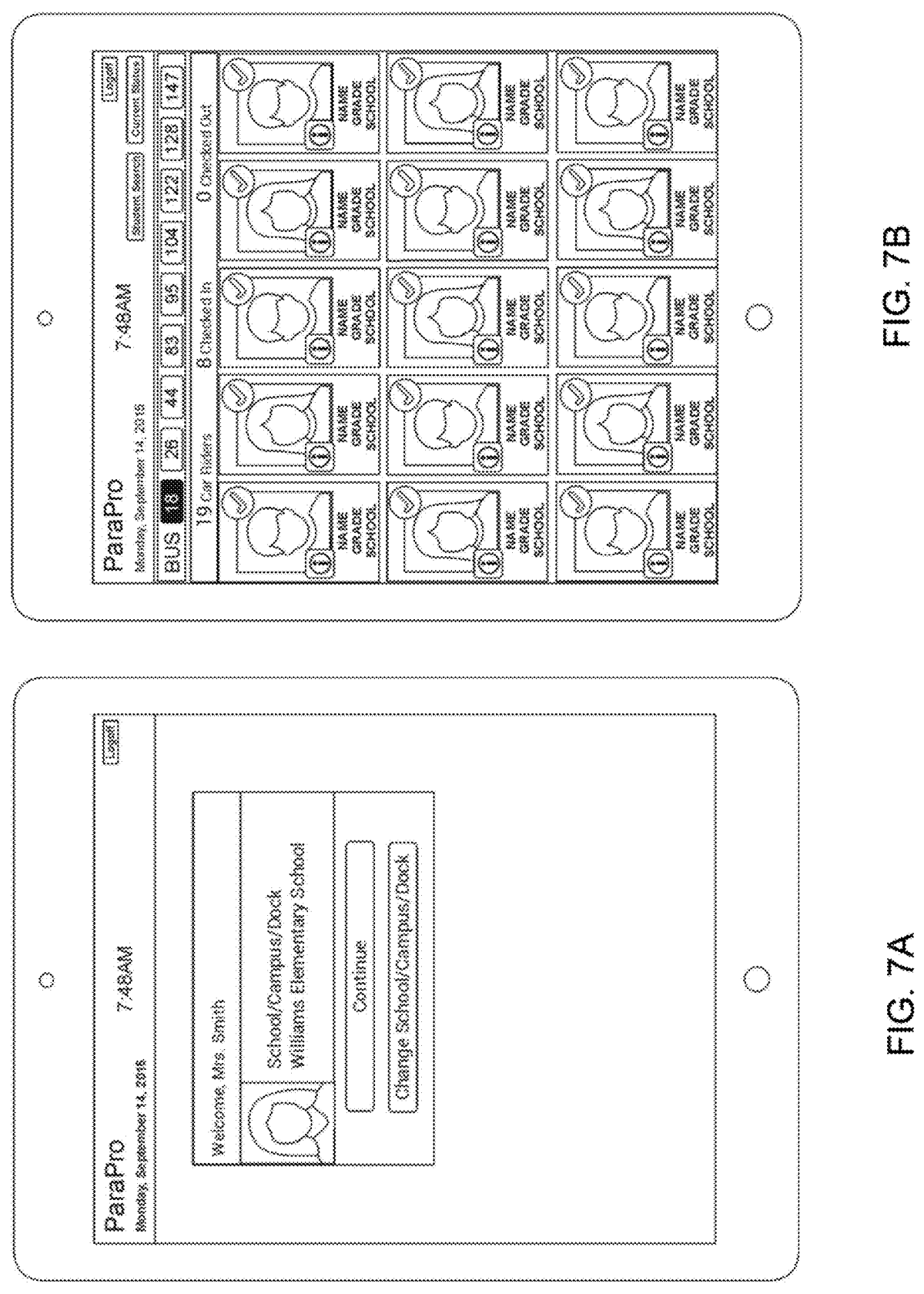

FIG. 7A is a review displayed after the school paraprofessional logs on the paraprofessional application on the computing device and/or on a student accountability system, e.g., the student accountability system 102 of FIG. 1, through a paraprofessional portal. The GUI can present a photo of the school paraprofessional and assigned School/Campus/Dock, which can be stored in the computing device and/or the student accountability system. The school paraprofessional can log on with a secure user name and password and/or with other secure mechanisms such as biometric identifiers. The school paraprofessional can also use the paraprofessional application to log on the student accountability system.

After logging on the student accountability system, the paraprofessional application can automatically download up-to-date information associated with the paraprofessional. The up-to-date information can include a list of buses associated with the paraprofessional and scheduled to arrive at a transfer location (e.g., a school) and a list of rosters for each bus. A roster can include all the eligible student riders (include active riders and inactive riders). The information can also include a list of students on the bus. As noted above, the paraprofessional application can also receive information of the buses and associated rosters or lists of students on the buses from a bus system, e.g., the bus system of 106 of FIGS. 1 and 4. For example, if there is no internet or wireless connection, the computing device and the bus system can communication via near-field communication (NFC) technology. The information can also include student discipline reports or school activity reports.

If the displayed school/campus/dock is not the assigned school/campus/dock, e.g., when a substitute paraprofessional logs in the application, the school paraprofessional can select to change the school/campus/dock. If the school paraprofessional confirms that the displayed school/campus/dock is the assigned school/campus/dock, the school paraprofessional can tap "Continue" button on the display to continue.

FIG. 7B is a view displayed after the school paraprofessional selects the "Continue" button. The view displays a list of buses associated with the paraprofessional, which are displayed as a horizontal list in a bus navigation bar. The paraprofessional can tap on any of the Bus buttons to toggle between rosters.

In some implementations, the paraprofessional application automatically arranges relative positions of the buses based on their arrival time. For example, the first arrival bus can be listed as the first bus listed in order. Accordingly, the paraprofessional application can display a list of students on the bus or a roster of students for the bus. The list of students can be displayed in an alphabetic order. Students that exit at the transfer location can be displayed in front of other students that stay on the bus at the transfer location. Active student riders in the roster can be displayed in front of inactive riders or unauthorized student riders such as anonymous riders. For each student, a photo, name, grade, and a school assigned to the bus can be presented on the display. The paraprofessional application also presents a number of student riders on the bus, as well as a number of students that have been checked in and a number of students that have been checked out, e.g., to be released to parents/guardians or to another bus or to a school.

Figures 7C, 7D:
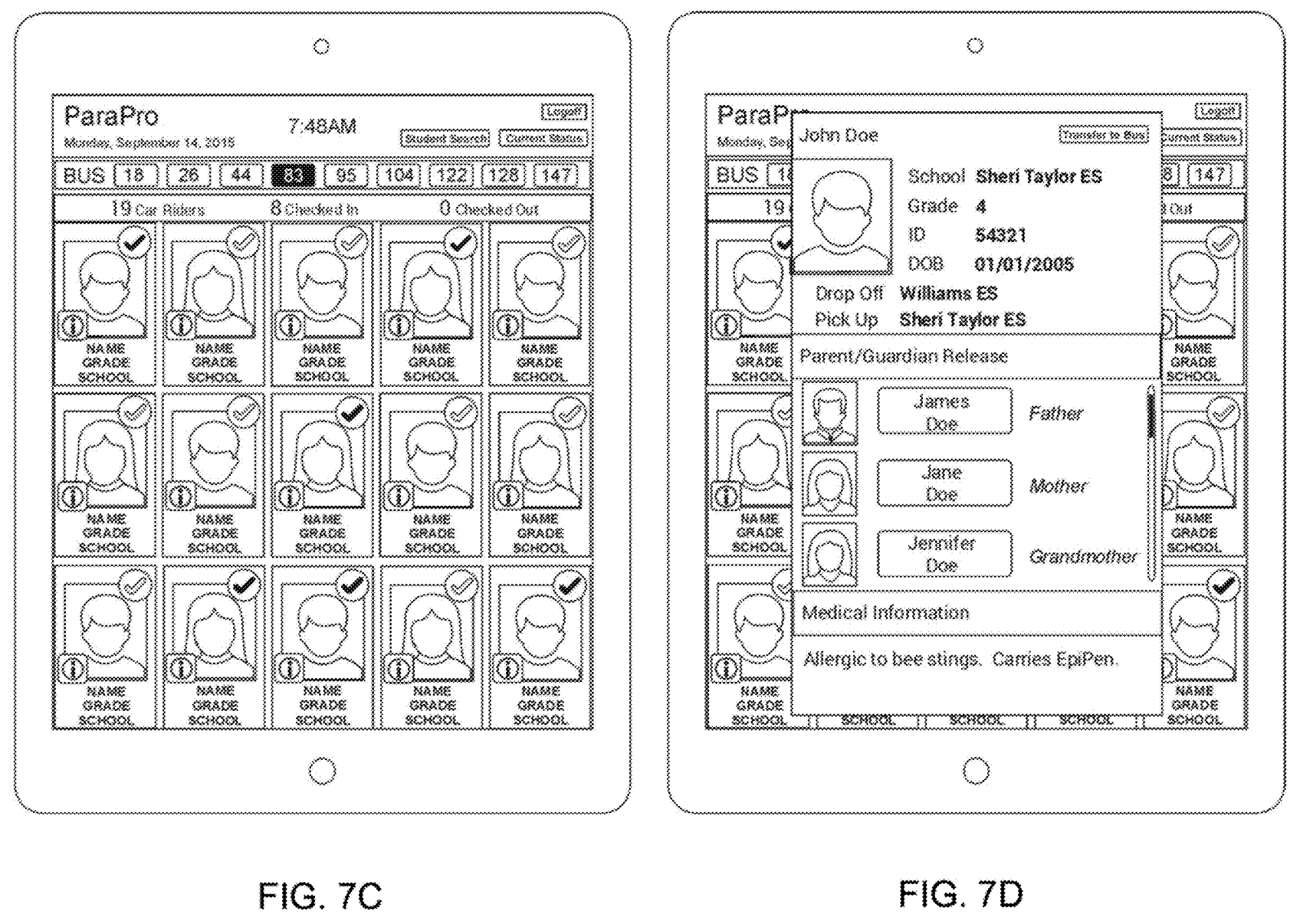

The school paraprofessional can also select a bus, e.g., by tapping on the bus in the bus navigation bar, when the bus is approaching the transfer location. FIG. 7C is a view displayed showing a roster of students for the selected bus. The roster can include a list of eligible students for the bus including active riders and inactive riders, as well as unauthorized riders or anonymous rider on the bus. In some examples, the paraprofessional application determines which students are currently on the bus and which students are not currently on the bus and sorts the students on the bus on the top of the roster, e.g., in an alphabetical order represented by a gray checkmark "√" in a circle at the top right of the student photo, and the other students that are not on the bus to the bottom of the roster, e.g., in alphabetical order represented by a gray "X" in a circle at the top right of the student photo. In some examples, within the list of students that are currently on the bus, the paraprofessional application sort the students that exit at the current transfer location on top of the students that remain on the bus at the current transfer location. In some examples, the paraprofessional application presents only the list of students that are currently on the bus on the display.

The computing device of the paraprofessional can include an identifier reader such as a RFID reader or a barcode reader. As each student exits the bus, the student can check in with the paraprofessional by presenting the student identifier, e.g., the RFID identifier, with the computing device. The identifier reader can identify the student identifier and the paraprofessional application can determine whether the student identifier is in the list of students on the computing device. If the student identifier is determined to be within the list of students on the computing device, the paraprofessional application provides a visual indication, e.g., the checkmark turning white and/or the circle turning green to visually confirm the student has been checked in, and/or play an audial indication, and/or emit a flashing light. The paraprofessional can also manually check in the student, e.g., by tapping on the circle with the checkmark of the student. After confirming that the student has been checked in, the paraprofessional application can update the number of students that have been checked in, e.g., below the Bus navigation bar.

If the paraprofessional cannot identify a student, the paraprofessional can perform a student search, e.g., in a roster for the bus or in a student accountability system. If the paraprofessional needs more information regarding a student in the list of students displayed on the display, the paraprofessional can select the student, e.g., by tapping on an icon for the student such as an information button located at the lower left of the student's photo.

FIG. 7D is a pop-up window that appears displaying the student's profile. The profile can include the student's name, photo, school, grade, student ID, date of birth, pick up and drop off locations, and a list of authorized parents/guardians the student can be released to. The profile can also include photos of the list of authorized Parent/Guardian photos and names. The profile can include the student's medical information if applicable.

When a parent or guardian is picking up the student, the paraprofessional can select the student to view the student's profile to verify the parent or guardian. In some examples, the parent or guardian can present an identifier, e.g., a RFID identifier for the parent or guardian, to the computing device of the paraprofessional, and the paraprofessional application can verify the identifier of the parent or guardian and notify the paraprofessional by a visual indication, an audible indication, and/or a light indication.

After the paraprofessional verifies the parent or guardian picking up the student, the paraprofessional can select the parent or guardian by tapping on the appropriate Parent/Guardian name button releasing the student. In response to determining that the paraprofessional has selected the parent or guardian, the paraprofessional application can record the date, time, location, and who the student has been released to. After confirming that the student has been released or checked out, the paraprofessional application can update the number of students that have been checked out, e.g., below the Bus navigation bar.

Figures 7E, 7F:
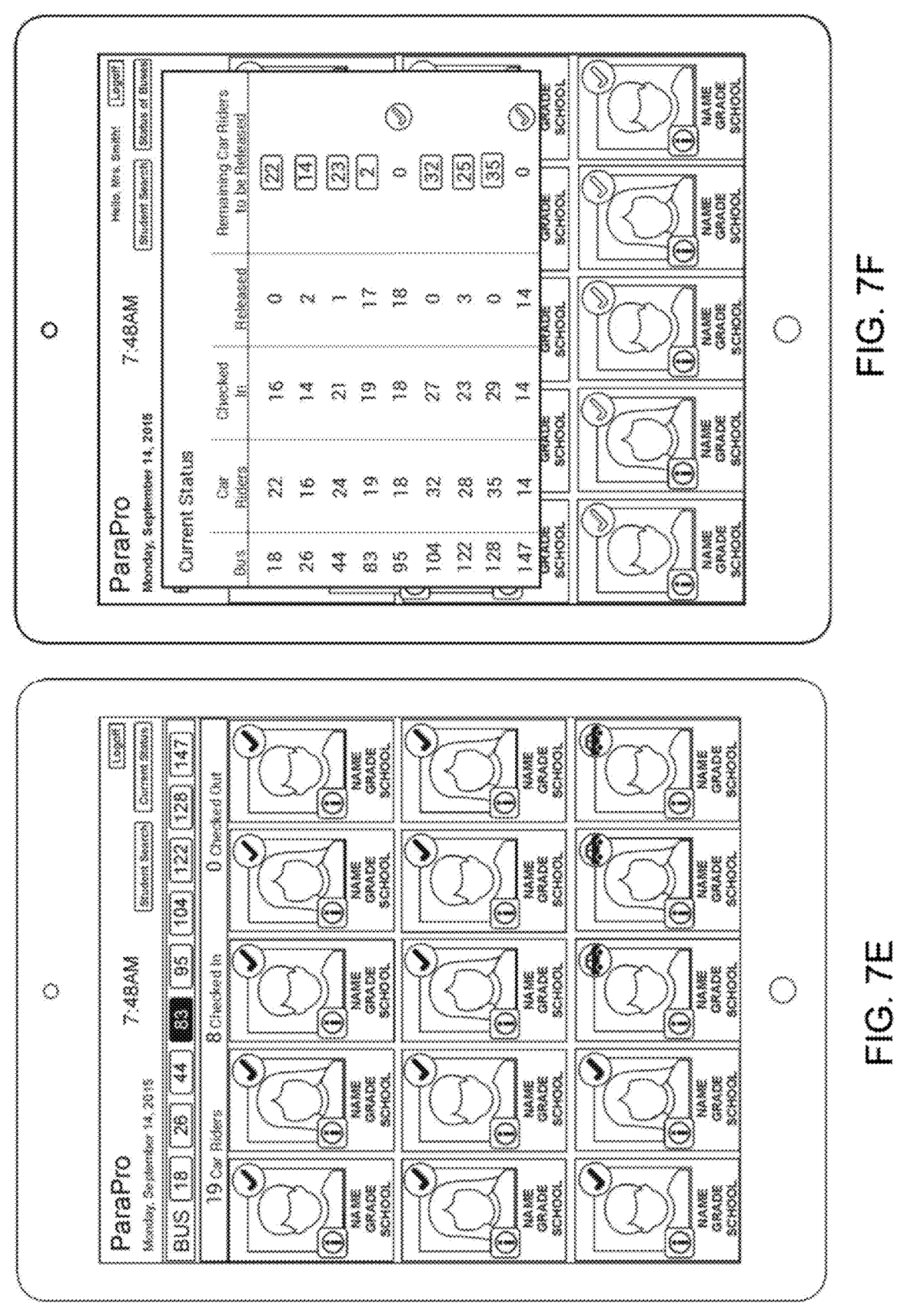

After the student has been released or checked out, the paraprofessional application can sort the roster by moving the released students to the end of the list of checked in students as illustrated in FIG. 7E. The application can also give a visual indication to confirm that the student has been released, for example, by changing the background color of the student (e.g., from green to blue), changing the circle with the checkmark from green to blue, and replacing the white checkmark with a white car icon that visually confirms that the student has been picked up by an authorized parent/guardian to ride in a car.

The paraprofessional can also view a current status of the student riders from the list of students assigned to the paraprofessional, e.g., by clicking "Current Status" button at the upper right of the display. FIG. 7F is a view, e.g., a pop-up window, displayed when the paraprofessional selects to view the current status of the buses. The view includes all the buses at the current transfer location, the number of student riders that are on each bus, the number of student riders that have been checked in, the number of student riders that have been released or checked out, and the remaining student riders to be released from each bus. The paraprofessional can click a button for the remaining student riders to view which students still need to be released. Then the application can pop up a window showing all the names of the student riders that have not yet been released. When all the student riders from a particular bus have checked in and have been released, the number of the remaining student riders to be released column can show a label "0" and a green circle with a white checkmark can be next to the label "0" to visually confirm all student riders from that bus have been released.

FIGS. 8A to 8G show screen shots of an example GUI for vehicle inspection using a driver application installed on a computing device. The computing device can be a portable data input device such as a tablet computer or a smart phone. The computing device can be the bus system 106 of FIGS. 1 and 4, and the driver application can be the driver application 414 of the bus system 106 of FIGS. 1 and 4. A driver can carry the computing device to perform vehicle inspection, e.g., a pre-trip inspection prior to driving a route and/or a post-trip inspection after driving a route. The vehicle can be a truck such as a long-haul truck or a bus such as a school bus. The vehicle inspection can be used to discover or identify mechanical defects, safety issues, and/or student vandalism for the vehicle.

Figure 8B:
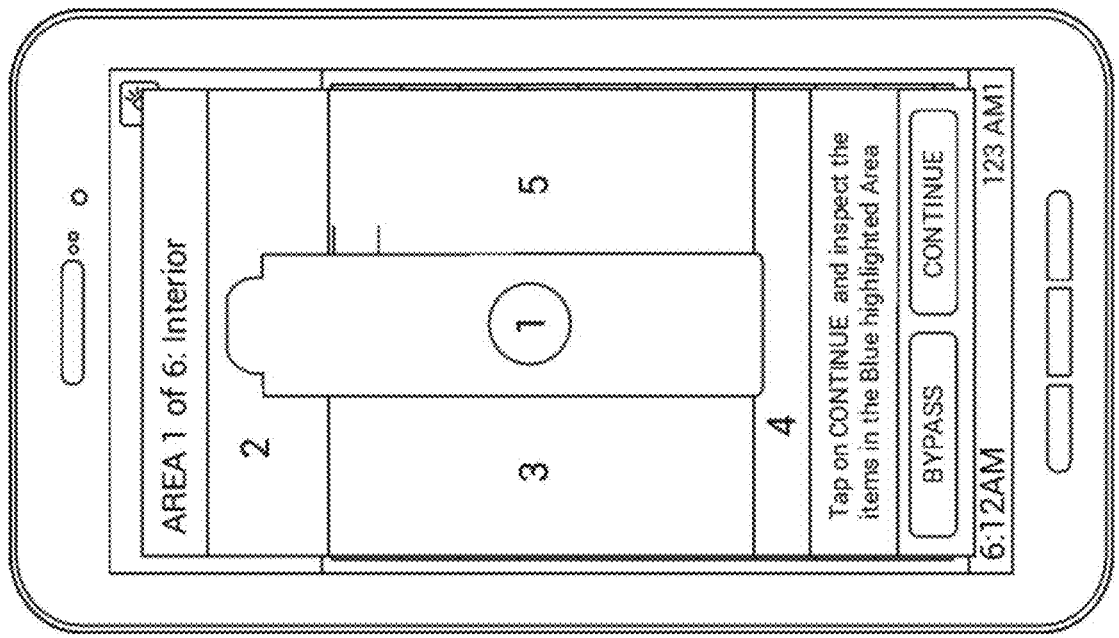
Figure 8A:
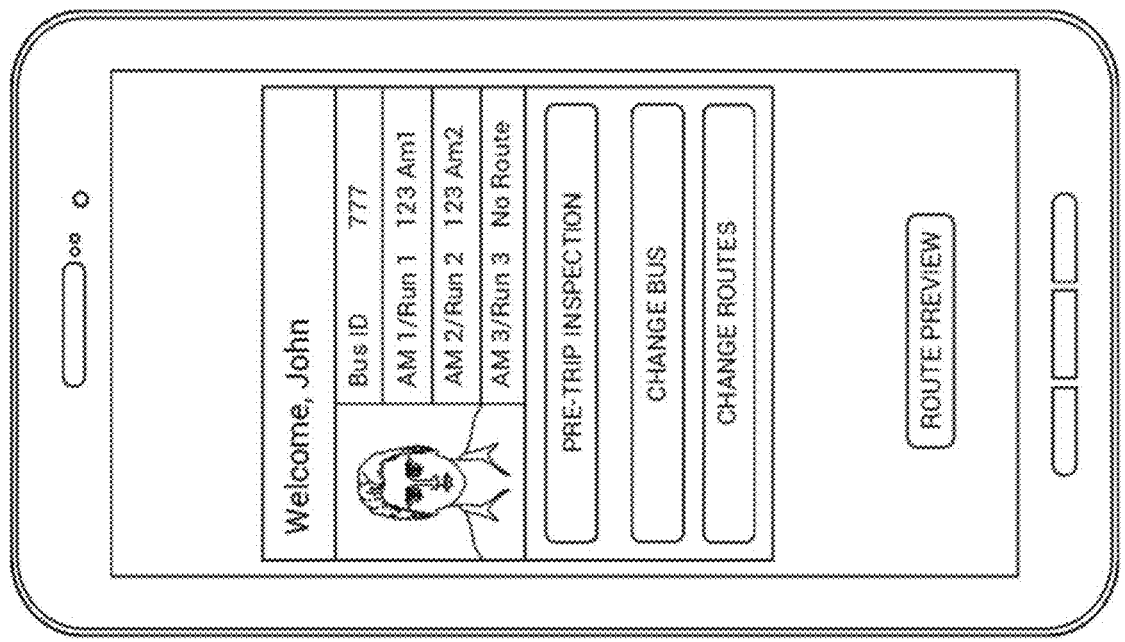
Figures 1, 8B:
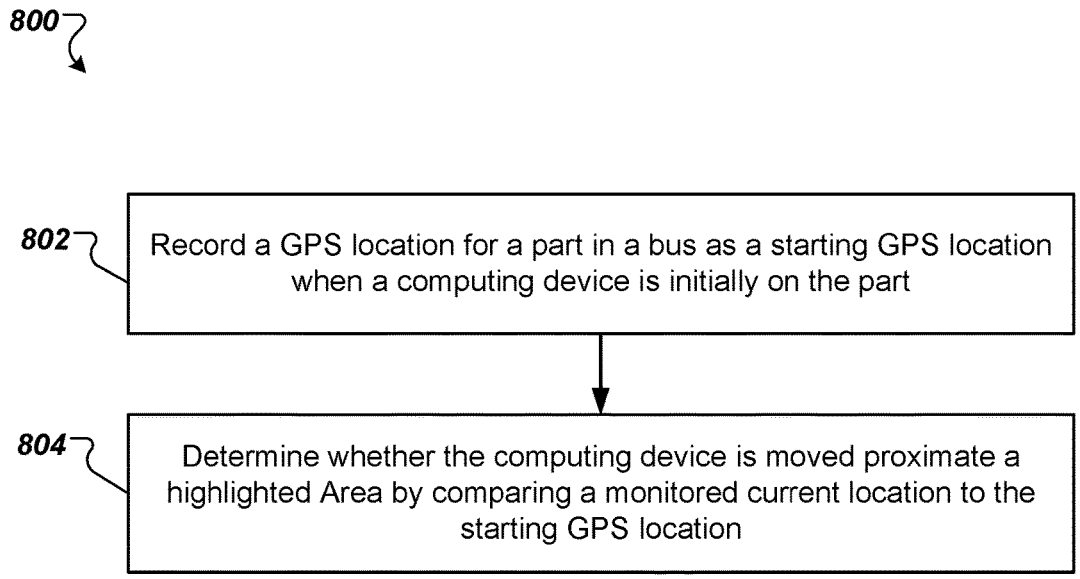
Figures 2, 8B:
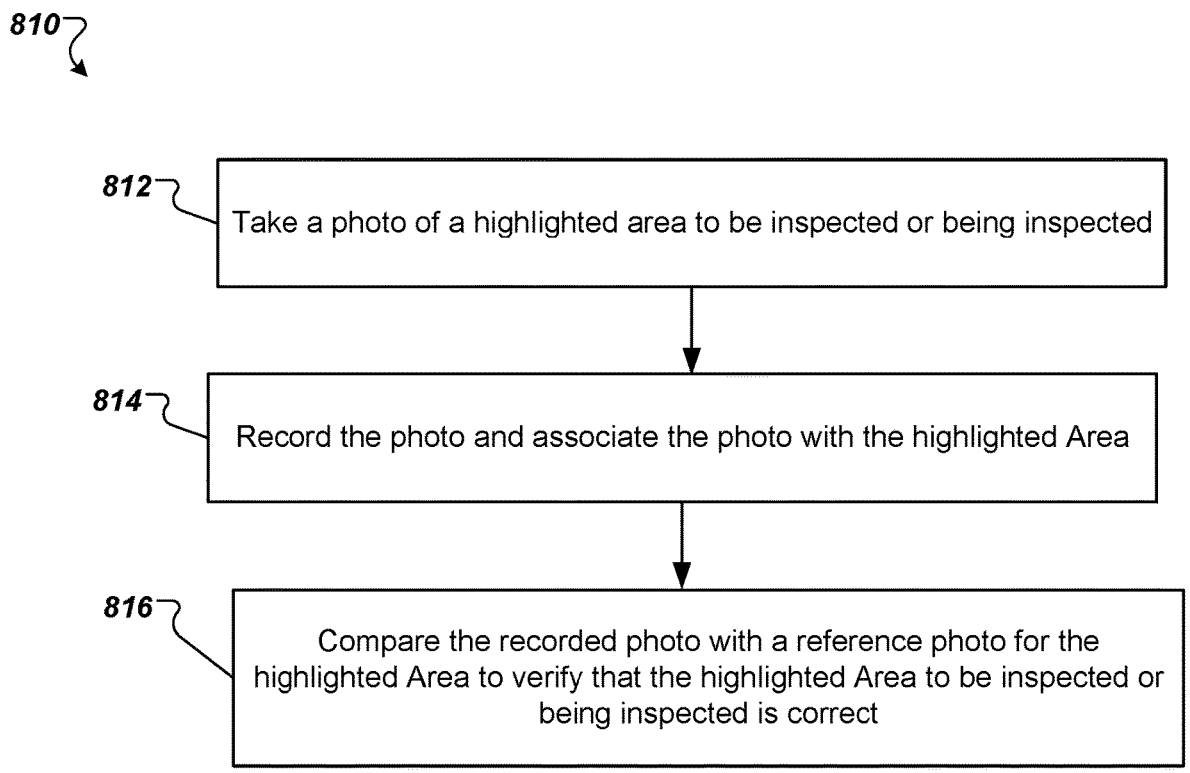

FIG. 8A is a view displayed after the driver logs onto the computing device. A display or screen of the computing device presents a photo of the driver, an identifier for a bus and a number of routes that the computing device can automatically load for the driver, e.g., based on the driver's identifier, from locally stored information in the computing device or a remote computing system such as a student accountability system via the Internet and/or a cellular network. The GUI displays a button that allows the driver to change bus and/or a button that takes the driver to change routes. The GUI also displays a button that allows the driver to perform a pre-trip inspection. After the driver confirms which bus and route to drive, the driver can select to start the pre-trip inspection of the bus, e.g., by tapping on a "PRE-TRIP INSPECTION" button on the GUI.

FIG. 8B is a view displayed after the driver taps on the "PRE-TRIP INSPECTION" button on the GUI. The driver application can also automatically present the view for pre-trip inspection upon determining that the driver confirms the bus and the route to drive. The GUI displays a schematic diagram of the top view of the bus with delineated Areas to inspect in and around the bus, e.g., a number of portions of the bus.

In some implementations, the delineated Areas include: Area 1 for interior of the bus, Area 2 for front of the bus, Area 3 for driver side of the bus, Area 4 for back of the bus, Area 5 for passenger side of the bus, and Area 6 for Air Brake system. The driver application can present more or fewer Areas for inspection, e.g., per customer settings or requirements or transportation regulations. For example, a school district can request to check under a hood of a school bus, which can be inserted as an additional Area for inspection. The driver application can also change an order of the Areas to be inspected per customers' settings or requirements. For example, the inspection Area 1 is defaulted to be the interior of the bus. A school district can reorganize the order of the Areas according to a particular inspection order. An Area to be inspected in the order can be highlighted, as illustrated in FIG. 8B.

The driver application presents a user interface element "BYPASS" button. In some implementations, the highlighted Area is the first Area in the orders of Areas, and selecting the "BYPASS" button allows the driver to bypass the entire pre-trip inspection. For example, if a driver is in a hurry and does not have time to make an inspection, the driver can choose the "BYPASS" button to bypass the pre-trip inspection. In another example, a school district requires a driver to only perform inspection once per day. If the driver performs the inspection in the morning, the driver does not need to perform inspection for mid-day and afternoon routes and can choose to bypass the pre-trip inspections. If the driver does not choose "BYPASS" button when presented for the first Area, the driver application does not present "BYPASS" for the other Areas in the rest of the inspection. That is to say, the driver has to finish all the inspection in this case.

In some implementations, selecting the "BYPASS" button allows the driver to bypass the inspection of the highlighted Area no matter whether or not the highlighted Area is the first Area. In some implementations, selecting the "BYPASS" button allows the driver to bypass the rest of the inspection no matter whether or not the current highlighted Area is the first Area. For example, if the current highlighted Area is the third Area of the order of the Areas, selecting the "BYPASS" button allows the driver to bypass the inspection of the third Area, the fourth Area, the fifth Area, and the sixth Area. In some implementations, when the driver selects the "BYPASS" button, the driver application pops up a window for the driver to select to bypass the highlighted Area or the pre-trip inspection. In any of the cases above, if the driver selects the "BYPASS" button, the driver application can record the selection for the trip, which can be transmitted to a remote management system for an administrator to review.

The driver application presents a user interface element "CONTINUE" button for the driver to proceed with inspecting the highlighted Area, e.g., the interior of the bus. The driver can carry the computing device to the highlighted Area and selects the "CONTINUE" button to proceed with inspecting the highlighted Area. When the driver selects the "CONTINUE" button, the driver application can determine a current location of the computing device, e.g., by using a location system in the computing device like the location system 410 of FIG. 4. The location system can be a GPS sensor providing global positioning data of the computing device. The driver application can record the current location and associates the recorded location with the highlighted Area to be inspected, which can be used to verify that the driver is inspecting the highlighted Area. The driver application can also record a timestamp when the driver selects the "CONTINUE" button and associate the recorded timestamp with the recorded location and the highlighted Area.

In some implementations, the driver application keeps monitoring, e.g., by using the location system, a current location of the computing device. When the driver application determines that the computing device is proximate the highlighted Area, the driver application can automatically record the location and associate the recorded location with the highlighted Area and/or with associated timestamp. In some examples, the driver application determines that the computing device is proximate the highlighted Area by comparing the monitored current location to a reference location. For example, as an example process 800 in FIG. 8B-1 shows, the computing device can be initially positioned on a part in the bus, e.g., the windshield of the bus near the driver seat. The driver application can record a GPS location for the part as a starting GPS location when the computing device is initially on the part (802). The driver application can also allow the driver to record the starting GPS location for the part. Based on relative coordinates between the part and the highlighted Area and stored shapes or dimensions of the bus, the driver application can determine whether the computing device is moved proximate the highlighted Area by comparing the monitored current location to the starting GPS location (804).

In some implementations, as an example process 810 in FIG. 8B-2 shows, the driver application allows the driver to take a photo of the highlighted Area to be inspected or being inspected (812). The driver application can record the photo and associate the photo with the highlighted Area (814). In some cases, the driver application processes the recorded photo and compares with a reference photo for the highlight Area, e.g., stored in the computing device, to verify that the highlighted Area to be inspected or being inspected is correct (816).

Figures 8C, 8D:
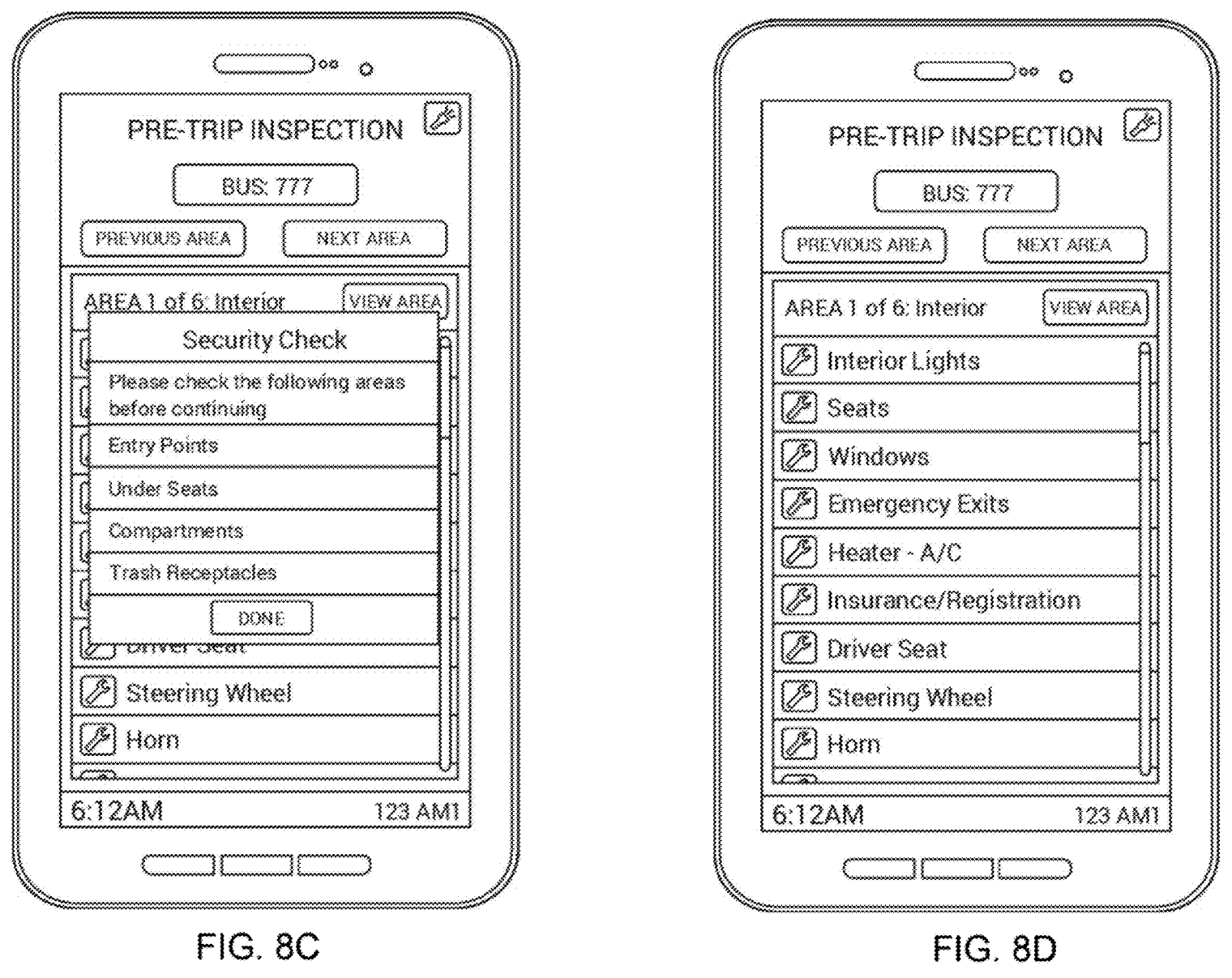

FIG. 8C is a view displayed after the driver selects the "CONTINUE" button. The view presents a list of items to be inspected in the highlighted or specified Area in the background with a pop-up window in front that states "Security Check" in the header. The window lists items/areas to be inspected for any tampering or foreign objects that can potentially be from terrorists. For example, the items/areas can include entry points, under seats, compartments, and trash receptacles. More or less items/areas can be included in the list per customers' requirements, settings, and/or regulations. The driver is informed to check the list of items/areas before continuing. If a driver suspects tampering or sees a foreign object, the driver can be instructed to immediately leave the bus and report the situation to a transportation department staff or a school administrator.

After inspecting the "Security Check" items/areas, the driver can select the "Done" button on the GUI to continue. The pop-up window disappears and items to be inspected in the specified Area are listed as shown in FIG. 8D. For example, as illustrated, FIG. 8D shows the inspection Area 1, e.g., the interior of the bus, including interior lights, seats, windows, emergency exits, heater A/C, bus insurance/registration, and driver seat.

The driver application can also present a flashlight button, e.g., at the top right of the display, for the driver to select to utilize light of a camera flash, e.g., located on the back of the computing device, to illuminate the items/areas being inspected. For example, the pre-trip inspection is performed in the early morning when it is dark. After the driver inspects the interior of the bus, the driver may exit the bus to begin inspecting the specified Areas around the exterior of the bus.

Figures 1, 8F:
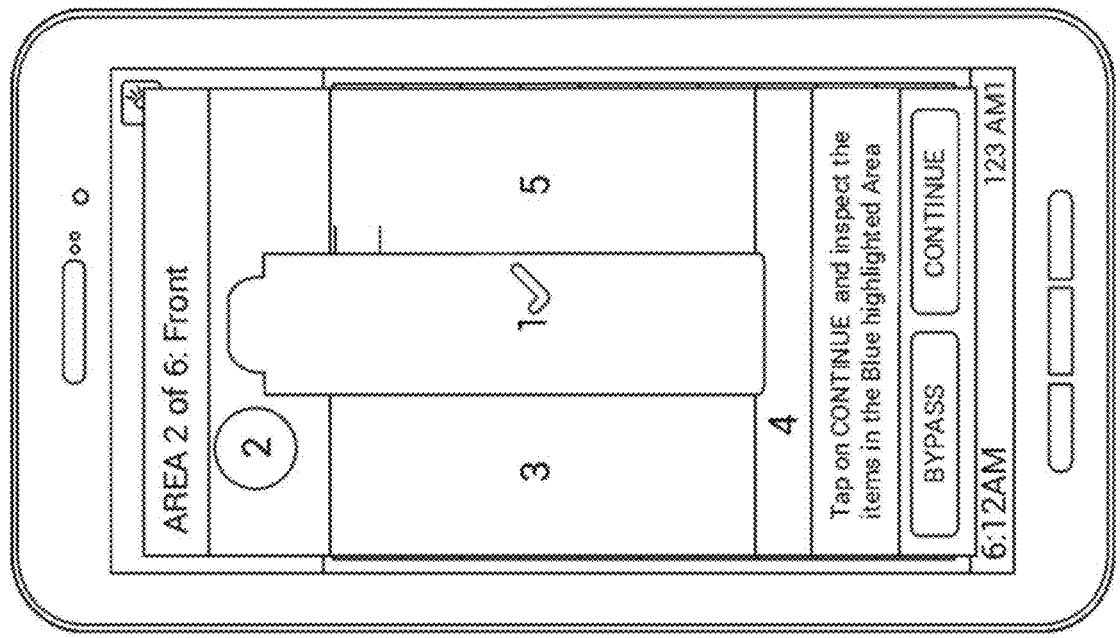
Figure 8E:
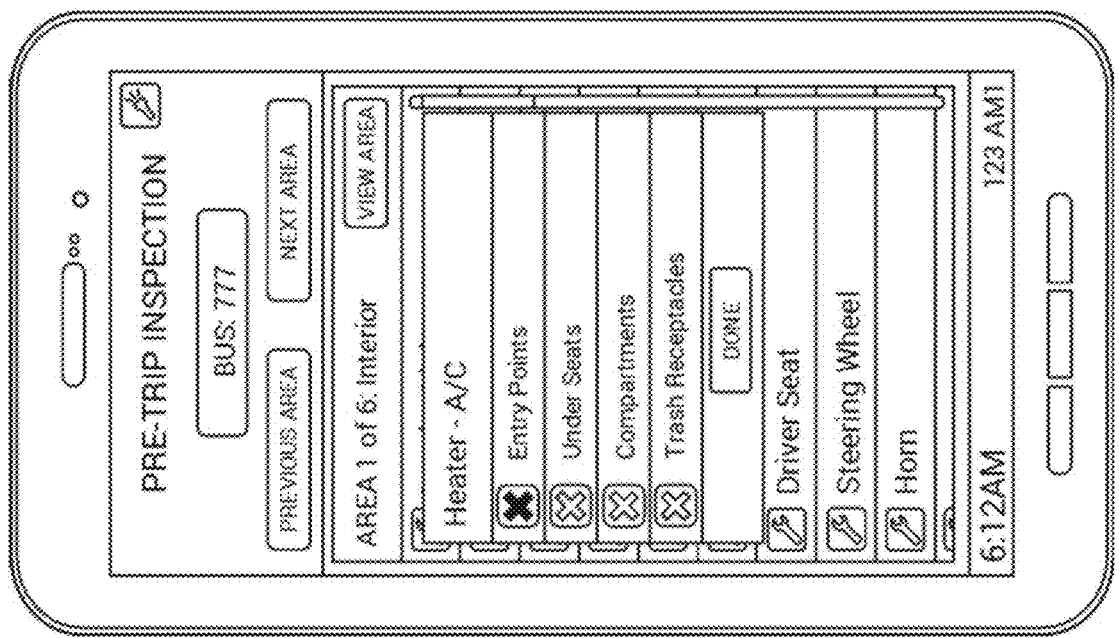

For each of the items to be inspected, the driver application presents a user interface element like a wrench icon to a list of common defects/problems that occur with the item. The driver inspects each item listed. If a defect or problem of any kind for a particular item is discovered, the driver can tap on the wrench icon next to the particular item. FIG. 8E shows a pop-up window that appears with the list of common defects/problems. The driver can tap the box next to one of the defects listed, which then displays an "X" in the box. In some examples, if a specific defect or issue is not included on the list displayed on the pop-up window, the driver can tap on the box next to a label "Other" to open a pop-up text box and keyboard to type in what the specific defect or issue is.

The driver can take a photo of the discovered defect for the particular item, e.g., using a camera in the computing device. For example, when the driver selects the box next to the particular defect for the particular item, the driver application can pop up a window to instruct the driver to take a photo of the defect. The driver application records the defected photo and associates the defected photo with the defect and the particular item. The driver application can also process the recorded photo and compare the photo to a reference photo for the particular item to determine the defect.

In some implementations, the driver takes a photo for each of the list of items being inspected. The driver application can process the photo and compare the photo to a reference photo for the item. The reference photo can be a photo for the item without defects or with particular defects. The driver application can identify whether the item being inspected has a defect based on a result of the comparison. In response to determining that the item being inspected has a defect, the driver application can perform an alert action to the driver, including a visual indication, an audible indication, and/or emitting a flashing light. The driver application can also flag the suspected photo. The driver application can also allow the driver to take a video for a particular item or a defect of the particular item using a video recorder of the computing device.

When the driver finishes inspection of the particular item, the driver can tap on the "Done" button to return to the list of inspection items for the specified Area being inspected. The driver application records the item noted as being defective and includes the item and associated defects or issues (including the associated photos taken) in a summary report of the inspection at the end of the inspection.

In some implementations, in response to receiving the driver's input selecting the "DONE" button indicating completion of the inspection of the specified Area, the driver application determines whether the computing device was proximate the specified Area based on global positioning data from the location system of the computing device. If the driver application determines that the computing device was proximate the specified Area, the driver application can determine that the driver has inspected the specified Area. The driver application can then record inspection completion with respect to the specified Area, and display instructions on the screen for inspecting a next Area in the order of Areas.

In some implementations, the driver application displays an indication requesting a photograph of the specified Area. The driver application can obtain a photographic image of the specified Area from a camera of the computing device. The driver application can process the obtained photographic image and compare the photographic image to a reference image of the specified Area. Based on a result of the comparison, the driver application can determine whether the specified Area in the obtained photographic image is the actual specified Area and determine whether the driver has inspected the specified Area. In response to receiving the driver tapping on the "DONE" button and obtaining the photographic image of the specified Area, the driver application can record inspection completion with respect to the specified Area, and display instructions on the screen for inspecting a next Area in the order of Areas.

In some implementations, when the driver application presents instructions on the display for inspection the specified Area, e.g., the inspection Area, as shown in FIG. 8D, the driver application records a timestamp. In response to receiving the driver's input selecting the "DONE" button indicating completion of the inspection of the specified Area, the driver application can determine whether the elapsed time following displaying the instructions on the display reaches a predetermined period of time (e.g., 30 seconds to 2 minutes for typical inspection time for the specified Area). If the driver determines that the elapsed time reaches the predetermined period of time, the driver application can determine that the driver has inspected the specified Area. The driver application can record inspection completion with respect to the specified Area of the vehicle and display instructions on the display for inspecting a next Area in the order of Areas of the vehicle.

Once the driver has completed inspecting Area 1, the driver can tap on the "NEXT AREA" button, e.g., at the top right of the screen. As shown in FIG. 8F-1, the screen changes to the top view image of the bus with delineated Areas highlighting the next Area, e.g., Area 2. The GUI can also display a checkmark for each Area that has been inspected. Once the driver is moving proximate the highlighted Area to be inspected, the driver can tap on the "Continue" button for marking a current GPS location. As noted above, the driver application can also automatically record the current GPS location after determining that the computing device is proximate the highlighted Area before inspection, during the inspection, or after the inspection. In some examples, the driver application automatically records the current GPS location after a lapse of time, e.g., after determining that the driver starts or completes inspection of the previous Area.

In some implementations, as illustrated in FIG. 8F-1, the GUI presents a "BYPASS" button for the driver to bypass inspection of the highlighted Area or inspection of the rest of the inspection. As noted above, if the driver selects the "BYPASS" button, the driver application records the selection to report. The GUI also presents a "CONTINUE" button for the driver to continue inspection of the highlighted Area. Similarly, the GUI will change to display items that are to be inspected in the highlighted specified Area in the background with a pop-up Security Check window for the specified area. For different inspection Areas, the pop-up Security Check window can have different lists of items/areas to check.

In some implementations, as shown in FIG. 8F-2 and as noted above, the GUI presents only a "CONTINUE" button for the driver to continue inspection of the highlighted Area, and does not present the "BYPASS" button as shown in FIG. 8F-1. That is, the driver cannot bypass the highlighted Area and has to continue the inspection.

The inspection process repeats in the same manner for each Area to be inspected in the order of Areas for the inspection, e.g., from the interior of the bus to around the exterior of the bus ending with the driver inside the bus to perform Air Brake Test. The driver application can record GPS locations of the computing device when each of the Areas is to be inspected or being inspected or after a lapse of time.

After completing the last inspection Area, e.g., Area 6 (the Air Brake System), the driver can tap on the "CONTINUE" button, and the driver application displays the Pre-Trip Inspection Summary screen as illustrated in FIG. 8G. Each Area inspected is shown with either a checkmark in front to visually confirm all items inspected in that Area was satisfactory, or a wrench icon appears in front of the Area name to visually confirm a defect/issue was noted for that Area. The driver can tap on the "EDIT" button if the driver want to make any changes. The driver can also tap on the "EDIT" button of any Area if the driver missed or forgot to note a defect/issue for the Area.

Once a drive has completed the inspection and is ready to submit the results, the driver can tap on the "SUBMIT" button, e.g., at the bottom of the screen. In response to determining that the driver selects the "SUBMIT" button, the driver application can automatically store the inspection summary report and/or send an email to a shop, e.g., a transportation department shop or a preconfigured destination. For example, the inspection summary report can be sent directly to maintenance software of a transportation department to create a work order that can be tracked by an administrator, e.g., through an administration portal.

After determining that the driver has completed the pre-trip inspection, the driver application can present a view, e.g., the view of FIG. 6C, for the driver to input a starting mileage and/or a starting fuel level. The driver application can also automatically record the starting fuel level and/or the starting mileage. After a trip is completed, the driver application allows the driver to perform a post-trip inspection following the same procedures for the pre-trip inspection. The driver application can also present a view, e.g., the view of FIG. 6R, for the driver to input an ending mileage and/or an ending fuel level. The driver application can also automatically record the ending fuel level and the ending mileage.

The driver application can save results of each pre-trip and post-trip inspection for associated trips driven by the driver and/or transmit to an administration system for an administrator to review. Based on the inspection reports and recorded GPS locations associated with respective inspection Areas and/or associated recorded timestamp information, the administrator can determine whether the driver is in the correct Area for the stage of the inspection. The driver application can generate a flag or a report for the administrator if the recorded GPS locations indicate that the computing device stayed in the same location while the driver enters information as part of the inspection.

Figure 9A:
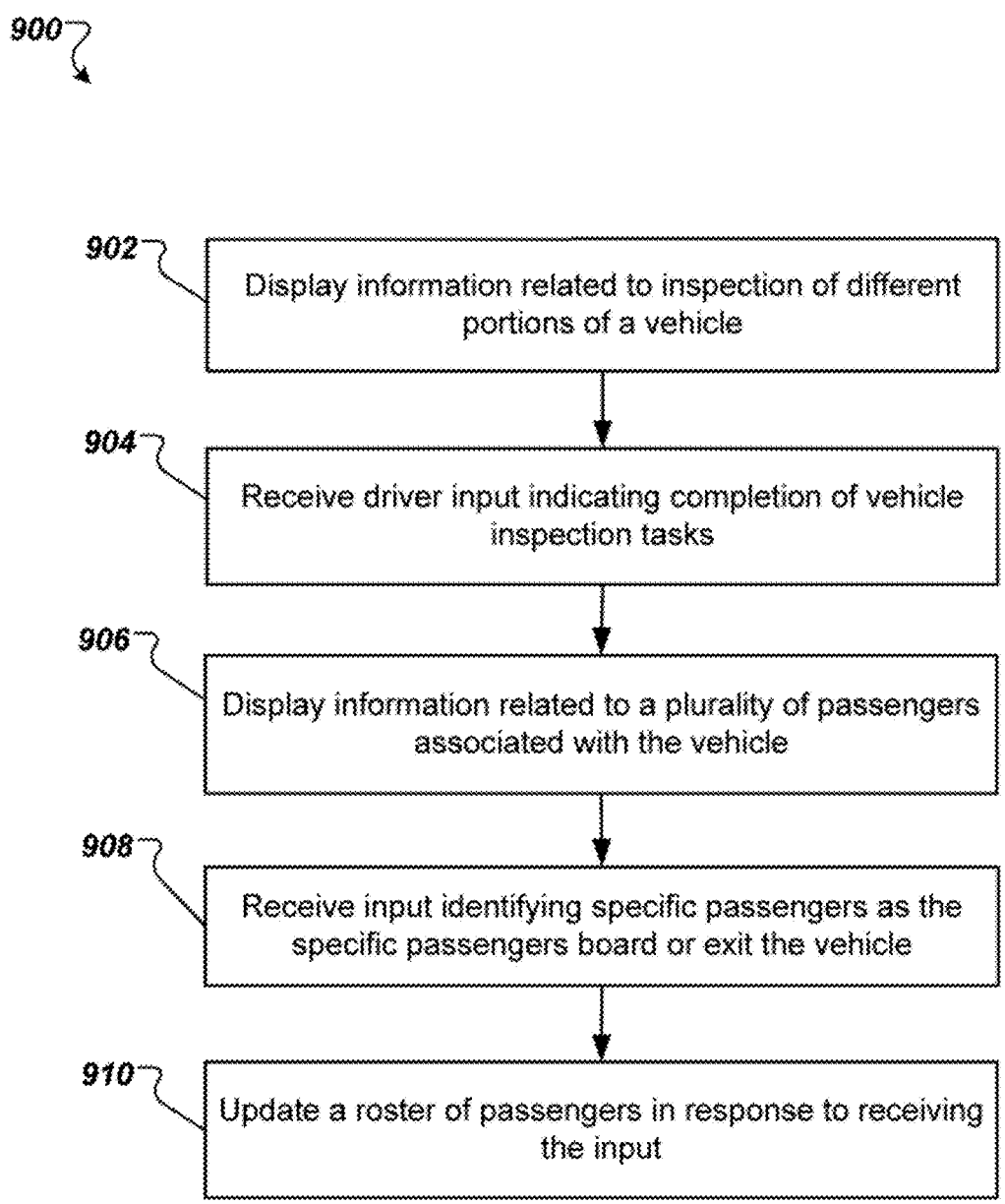
FIG. 9A is a flow diagram of an example process for inspecting a vehicle and tracking passenger riding status using a driver application.
Figure 9B:
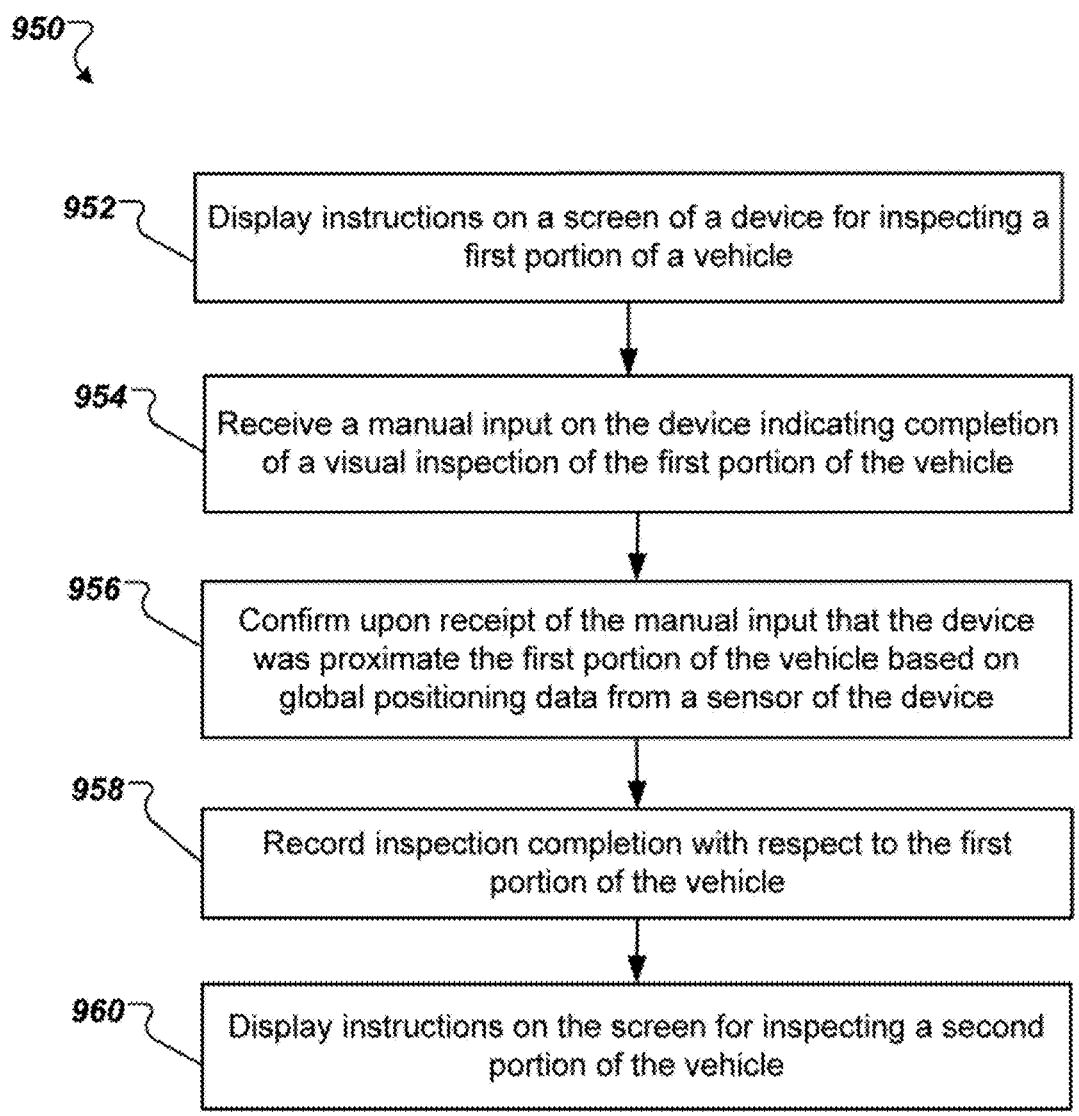
FIG. 9B is a flow diagram of an example process for vehicle inspection using a driver application.

FIG. 9A shows an example process 900 for facilitating inspection of a vehicle and tracking passenger riding status using a driver application installed on a computing device. FIG. 9B shows an example process 950 for facilitating vehicle inspection using the driver application. Each of the example processes 900 and 950 can be implemented using additional, fewer, or different operations, which can be performed in the order shown or in a different order. In some implementations, one or more of the operations can be repeated or iterated, for example, until a terminating condition is reached.

The computing device can be a portable/hand-held data input device. For example, the computing device can be in the form of a tablet computer running application software providing instructions. The tablet computer can include a case extending about the tablet computer. The computing device can be the bus system 106 of FIGS. 1 and 4, and the driver application can be the driver application 414 of the bus system 106 of FIGS. 1 and 4. The vehicle can be a truck such as a long-haul truck or a bus such as a school bus.

A driver can use the driver application on the computing device to track passengers riding status, particularly during events in which the passengers move from one status to another (e.g., upon boarding or exiting the vehicle, or upon transfer between vehicles). The vehicle passenger tracking can be performed as described in a U.S. patent application Ser. No. 14/746,412, entitled "BUS PASSENGER TRACKING" and filed on the same date herewith, whose contents are hereby incorporated by reference in their entirety. The driver can also carry the computing device to perform vehicle inspection, e.g., a pre-trip inspection prior to driving a route and/or a post-trip inspection after driving a route, as discussed above in FIGS. 8A-8G.

Referring to FIG. 9A, the driver application displays information related to inspection of different portions of the vehicle (902). The driver application can present an order for the different portions of the vehicle to be inspected. The order can be predetermined or customized, e.g., by an administrator. The driver can inspect the different portions according to the order.

After determining inspection completion of a first portion of a vehicle, the driver application can record the inspection completion with respect to the first portion and display instructions for inspecting a second portion sequential to the first portion in the order. As noted above, the driver application can determine that the driver has inspected the first portion for inspection in a number of ways, e.g., by determining that the computing device was proximate the first portion based on a global positioning data from a GPS sensor of the device, by determining that a photographic image of the first portion has been obtained from a camera of the device, and/or by determining that elapsed time following displaying instructions for inspecting the first portion reaches a predetermined time period.

FIG. 9B shows the example process 950 for inspecting portions of the vehicle in order. The driver application displays instructions on a screen of the device for inspecting the first portion of the vehicle (952). In some examples, upon the driver application receives an input from the driver selecting to start inspection of the first portion, the driver application determines current global positioning data of the computing device, e.g., from a location system such as a GPS sensor in the computing device. The driver application can determine that the computing device is proximate the first portion based on the current global positioning data of the computing device, which verifies that the driver is inspecting the first portion. The driver application can record and associate the current global positioning data with the first portion, which can be included in an inspection summary report. The driver application can determine whether the computing device is proximate the first portion when the driver is inspecting the first portion.

In some examples, upon the driver application receives an input from the driver selecting to start inspection of the first portion, the driver application displays a pop-up window including a list of security check items in the first portion for the driver to check before inspecting the first portion of the vehicle, e.g., as illustrated in FIG. 8C.

The driver application can display the instructions to inspect the first portion after the driver completes the security check. The instructions can include a list of items of the first portion to be inspected, as illustrated in FIG. 8D. When the driver discovers a defect for a particular item, the driver can tap on a user interface element, e.g., a wrench button, next to the item, and the driver application can present a number of common defects or problems that occur with the particular item, as illustrated in FIG. 8E. The driver application can receive an input from the driver selecting one of the defects or problems and record the selected defect or problem and associate the selected defect or problem with the particular item of the first portion.

In some implementations, the driver application presents a request to the driver for an image of the particular item. The driver can use a camera in the device to take the image of the particular item. After obtaining the image from the camera, the driver application can store and associate the obtained image with the particular item. The driver application can also process the obtained image and compare it to a reference image of the particular item. The reference image can be an image of the particular item without any defect or with one or more common defects. Based on a result of the comparison, the driver application can determine whether a suspected defect occurs with the particular item of the first portion. If the driver application determines the suspected defect, the driver application can perform an alert action to alert the driver. The driver application can also flag the image for storing or reporting.

In some implementations, the driver application requests the driver to take an image of the first portion using the camera. The driver application can obtain the image of the first portion from the camera. The driver application can process the obtained image, compare it to a reference image for the first portion, and determine whether the driver is inspecting the correct portion, i.e., the first portion.

The driver application receives a manual input on the device indicating completion of a visual inspection of the first portion of the vehicle (954). After the driver inspects the list of items in the first portion of the vehicle, the driver can manually input selection of a user interface element, e.g., "DONE" button, indicating completion of the visual inspection of the first portion.

The driver application confirms upon receipt of the manual input that the device was proximate the first portion of the vehicle, based on global positioning data from the GPS sensor of the device (956). As noted above, the driver application can monitor a current location of the device by using the GPS sensor of the device and determine the current location is proximate the first portion of the vehicle based on a reference location and dimensions of the vehicle.

The driver application records inspection completion with respect to the first portion of the vehicle (958). The driver application can record any defect or problem discovered with various items in the first portion and associated images or videos or notes, which can be included in the inspection summary report of the vehicle.

The driver application displays instructions on the screen for inspecting a second portion of the vehicle (960). After determining that the inspection for the first portion is completed, the driver application can display a user interface element, e.g., "CONTINUE" button, for the driver selecting to continue inspection of the second portion sequential to the first portion.

In some examples, the screen displays a user interface element, e.g., "BYPASS" button, for the driver selecting to bypass inspection of the second portion. The driver may select the user interface element to bypass the inspection under certain circumstances, e.g., in a case when the driver wants to check a particular portion of the vehicle during an accident. In response to receiving an input from the driver selecting the user interface element to bypass, the driver application can record and associate the selection with the inspection.

The inspection process repeats in the same manner for each portion to be inspected in the order of portions for the inspection of the vehicle. The driver application can record GPS locations of the computing device, timestamp information, and/or photos of the portions when each of the portions is to be inspected or being inspected.

Referring back to FIG. 9A, the driver application receives driver input indicating completion of vehicle inspection tasks (904). After completing the last inspection portion of the vehicle, the driver can select a user interface element, e.g., "SUBMIT" button, to indicate completion of vehicle inspection tasks. In response to receiving the input from the driver, the driver application can generate an inspection summary report, which can include information on all inspected portions of the vehicle. The information can indicate which portion is satisfactory and which portion has defects or problems. For each of the portions, the information can include GPS locations of the computing device, timestamp information, and/or photos of the portions when the portion is to be inspected or being inspected.

The driver application can transmit the inspection summary report to a remote facility, e.g., a transportation department computing system or a management system, via a network such as a cellular network. The driver application can also generate a maintenance report or request based on the inspection summary report, which can list a number of identified defects or problems in the vehicle that need to be fixed. The driver application can send the maintenance report or request to a maintenance shop, e.g., directly to maintenance software of a transportation department to create a work order that can be tracked by an administrator.

In some examples, after determining that the driver has completed the pre-trip inspection, the driver application presents a view, e.g., the view of FIG. 6C, for the driver to input a current mileage and/or fuel level of the vehicle. The driver application can also automatically record the current mileage and/or fuel level.

After determining that the driver completes the inspection of the vehicle, the driver application can change to operation mode for passenger tracking, e.g., as illustrated in FIG. 6D-1 or 6D-2. The bus can drive the vehicle on a route. The driver application displays information related to a plurality of passengers associated with the vehicle (906). The information can include a number of passengers on the vehicle or a number of eligible passengers associated with the current route of the vehicle. In some examples, the driver application determines that the vehicle is approaching a designated stop, the driver application can present a list of passengers to board or exit the vehicle. For each passenger, the information can include a name and/or photo of the passenger and whether the passenger boards or exit the vehicle at the designated stop.

The driver application receives input identifying specific passengers as the specific passengers board or exit the vehicle (908). In some examples, the computing device includes an identifier sensor, e.g., a near field RFID reader, responsive to proximity of a passenger identifier, e.g., a near field RFID card. When the specific passengers board or exit the vehicle, the specific passengers can present their identifiers to the computing device. The identifier sensor can receive electronic signals to obtain the identifiers of the specific passengers and provide the identifiers to the driver application. In some examples, in response to receiving the input identifying specific passengers as they board or exit the bus, the driver application can present identifying information about the specific passengers, e.g., photographs of the passengers.

The driver application updates a roster of passengers in response to receiving the input (910). The roster can include a list of passengers associated with the current route. The driver application can determine whether each of the specific passengers is authorized to board or exit the vehicle at the designated stop based on the obtained identifier associated with the passenger. In response to determining that the passenger is authorized to board or exit the vehicle, the driver application can add or remove the passenger into or from the roster of passengers. In such a way, the driver application can keep up-to-date information about the passenger riding status on the vehicle.

The computing device can communicate the up-to-date information about passenger riding status with a remote management system over a network such as a cellular network. Thus, the computing device can communicate both vehicle inspection information and passenger riding status with the remote management system. In some examples, the driver application displays a seating chart of the vehicle, indicating current passenger seating status, e.g., which passenger is sitting on which seat. The driver application can also transmit the up-to-date seating chart to the remote management system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

While a number of examples have been described for illustration purposes, the foregoing description is not intended to limit the scope of the invention, which is defined by the scope of the appended claims. There are and will be other examples and modifications within the scope of the following claims.

What is claimed is:

1. A portable vehicle data input device, comprising:
   an electronic display; and
   a data processor coupled to the display and containing instructions configured to cause the device to:
   display information related to inspection of different portions of a vehicle;
   receive driver input indicating completion of vehicle inspection tasks;
   confirm that the device was proximate each of the different portions of the vehicle, based on at least one of global positioning data from a sensor of the device and photographic images of the different portions of the vehicle from a camera of the device;
   display information related to a plurality of passengers associated with the vehicle;
   receive input identifying specific passengers as the specific passengers board or exit the vehicle; and
   update a roster of passengers in response to receiving the input,
   wherein the confirmation that the device was proximate each of the different portions of the vehicle comprises:
   confirming that the device was proximate a portion of the vehicle based on a result of comparing a photographic image of the portion of the vehicle obtained from the camera to a reference image of the portion of the vehicle.

2. The device of claim 1, wherein the instructions are configured to cause the device to communicate passenger status and vehicle inspection information over a cellular network.

3. The device of claim 1, further comprising an identifier sensor responsive to proximity of an identifier of a passenger and configured to provide the input identifying the specific passengers to the data processor.

4. The device of claim 1, wherein the instructions are configured to cause the device to generate, in response to an input from a driver, a vehicle inspection report indicating completion of the vehicle inspection tasks.

5. The device of claim 4, wherein the instructions are configured to cause the device to transmit the vehicle inspection report to a remote facility over a cellular network.

6. The device of claim 1, wherein the instructions are configured to cause the device to display identifying information about the specific passengers, in response to receiving the input identifying specific passengers as the specific passengers board or exit the vehicle.

7. The device of claim 1, wherein the device is configured to:
   determine that the device is proximate a particular portion of the vehicle to be inspected, and in response,
   record global positioning data of the device and associate the recorded global positioning data with the particular portion of the vehicle.

8. The device of claim 1, wherein the instructions are configured to cause the device to:
   display information related to an item in a particular portion of the vehicle being inspected, the information listing one or more defects for the item;
   receive input from a driver selecting one of the defects; and
   record and associate the selected defect with the item of the particular portion of the vehicle.

9. The device of claim 1, wherein the instructions are configured to cause the device to display a seating chart of the vehicle, including information indicating passenger seating status.

10. The device of claim 1, wherein the instructions are configured to cause the device to receive an input from a driver indicating a mileage and a fuel level of the vehicle.

11. The device of claim 1, wherein the device is in the form of a tablet computer running application software providing the instructions, and the device further comprises a case extending about the tablet computer.

12. A method of facilitating inspection of a vehicle using a hand-held data input device, the method comprising:
   establishing a reference location of the device based on reference global positioning data obtained from a sensor of the device when the device is at a reference portion of the vehicle;
   monitoring a current location of the device based on current global positioning data obtained from the sensor of the device when the device is moved from the reference portion of the vehicle;
   displaying instructions on a screen of the device for inspecting a first portion of the vehicle;
   receiving a manual input on the device indicating completion of a visual inspection of the first portion of the vehicle;
   by comparing the monitored current location of the device upon receipt of the manual input to the reference location, confirming upon the receipt of the manual input that the device was proximate the first portion of the vehicle; and then:
   recording inspection completion with respect to the first portion of the vehicle and displaying instructions on the screen for inspecting a second portion of the vehicle.

13. The method of claim 12, further comprising:
   receiving input from a driver to start inspection of the first portion of the vehicle; and
   displaying a pop-up window including a list of security check items in the first portion of the vehicle for the driver to check before inspecting the first portion of the vehicle.

14. The method of claim 12, further comprising:
   displaying a user interface element selectable by a driver to bypass inspection of the second portion of the vehicle; and
   in response to receiving an input from the driver selecting the user interface element, recording and associating the selection with the inspection.

15. The method of claim 12, further comprising recording the global positioning data of the device associated with the first portion of the device.

16. The method of claim 12, wherein confirming that the device was proximate the first portion of the vehicle comprises:
   determining that the device was proximate the first portion of the vehicle based on relative coordinates of the monitored current location of the device and the reference location and one or more stored dimensions of the vehicle.

17. A method of facilitating inspection of a vehicle using a hand-held data input device, the method comprising:
   displaying instructions on a screen of the device for inspecting a first portion of the vehicle;
   receiving a manual input on the device indicating completion of a visual inspection of the first portion of the vehicle;

displaying an indication requesting a photograph of the first portion of the vehicle;

obtaining a photographic image of the first portion of the vehicle from a camera of the device;

determining that the hand-held device was proximate the first portion of the vehicle based on a result of comparing the obtained photographic image of the first portion of the vehicle to a reference image of the first portion of the vehicle, and in response to receiving the manual input and determining that the hand-held device was proximate the first portion of the vehicle:

recording inspection completion with respect to the first portion of the vehicle, and displaying instructions on the screen for inspecting a second portion of the vehicle.

18. The method of claim 17, further comprising:

obtaining, from the camera, image data of a particular item of the first portion of the vehicle; and storing and associating the obtained image data with the particular item and the first portion of the vehicle.

19. The method of claim 18, further comprising:

comparing the obtained image data of the particular item to a reference image for the particular item; and determining that a suspected defect has occurred with the particular item of the first portion of the vehicle based on a result of the comparison; and in response, causing the hand-held device to alert the driver to the suspected defect.

20. The method of claim 17, wherein determining that the hand-held device was proximate the first portion of the vehicle comprises:

determining that the first portion in the obtained photographic image is substantially the same as the first portion in the reference image based on the result of the comparison.

\* \* \* \* \*